United States Patent [19]
Miyasita

[11] Patent Number: 6,023,357
[45] Date of Patent: Feb. 8, 2000

[54] METHOD FOR POWER SAVING IN OPTICAL COMMUNICATION APPARATUS, OPTICAL COMMUNICATION APPARATUS AND METHOD FOR USING THEREOF, AND OPTICAL COMMUNICATION SYSTEM

[75] Inventor: Tokio Miyasita, Tokyo, Japan

[73] Assignee: Oki Electric Industry Co., Ltd., Tokyo, Japan

[21] Appl. No.: 08/907,055

[22] Filed: Aug. 6, 1997

[30] Foreign Application Priority Data

Dec. 26, 1996 [JP] Japan ..................................... 8-346850

[51] Int. Cl.$^7$ ............................ H04B 10/06; H04B 10/00
[52] U.S. Cl. ......................... 359/109; 359/189; 359/142; 359/143; 359/154
[58] Field of Search ................................... 359/153, 142, 359/143, 189, 154

[56] References Cited

U.S. PATENT DOCUMENTS

| | | | |
|---|---|---|---|
| 5,267,071 | 11/1993 | Little et al. ............................... | 359/154 |
| 5,508,836 | 4/1996 | DeCaro et al. .......................... | 359/189 |
| 5,677,779 | 10/1997 | Oda et al. ................................. | 359/152 |

FOREIGN PATENT DOCUMENTS 6-152518   5/1994   Japan .

Primary Examiner—Jason Chan
Assistant Examiner—Mohammad Sedighian
Attorney, Agent, or Firm—Jones Volentine, L.L.P.

[57] ABSTRACT

An optical communication apparatus having a light receiving element 11 for receiving optical signals including an optical signal calling for communication start and an optical communication circuit 13 which includes an amplifier circuit amplifying the photocurrent generated by the light receiving element 11, performs predetermined processing necessary for the optical communication, and outputs a communication terminating signal upon termination of the optical communication, wherein there is provided a first circuit 15 capable of always supplying a bias voltage to the light receiving element 11, turning off a power source 29 for the optical communication circuit by making use of the communication terminating signal when it is outputted, and turning on the power source by making use of the photocurrent Ip generated by the light receiving element when the light receiving element receives the optical signal calling for communication start, whereby the power saving in the standby state can be made more effective comparing with the prior art apparatus.

26 Claims, 39 Drawing Sheets

METHOD FOR POWER SAVING IN OPTICAL COMMUNICATION APPARATUS, OPTICAL COMMUNICATION APPARATUS AND METHOD FOR USING THEREOF, AND OPTICAL COMMUNICATION SYSTEM

BACKGROUND OF THE INVENTION

The invention relates to a method for saving electric power in apparatus having the function of optical communication using optical signals, a method for using such apparatus, and an optical communication system structured thereby.

In an optical communication apparatus, while the apparatus is inactive i.e. in the standby state (or standby time), the power saving is attempted from the standpoint of eliminating or reducing the energy. An example of the optical communication apparatus taking such measures for the power saving has already been made open to the public by a KOKAI (unexamined patent publication) No. 6-152518. This publication teaches a power saving technology which is adaptable to the network terminal (NT) installed in a user's house subscribing to the optical line transmission system. More concretely, the publication describes, in the 2nd column, lines 20 to 23, that the power supply to a light emitting element circuit in the network terminal (NT) is cut off while the terminal is in the standby state. The publication further describes, in the 3rd column, lines 22 to 27, that the power supply to a circuit for a light receiving element and an amplifier used therefor is cut off for a specific period of time during the standby time.

In case of the above-mentioned conventional technology, however, a cut-off period of the power supply to the circuit for the light receiving element and the amplifier therefor in the standby time is made roughly a half of the standby time (see the 3rd column, lines 42 to 43 of the publication).

Consequently, according to the above conventional technology, the power supply to the circuit of the light receiving element and the amplifier therefor is still allowed for about a half of the standby time.

Now, let us discuss this respect further a little in detail. In case of the above conventional technology, as will be apparent from the description in the 3rd column, lines 37 to 43 and FIG. 2 of the above publication, the network terminal (NT) repeats the ON/OFF operation of the power source for the circuit of the light receiving element and the amplifier therefor at a twice frequency of the optical burst signal which is inputted from an office line terminal (LT).

According to this way, as the power supply to the circuit of the light receiving element and the amplifier circuit therefor is carried out intermittently, the power saving in the circuit of the light receiving element and the amplifier circuit therefor may be attained although detection of the burst signal (here, regarded as a kind of an optical signal calling for communication start) can not help being carried out intermittently.

In case of this conventional technology, however, as the power is still supplied to the circuit of the light receiving element and the amplifier therefor for about a half of the standby time, the power saving effect during the standby time has not always produced a satisfactory result.

Accordingly, it is desired to establish a more effective method for the power saving in the circuit system for use in the light receiving element and an optical communication apparatus capable of preferably executing the method.

SUMMARY OF THE INVENTION

The inventors continued to earnestly study for developing such method and apparatus. As a result, the inventors focused on the following points, which are: (1) There exists no optical signal having a minus(−) sign, so that the light receiving element never fails to generate the photocurrent whenever the element receives a optical signal as far as it is biased with a certain suitable voltage; (2) The amplifier circuit for use in the light receiving element includes a path enabling the photocurrent (DC current) to flow therethrough without supplying the power thereto (see FIGS. 6 to 8, described later), so that the electrical change due to the photocurrent can be caused in the optical communication apparatus; and (3) it is considered that such electrical change may be utilized for controlling the changeover of the state of the optical communication apparatus, from the standby state to the communicative state or vice versa.

According to the invention, there is provided a method for saving the power consumed by an optical communication apparatus including a light receiving element for receiving optical signals including an optical signal calling for communication start (referred to merely as optical calling signal hereinafter), and an optical communication circuit which includes an amplifier circuit amplifying the photocurrent generated by said light receiving element, performs predetermined processing necessary for the optical communication, and outputs a communication terminating signal upon termination of the optical communication, the method comprising the steps of always supplying a bias voltage to the light receiving element; holding the optical communication apparatus in the standby state by cutting off the power supply to the optical communication circuit by making use of the communication terminating signal when it is outputted; and setting up the optical communication apparatus available for communication by turning on the power source for the optical communication circuit by making use of the photocurrent generated by the light receiving element when it receives the optical calling signal.

According to this method of the invention, the power source for the optical communication circuit is turned off by making use of the communication terminating signal, thereby enabling the optical communication apparatus to enter in its standby state. While the optical communication apparatus is in its standby state, only the bias voltage is supplied to the light receiving element, and no power is supplied to the optical communication circuit over an entire standby period of time. Consequently, the power is neither supplied to the amplifier circuit for use in the light receiving element, too. Accordingly, the invention is largely different from the conventional technology, by which the power is supplied to the light receiving element and the amplifier circuit for amplifying the output of the element for a half of the standby period of time.

In the optical communication apparatus according to the invention, even if the apparatus is in its standby state, the bias voltage is still supplied to the light receiving element. Therefore, the light receiving element can generate the photocurrent corresponding to the optical calling signal whenever it comes thereto.

With these functions, there is realized the optical communication apparatus which can make its power consumption be substantially zero in its standby state, and also can shift itself to the communicative state in response to the optical calling signal.

The communication terminating signal may be produced by an arbitrary and suitable manner, for instance preparing in advance a signal indicating the termination of the communication which is sent by the transmission side or a signal indicative of the same which is outputted by the receiving side when any new optical signal is not received for a preset certain period of time after the last optical signal (same in each of inventions described hereinafter).

The transmission side can generate the optical calling signal according to a rule or method established in advance, for instance the rule of transmitting, at the start of the optical communication, such an optical signal that has a preset length of time or that is synchronized with the clock pulse, which identifies that the signal now transmitted is the optical calling signal (same in each of inventions described hereinafter).

Transmission of the substantial part of optical communication signals is preferably arranged in advance such that it begins after a certain period of time has passed away following the transmission of the optical calling signal (more concretely, after the receiving side has entered in a normal operation state following receipt of the power supply therefor), (same in each of inventions described hereinafter). With this, it becomes possible to perform the stable optical communication.

Furthermore, according to the invention, there is provided an optical communication apparatus having a light receiving element for receiving optical signals including an optical calling signal and an optical communication circuit which includes an amplifier circuit amplifying the photocurrent generated by said light receiving element, performs predetermined processing necessary for the optical communication, and outputs a communication terminating signal on the occasion of termination of the optical communication, wherein there is provided a first circuit which always supplies a bias voltage to the light receiving element, makes a non-connected state between the optical communication circuit and a first power source as a power source thereof when the communication terminating signal is outputted, makes a connected state between the optical communication circuit and the first power source by making use of the photocurrent generated by the light receiving element when the light receiving element receives the optical calling signal, and holds the connected state until the communication terminating signal is outputted.

According to the above optical communication apparatus of the invention, as the first circuit is provided, it becomes possible: (1) to always supply the bias voltage to the light receiving element; (2) to cut off the power supply to the optical communication circuit when the communication terminating signal is outputted, thereby automatically having the optical communication apparatus entered in its standby state; and (3) to automatically release the optical communication apparatus from its standby state by making use of the photocurrent generated by the light receiving element when it receives the optical calling signal.

In case of embodying the invention regarding the optical communication apparatus, the first circuit is preferably constituted with a switch circuit which has at least a first to fourth terminals, the first terminal being connected with the first power source for supplying the power to the optical communication circuit, the second terminal being connected with the bias terminal of the light receiving element, the third terminal being connected with the power source terminal of the optical communication circuit, and the fourth terminal being an input terminal for receiving the communication terminating signal or a signal associated therewith, and which always supplies the voltage based on the first power source as a bias voltage to the light receiving element through the second terminal, makes a conductive state between the first terminal and the third terminal by making use of the photocurrent as the trigger flowing through the second terminal when the light receiving element receives the optical calling signal, and holds the conductive state until the communication terminating signal or a signal associated therewith is inputted to the fourth terminal.

In this preferred example, the bias voltage can be applied to the light receiving element by utilizing the first power source for optical communication circuit. Moreover, when the change of current is caused at the second terminal by the above photocurrent, there is formed a circuit connecting the optical communication circuit with the first power source, thereby resulting in the first circuit with ease.

In case of embodying the invention regarding the optical communication apparatus, the above switch circuit is preferably formed with a circuit which includes: (a) a current folding circuit which has an input terminal, an output terminal, and a common terminal, the input terminal being connected with the bias terminal of the light receiving element, and the common terminal being connected with a bias voltage source for supplying the bias voltage to the light receiving element, and (b) a switch circuit which has a first to fourth terminals, the first terminal being connected with the first power source for the optical communication circuit, the second terminal being connected with the output terminal of the current folding circuit, the third terminal being connected with the power source terminal of the optical communication circuit, and the fourth terminal being an input terminal for receiving the communication terminating signal or a signal associated therewith, and which makes a conductive state between the first terminal and the third terminal by making use of the photocurrent as the trigger flowing through the current folding circuit when the light receiving element receives the optical calling signal, and holds the conductive state until the communication terminating signal or a signal associated therewith is inputted to the fourth terminal.

In this preferred example, in order to directly connect the light receiving element with the second terminal of the switch circuit, the anode (or cathode) of the light receiving element has to be connected with the second terminal of the switch circuit in view of the potential relation. However, as the current folding circuit is provided, the cathode (or anode) of the light receiving element may be connected with the second terminal of the switch circuit through the current folding circuit. Therefore, the optical communication circuit may be designed with a large degree of freedom. For instance, it becomes possible to use a minus(−) power source for the optical communication circuit.

In case of arranging the first circuit so as to include the switch circuit, it is preferable that the switch circuit is formed as a circuit which includes a first switch circuit generating a switching signal in response to the photocurrent, and a second switch circuit which is turned on/off by the switching signal, thereby connecting/disconnecting the first and third terminals.

In this preferred example, it becomes possible to separate a circuit portion for generating the switch signal from a circuit portion for supplying the power to the optical communication circuit. In general, the former circuit portion may be arranged so as to deal with a small current. On one hand, the latter circuit portion is generally required that it can deal with such a large current that is enough to be used as the power for the optical communication circuit. Therefore, it is preferable in view of circuit design (measures against noise, withstand voltage of circuit parts, etc.) that both circuits are formed separately. The above preferred example enables this respect to be done.

In case of employing the current folding circuit, this circuit is preferably formed to include a non-linear current amplifier circuit having a current amplification factor which indicates a minimum value to the input current of almost zero and increases with the increase of the input current, and a resistance which limits the maximum value of the output current, or a constant current circuit.

This is because the non-linear current amplifier circuit is a circuit of the nature that it suppresses a signal of a small noise level (Reynolds level) and emphatically amplifies a signal of a large level. Accordingly, the current folding circuit including the non-linear current amplifier circuit can suppress the photocurrent part of a small current level which is caused by the noise of the light receiving element while it can emphatically amplifies a substantial photocurrent part generated by the optical calling signal. Therefore, the S/N ratio of the receiving portion for receiving the optical calling signal can be improved.

In case of using the current folding circuit, a bias voltage source is preferably formed by a controllable power source of which the output voltage is controlled by the optical communication circuit, and which outputs a fixed DC voltage while the power source for the optical communication circuit is turned off.

According to this preferred example, the light receiving element can be supplied with a fixed DC voltage as the bias voltage while the power source for the optical communication circuit is turn off (i.e. in the standby state). On one hand, when the optical communication circuit gets out of its standby state (i.e. gets in the communicative state), the light receiving element can be supplied with the bias voltage (controlled variably) from the optical communication circuit. Accordingly, if an avalanche diode is used as the light receiving element, the controllable power source can control the bias voltage taking account of the current multiplication factor of the avalanche diode. Therefore, this makes it possible to adopt the automatic gain control (AGC) system which serves to make the received photocurrent amplitude constant. As mentioned above, use of the current folding circuit can bring advantageous effects such as enlarging the degree of freedom in apparatus design and making it possible to introduce the communication according to the AGC system.

In case of embodying the invention in respect of the optical communication apparatus, the first circuit is preferably constituted as a circuit including: (A) a controllable power source of which the output is controlled by the optical communication circuit, and which outputs a fixed DC voltage while the power source for the optical communication circuit is turned off; (B) a first switch circuit which has at least a first to fourth terminals, the first terminal being connected with the controllable power source, the second terminal being connected with the bias terminal of the light receiving element, the third terminal being an output terminal of a switching signal, and the fourth terminal being an input terminal for receiving the communication terminating signal or a signal associated therewith, and which always supplies the voltage based on the controllable power source as a bias voltage to the light receiving element through the second terminal, and continues to output the switching signal from the third terminal by making use of the photocurrent flowing through the second terminal as the trigger when the light receiving element receives the optical calling signal until the communication terminating signal or a signal associated therewith is inputted to the fourth terminal; and (C) a second switch circuit which is provided between a first power source for the optical communication circuit and the power source terminal thereof, and makes a connected state between the optical communication circuit and the first power source in response to the switching signal.

According to this preferred example, the light receiving element can be supplied with a fixed DC voltage as the bias voltage while the power source for the optical communication circuit is turn off (i.e. in the standby state). On one hand, when the optical communication circuit is released from its standby state (i.e. enters in the communicative state), the light receiving element can be supplied with the bias voltage (control led variably) from the optical communication circuit. Accordingly, if an avalanche diode is used as the light receiving element, the avalanche diode can be used such that the bias voltage thereto is controlled, in communication, taking account of the current multiplication factor of the avalanche diode. Therefore, this makes it possible to adopt the automatic gain control (AGC) system which serves to make the received photocurrent amplitude constant. Furthermore, as the first and second switch circuits are separated from each other, the circuit portion for generating the switch signal can be separated from the circuit portion (generally dealing with a large current) serving to connect the first power source with the optical communication circuit.

In case of embodying the invention with respect to the optical communication apparatus, the first circuit is preferably formed by a circuit including: (i) a changeover circuit which has a first terminal, a second terminal and a common terminal connected with the bias terminal of the light receiving element, and is controlled by a switching signal so as to make a first state that the second terminal is connected with the common terminal when the switching signal is inputted, and a second state that the first terminal is connected with the common terminal when the switching signal is not inputted; (ii) a controllable power source of which the output terminal is connected with the second terminal of the changeover circuit and of which the output voltage is controlled by the optical communication circuit; (iii) a first switch circuit which has at least a first to fourth terminals, the first terminal being connected with a first power source as the power source for the optical communication circuit, the second terminal being connected with the first terminal of the changeover circuit, the third terminal being an output terminal of a switching signal, and the fourth terminal being an input terminal for receiving the communication terminating signal or a signal associated therewith, and which supplies the voltage based on the first power source as a bias voltage to the light receiving element when the changeover circuit is in the second state, and continues to output the switching signal from the third terminal by making use of the photocurrent flowing through the second terminal of the first switch circuit as the trigger when the light receiving element receives the optical calling signal until the communication terminating signal or a signal associated therewith is inputted to the fourth terminal; and (iv) a second switch circuit which is provided between the first power source and the power source terminal of the optical communication circuit, and makes a connected state between the optical communication circuit and the first power source in response to the switching signal.

In this preferred example, during the standby period of time, the light receiving element receives a bias voltage based on the first power source. However, when the light receiving element receives the optical calling signal and the optical communication circuit correspondingly enters in its communicative state, the light receiving circuit comes to be supplied with the bias voltage from the controllable power source owing to the function of the changeover circuit, so that in the communicative state, it becomes possible to employ the automatic gain control system (AGC) which makes the received photocurrent pulse amplitude constant. The changeover circuit performs the switching operation between the control lable power source and the switch circuit, so that it is possible to prevent the noise from creeping into the light receiving element from the first switch circuit while the communication is going on. In general, the controllable power source consumes the power more than the ordinary power source because it has to be provided with an additional circuit for voltage control. However, in this preferred example, the bias voltage based on the first power source is supplied to the light receiving element during the standby period of time while the controllable power source is turned off for that period. Therefore, the power consumption in the standby state is reduced comparing to the case where the power has to be supplied to the controllable power source even in the standby state.

In case of embodying the invention regarding the optical communication apparatus, the first circuit is preferably formed by a circuit including: (I) a changeover circuit which has a first terminal, a second terminal and a common terminal connected with the bias terminal of the light receiving element, and is controlled by a switching signal so as to make a first state that the second terminal is connected with the common terminal when the switching signal is inputted, and a second state that the first terminal is connected with the common terminal when the switching signal is not inputted; (II) a controllable power source of which the output is connected with the second terminal of the changeover circuit and of which the output voltage is controlled by the optical communication circuit; (III) a first switch circuit which has at least a first to fourth terminals, the first terminal being connected with an arbitrary second power source, the second terminal being connected with the first terminal of the changeover circuit, the third terminal being an output terminal of a switching signal, and the fourth terminal being an input terminal for receiving the communication terminating signal or a signal associated therewith, and which supplies the voltage based on the second power source as a bias voltage to the light receiving element when the changeover circuit is in the second state and continues to output the switching signal from the third terminal by making use of the photocurrent flowing through the second terminal of the first switch circuit as the trigger when the light receiving element receives the optical calling signal until the communication terminating signal or a signal associated therewith is inputted to the fourth terminal; and (IV) a second switch circuit which is provided between the first power source for the optical communication circuit and the power source terminal of the optical communication circuit, and makes a connected state between the optical communication circuit and the first power source in response to the switching signal.

In this preferred example, during the standby period of time, the light receiving element receives a bias voltage based on the second power source. However, when the light receiving element receives the optical calling signal and the optical communication circuit correspondingly enters in the communicative state, the light receiving element comes to be supplied with the bias voltage from the controllable power source owing to the function of the changeover circuit, so that in the communicative state, it becomes possible to employ the automatic gain control system (AGC) which makes the received photocurrent pulse amplitude constant. The changeover circuit performs the switching operation between the controllable power source and the switch circuit, so that it is possible to prevent the noise from creeping into the light receiving element from the first switch circuit while the communication is going on. As first power source for the optical communication circuit and the controllable power source themselves are used as power source for the optical communication, they are often formed as a high quality DC power source which includes a voltage stabilizer circuit, a booster circuit, etc., so that the power loss is increased accordingly. On one hand, in case the bias voltage is considered enough if it is at such a level that the light receiving element can merely serve to generate a photocurrent in the standby state upon its receipt of the optical calling signal, the above preferred example suggests that a simple power source formed of an AC power source (including commercial AC power source), a rectifier circuit and a smoothing circuit can be used as the second power source. Such simple power source includes no high quality circuit, so that the internal power loss at the load current of zero can be reduced accordingly. As a result, the power saving effect can be enhanced.

In case of using the above mentioned second power source, it is preferable to provide a voltage drop circuit between the second power source and the first terminal of the first switch circuit. The voltage drop circuit supplies the voltage of the second power source to the first switch circuit when the optical communication circuit is in the OFF state, and supplies the voltage, which is lower than the minimum voltage outputted from the controllable power source and ensures the operation of the first switch circuit, to the first switch circuit when the optical communication circuit is in the ON state.

The above voltage drop circuit has the following meanings. In case of setting the second power source to a fixed voltage value and using the changeover circuit for switching the path connection by making use of the voltage difference between the second power source and the controllable power source (i.e. changeover circuit using diodes as described later), if it happens in the communicative state that the voltage of the controllable power source is controlled to be lower than the voltage of the second power source, it becomes impossible to connect the controllable power source with the light receiving element, despite that it normally be possible. In the communicative state, the voltage drop circuit acts to drop the voltage of the second power source to the voltage lower than the lowest voltage of the controllable power source, so that the above problem can be avoided. When the first switch circuit is in the ON state and the current flowing therethrough has a fixed value, the above problem can also be solved by providing a resistance on the path of the output current from the second power source and utilizing the voltage drop across that resistance.

In each of the above respective preferable examples, in case the first power source is connected only with the second switch circuit, it is preferable that the first power source is formed as an AC power source (a commercial AC power source or those which is attained by transforming thereof etc.), or a DC power source which is formed of an AC power source, a rectifier circuit (including either a half- or full-wave rectifier circuit) and a smoother circuit, or is a battery, and is further preferable that the optical communication circuit is constituted including not only the above AC or DC power source but also high quality power source circuits needed for the optical communication circuit such as a DC constant current circuit, a low noise circuit, etc.

In this way, the power source can achieve its OFF state in the more substantial part thereof in its standby state. In other words, the power source portion of the optical communication circuit is made inactive, so that the power saving effect is further enhanced during the standby period of time.

In each of respective inventions in which the switch circuit is divided into the first and second switch circuits, it has been explained that the switching signal is held in the first switch circuit until the communication terminating signal or a signal associated therewith is outputted. However, it is of course possible for the second switch circuit to be provided with a circuit for holding the switching signal until the communication terminating signal or a signal associated therewith is outputted. In this way, the object of the invention can also be achieved, and at the same time, the degree of freedom for designing the switch circuit can be enlarged.

For embodying the invention regarding the optical communication apparatus, the first circuit is preferably formed by a circuit including a thyristor which is turned on by the photocurrent generated when the light receiving element receives the optical calling signal and is turned off by said communication terminating signal or a signal associated therewith.

The thyristor can supply a voltage, which is shifted to some extent from the voltage supplied to the thyristor, to the light receiving element as the bias voltage thereof by connecting its predetermined node with the light receiving element (details to be described later referring to FIG. 3). Furthermore, if the ON/OFF threshold current of the thyristor is preset to be larger than the noise current level (the noise in the low speed area the thyristor can respond thereto) of the light receiving element but to be lower than the photocurrent generated in response to the optical calling signal, the thyristor is turned on in response to the current change at the above node which is caused when the photocurrent flows therethrough. Moreover, the power consumption can be made substantially zero when the thyristor is not turned on (i.e. in the standby state of the optical communication apparatus).

In case of embodying the invention as to the optical communication apparatus, it is preferable to provide a second circuit which converts the communication terminating signal into a signal matching with the first circuit form and outputs the converted signal to the first circuit, as a signal associated with the communication terminating signal.

The reason is as follows. In general, the control portion of the optical communication circuit is often constituted in the form of a digital circuit. On one hand, as the first circuit of this invention serves as a circuit for the purpose of mainly turning on/off the power source line, it is usual that the circuit is provided with aground potential and an input voltage level needed for its operation which are different from those of the digital circuit. Accordingly, the first circuit as constituted like the above often fails to match with the communication terminating signal transmitted from the optical communication circuit of the digital type in respect of the signal speed, signal level, etc. Thus, the second circuit is provided for ensuring the signal matching between the optical communication circuit and the first circuit.

The second circuit is preferably constituted with the thyristor. Once the thyristor has received the communication terminating signal from the optical communication circuit, it generates and outputs a reset signal in response thereto, regardless of the pulse speed of the communication terminating signal. Moreover, the thyristor continues to transmit the reset signal generated by itself to the first circuit until the first circuit is able to make the OFF state between the optical communication circuit and the power source thereof. Therefore, the thyristor can surely turnoff the first circuit. Moreover, when the optical communication is in the standby state, the thyristor as the second circuit is also in the OFF state, so that the power saving effect is neither weakened nor eliminated by providing the second circuit.

In case of providing the second circuit, it is preferably formed by a monostable multivibrator including: a constant current circuit which is turned on by the communication terminating signal; a condenser which is charged by the constant current circuit; a current mirror circuit which receives the output from the constant current circuit as its input; a Schmitt trigger circuit which operates using the output of the current mirror circuit as a load thereof, and receives the voltage across terminals of the condenser as its input; and a thyristor built-in circuit portion including a thyristor which is turned on by the output from the Schmitt trigger circuit, thereby turning off the constant current circuit and discharging the condenser. In this case, however, the output of the multivibrator may be either the output of the mirror current circuit or the output of the current folding circuit of which the input terminal is connected with the output terminal of the multivibrator.

When the monostable multivibrator receives the communication terminating signal, it outputs a pulse having such a certain length of time that can surely makes the OFF state between the optical communication circuit and the power source thereof. Moreover, while the optical communication apparatus is in the standby state, no current flows through the constant current circuit of the monostable multivibrator. Thus, no current flows through the mirror current circuit of which the input terminal is connected with the output one of the constant current circuit. Furthermore, no current flows through the Schmitt trigger circuit of which the load is the output of the mirror current circuit. Of course, any current can not flow through the thyristor. Accordingly, the power saving effect is neither weakened nor eliminated by providing the second circuit.

In case of embodying the invention regarding the optical communication apparatus, it is preferable to provide a third circuit which forcibly makes a connected state between the first power source and the power source terminal of the optical communication circuit with the help of the external control, regardless of the existence or not of the optical calling signal.

By providing the third circuit, it becomes possible to arbitrarily activate the optical communication apparatus whenever so requested. Also, it becomes possible to use the optical communication apparatus for an arbitrary period of time under the condition always supplying the power thereto. More concretely, the optical communication becomes always available for communication if keeping the third circuit in operation for a period of time as arbitrarily set in advance. Typically, this period of time as set arbitrarily means the period of time in which the communication density becomes high.

In case of embodying the invention as for the optical communication apparatus, it is preferable to provide a fourth circuit which forcibly releases the connected state between the first power source and the power source terminal of the optical communication circuit with the help of the external control, regardless of the presence or not of the communication terminating signal.

With a provision of the fourth circuit, it becomes possible to make the optical communication apparatus place in the standby state whenever so desired, regardless of the presence or not of the communication terminating signal from the optical communication circuit.

DETAILED DESCRIPTION OF THE PREFERRED EMBODIMENTS

Figure 1:
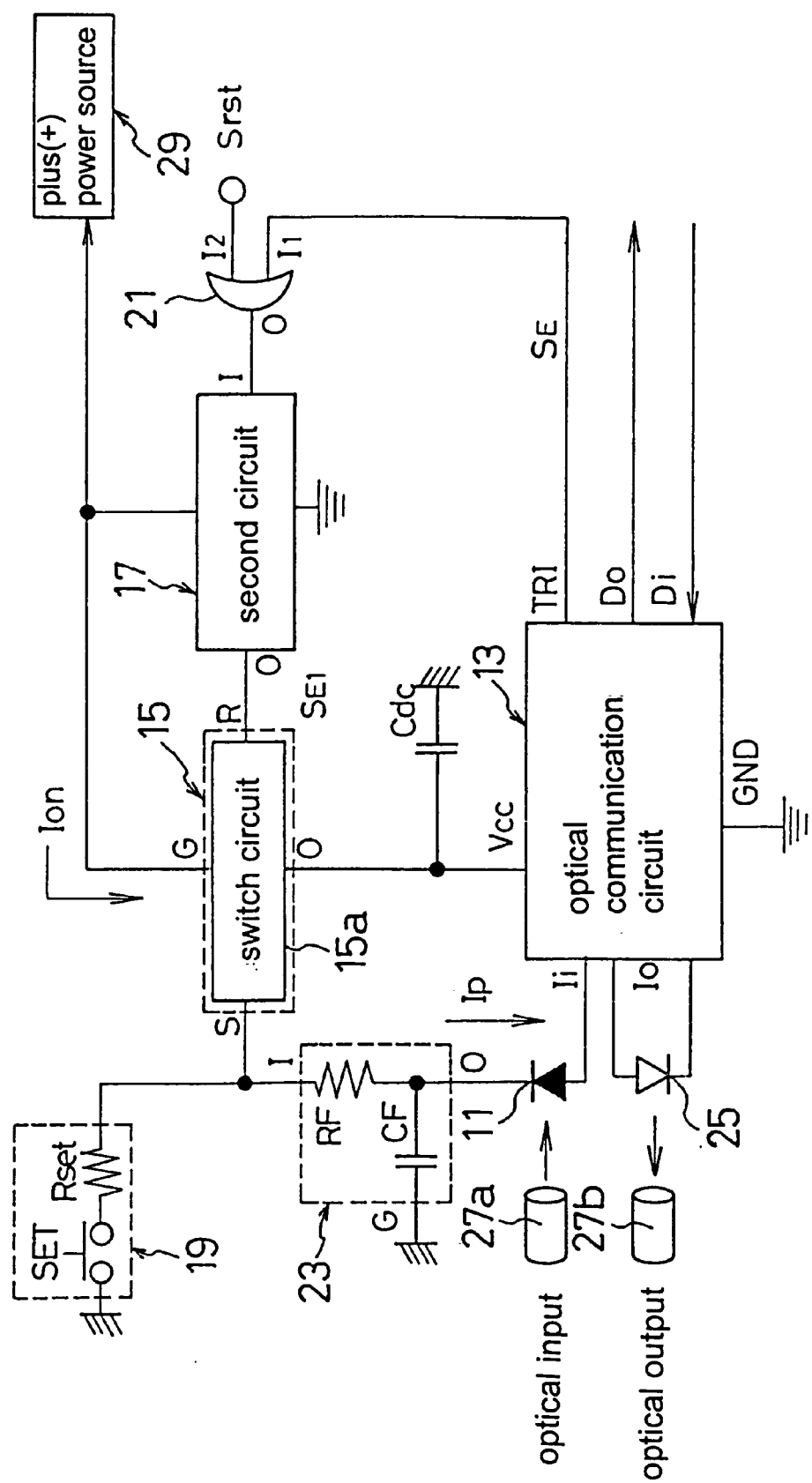
FIG. 1 is a block diagram for explaining the constitution of an optical communication apparatus according to the first embodiment of the invention.

In the following, there will now be totally described in detail with reference to the accompanied drawings, respective preferred embodiments of the invention relating to a method for the power saving in an optical communication apparatus, an optical apparatus and a method for using the same, and an optical communication system. It should be noted here that respective figures in the accompanying drawings are just schematically illustrated for assisting the easy and better understanding of the readers. Furthermore, the like parts or constituents appearing in respective figures are given the like reference numerals and symbols, and the explanation about such like parts or constituents would not be omitted in the description as the case may be.

First Embodiment

FIG. 1 is a block diagram showing the constitution of an optical communication apparatus according to the first embodiment of the invention. This apparatus includes a light receiving element 11, an optical communication circuit 13, a first circuit 15, a second circuit 17, a third circuit 19, a fourth circuit 21, a low-pass filter 23, and a light emitting element 25.

The above-mentioned components 11 to 25 of the apparatus will be described in detail latter, but the relation of connection among them will now be explained herein below.

The bias terminal of the light receiving element 11 is connected with the set input terminal S of the first circuit 15 via the low-pass filter 23 while the other terminal of the same is connected with the terminal Ii of the optical communication circuit 13.

The switch terminal G of the first circuit 15 is connected with a first power source 29 for the optical communication circuit 13 while the switch terminal 0 of the same is connected with the power source terminal Vcc of the optical communication circuit 13.

The output terminal TRI of the optical communication circuit 13 for outputting communication terminating signal is connected with the input terminal I1 of the fourth circuit 21 while the output terminal O of this fourth circuit 21 is connected with the input terminal I of the second circuit 17.

The output terminal O of the second circuit 17 is connected with the reset signal input terminal R of the first circuit 15.

The third circuit 19 is connected between the set input terminal S of the first circuit and the earth terminal of the optical communication apparatus. The light emitting element 25 is connected with the terminal I0 for the light emitting element of the optical communication circuit 15.

In this embodiment, the light receiving element 11 is formed by using a photodiode. However, if the AGC operation is required as in the case of another embodiment which will be described later, it may be formed by an avalanche diode. Of course, other preferable light receiving element such as a photoelectric tube may be arbitrarily selected and used depending on the purpose.

The light receiving element 11 is used for receiving an optical signal. Signals received by the light receiving element 11 include an optical calling signal. Signals received by the light receiving element 11 are transmitted thereto from the outside, for instance by means of an optical fiber 27.

In order to enable the predetermined optical communication to be performed, the optical communication circuit 13 has to include a hardware circuit portion whichincludes an amplifier circuit for amplifying the photocurrent generated by the light receiving element 11, and a software circuit portion for controlling the optical communication procedure. The optical communication circuit 13 is set up such that when the power is supplied thereto, it drives both of its hardware circuit portion and software circuit portion with the help of its power-on reset function, thereby entering in its communicative state executing the optical communication, and also entering in the state capable of outputting the communication terminating signal SE, when the optical communication is over.

In this case, the optical communication circuit 13 includes an input terminal Ii which connects one end of the light receiving element 11 with the input terminal of the amplifier circuit for the light receiving element: a terminal I0 for connecting itself with the light emitting element 25; a terminal TRI for outputting the communication terminating signal SE; a terminal group Do for outputting data such as receiving data, regenerating clocks, output for control, etc.; a terminal group Di for inputting data such as transmitting data, clock input, input for control, etc.; the power source terminal Vcc for connecting itself to the power source (actually, connecting through the first circuit 15); and a GND terminal to be connected with the earth terminal of the optical communication apparatus.

Figure 2:
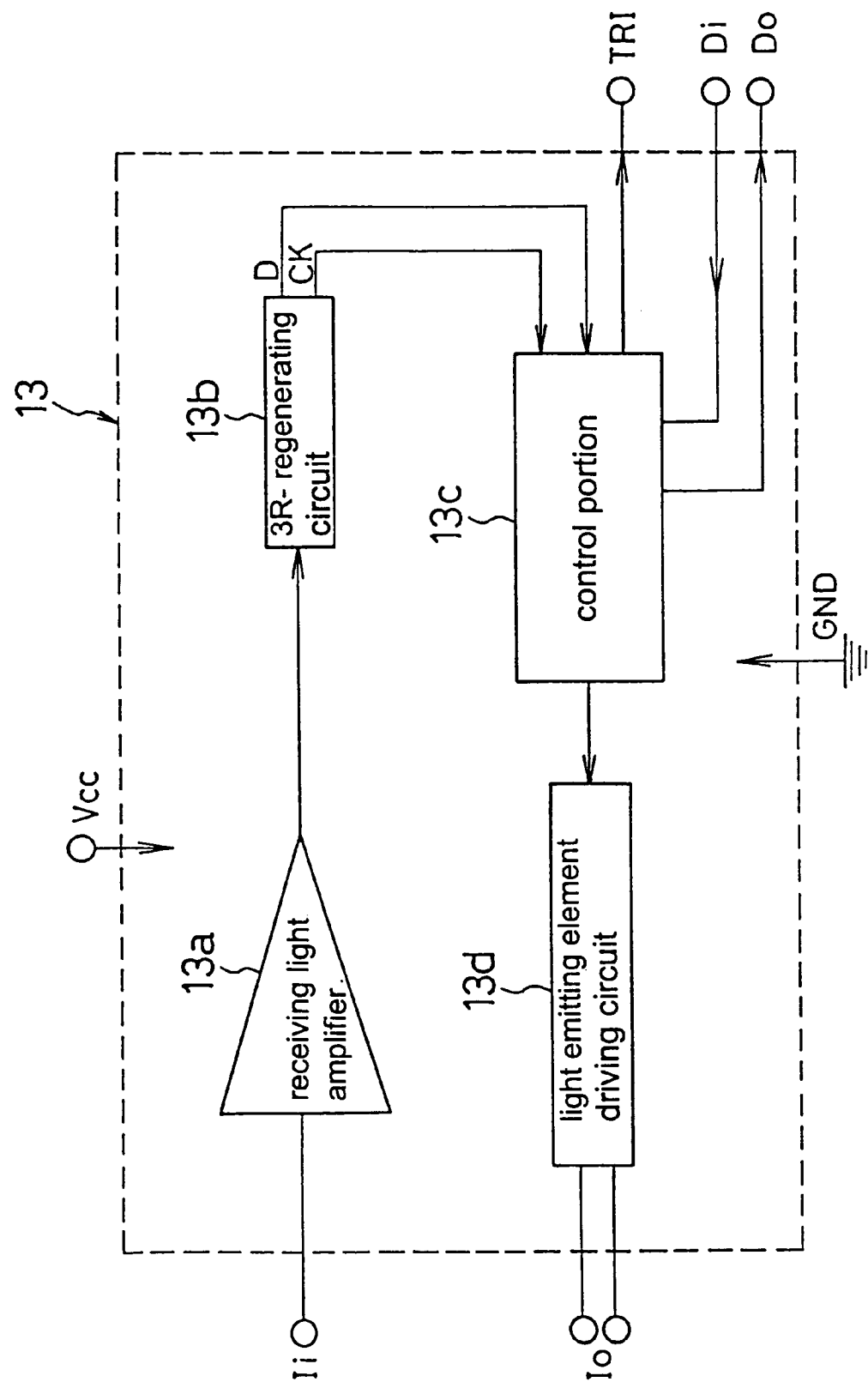
FIG. 2 is a block diagram for explaining the constitution of an optical communication circuit 13.

FIG. 2 is a block diagram showing an example of the inside structure of the optical communication circuit 13. This circuit 13 includes a receiving light amplifier 13a, 3R-regenerating circuit 13b, a control portion 13c, and a light emitting element driving circuit 13d.

The receiving light amplifier 13a amplifies the photocurrent generated by the light receiving element 11. The 3R-regenerating circuit 13b performs reshaping, retiming (i.e. regeneration of timing pulses having a correct pulse width) and regenerating the output wave form of the receiving light amplifier 13a. The control portion 13c is a circuit which includes a coder, a decoder, an data processing circuit and a control circuit, and carries out a series of processing necessary for the communication. The light emitting element driving circuit 13d drives the light emitting element to emit the light in response to the transmission data. These components 13a to 13d begins their operation when the power source terminal Vcc is connected with the first power source 29 for the optical communication circuit 13. Connection/disconnection between the power source terminal Vcc and the first power source 29 is controlled by the first circuit 15 as described in detail later.

The first circuit 15 will be described in the following. This circuit 15 serves to always supply a bias voltage to the light receiving element 11. Furthermore, it cuts off the power supply to the optical communication circuit 13 when the communication terminating signal SE is outputted from the circuit 13, thereby causing a non-connected state between the power source terminal Vcc and the first power source 29. Still further, this first circuit 15 may activate the power source for the optical communication circuit 13 by making use of the photocurrent generated by the light receiving element 11 when the light receiving element 11 receives the optical calling signal, and may keep the power source in the activated state until the communication terminating signal is outputted from the optical communication circuit 13. That is, the connection between the power source terminal Vcc and the first power source 29 is held during the communication.

The first circuit 15 may be formed in various arbitrary and preferable ways if it is provided with such a function as mentioned above. In the first embodiment, the first circuit 15 is formed as a switch circuit 15a as described in the following.

The switch circuit 15a has at least a first to fourth terminals, i.e. a switch terminal G, a set input terminal S, a switch terminal O, and a reset input terminal R. The switch terminal G is connected with the first power source (plus(+) power source 29 in FIG. 1), the set input terminal S with the bias terminal (cathode) of the light receiving element 11 via a low-pass filter 23, the switch terminal 0 with the power source terminal Vcc of the optical communication circuit 13, and the reset input terminal R with the output terminal of the second circuit 17.

The switch terminal G serves also as the ground terminal to the set input. Here, regarding the switch circuit 15a, a term "set" is used for indicating the state where both of switch terminals G and O are in a conductive state (i.e. ON state) while a term "reset" means the state where both of switch terminals G and O are in the non-conductive state (i.e. OFF state).

Furthermore, the switch circuit 15a has the function of always supplying the voltage from the first power source 29 to the light receiving element 11 as the bias voltage thereof via the set input terminal S. Still further, it has the function of entering in the ON state by making use of the photocurrent Ip flowing through the set input terminal S as the trigger when the light receiving element 11 receives the optical calling signal. Still further, it has the function of holding this ON state until the communication terminating signal SE or the signal SE1 associated therewith is outputted. These functions will be explained later in more detail with reference to FIG. 3(A) etc. While the switch circuit 15a is in the ON state, the optical communication circuit 13 is supplied with the power from the first power source 29.

The switch circuit 15a may be formed with any arbitrary and suitable circuits if the above-mentioned functions are achieved thereby. However, it is a preferable selection that the switch circuit 15a is formed with one of circuits 15a1 to 15a5 (referred to as switch circuits 15a1 to 15a5 hereinafter) which will be explained with reference to FIGS. 3 to 5. Because, as will be described in detail later, each of switch circuits 15a1 to 15a5 has the above-mentioned functions and performs the effective power saving.

Figure 3A:
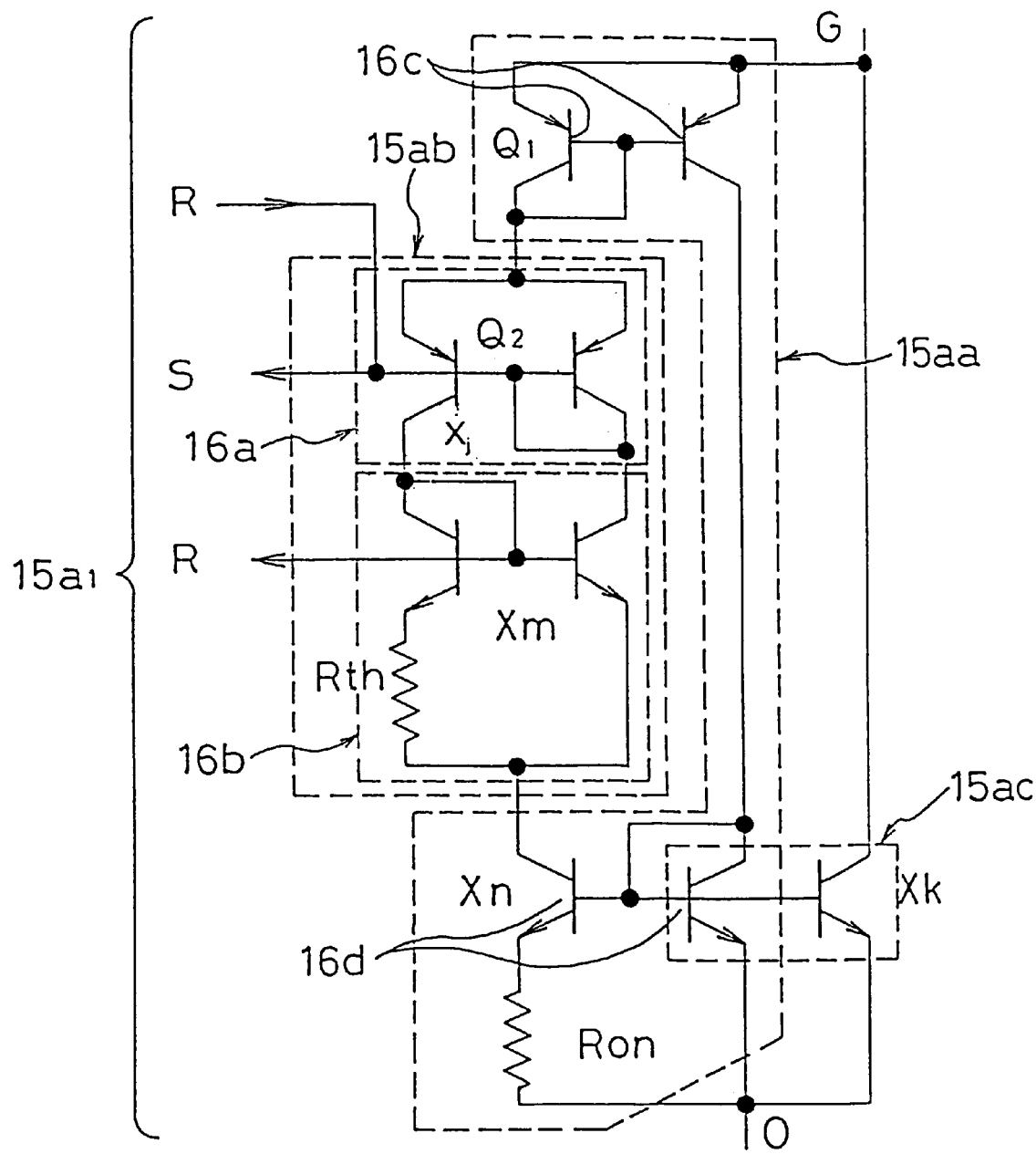
FIGS. 3(A) and 3(B) are circuit diagrams for explaining a concrete example of a switch circuit.
Figure 3B:
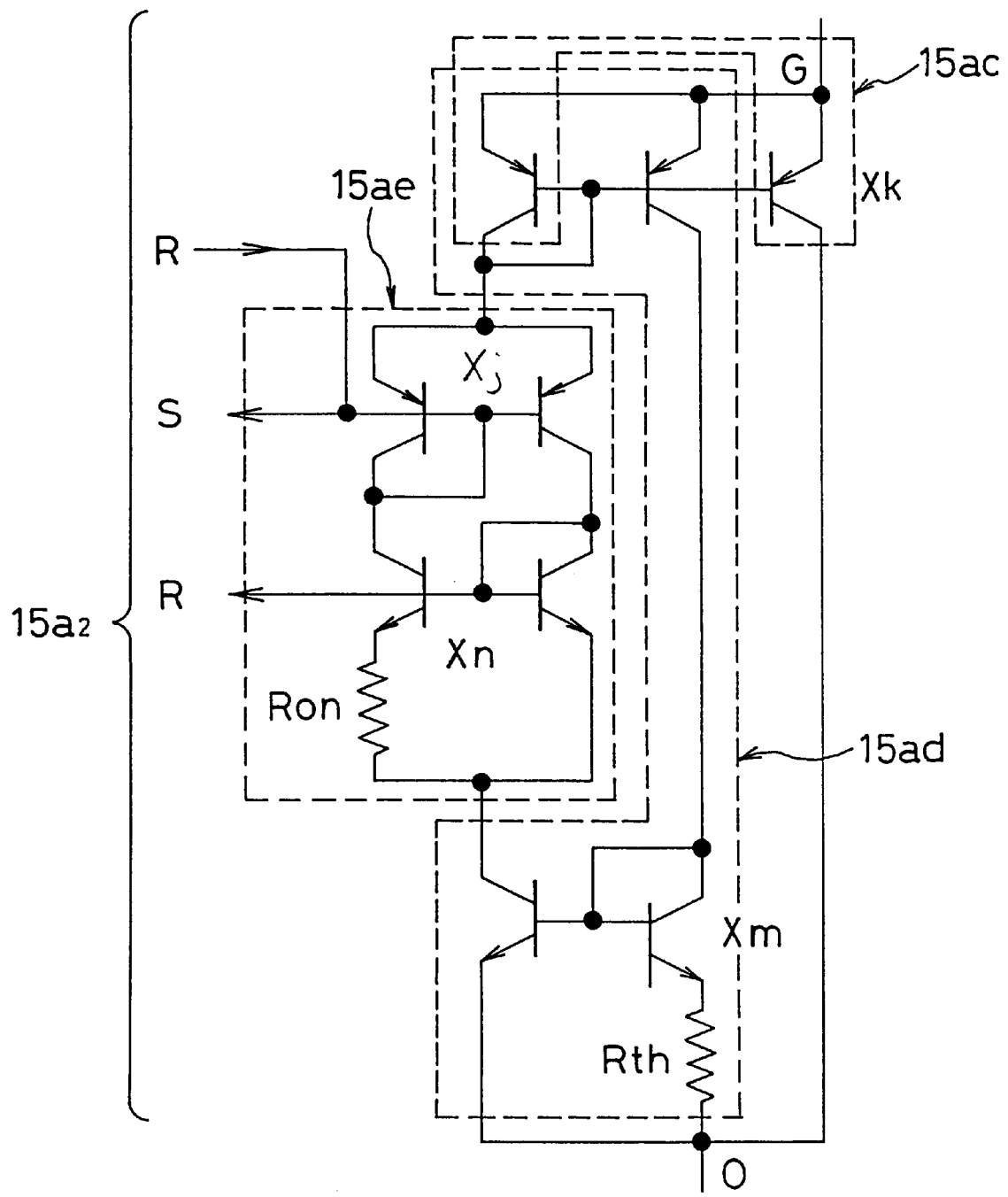
Figure 4:
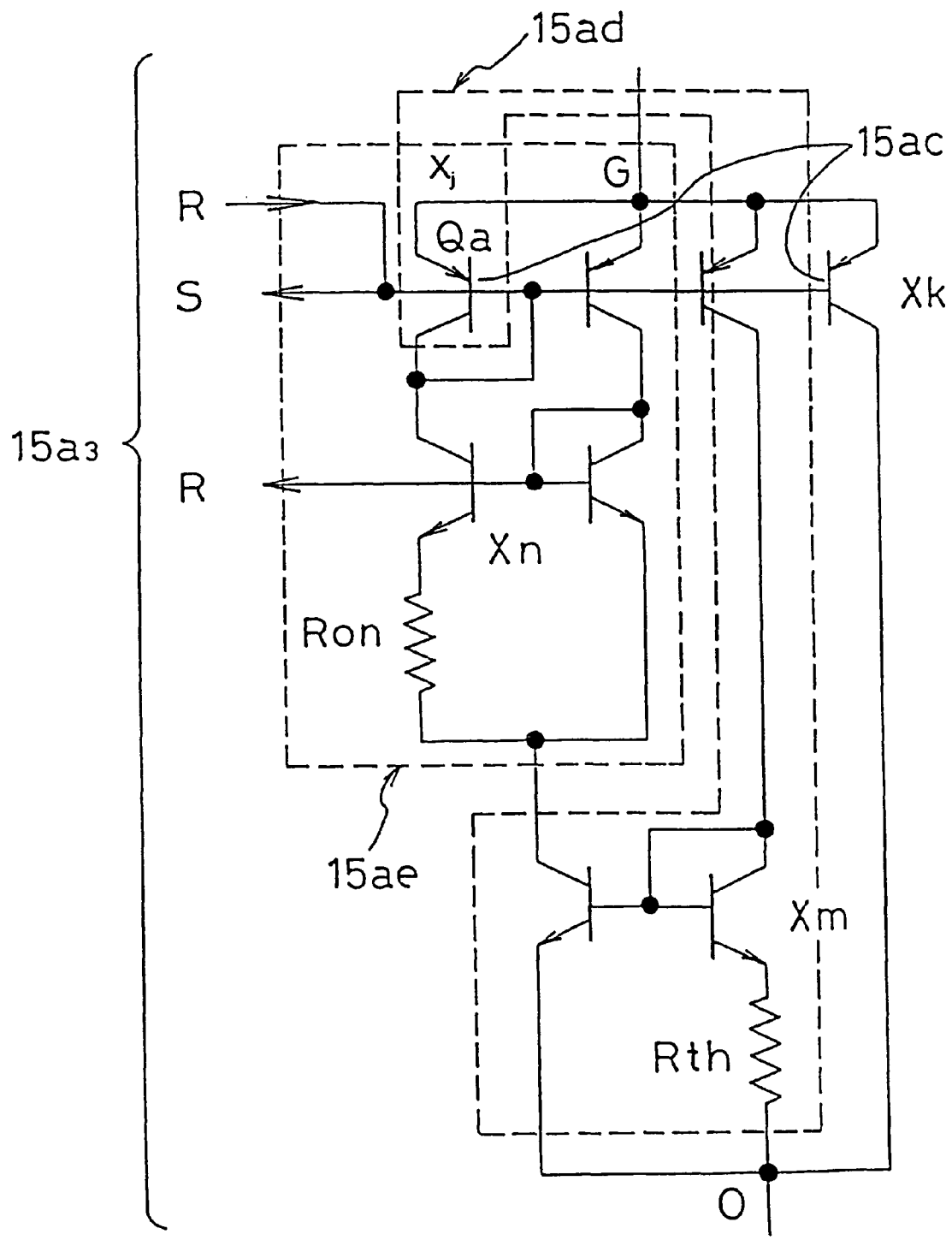
FIGS. 4(A) and 4(B) are circuit diagrams for explaining a concrete example of a switch circuit.
Figure 5:
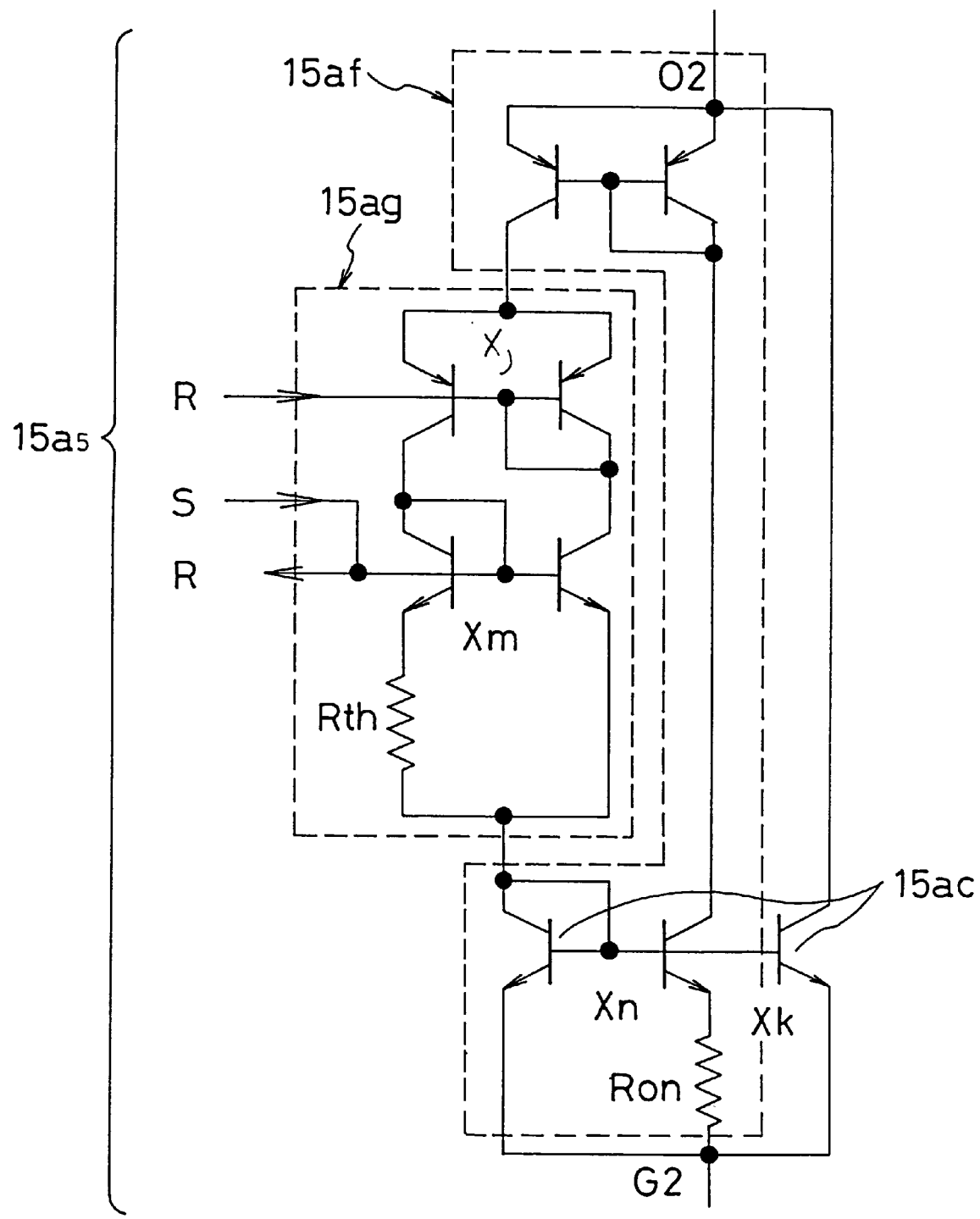
FIG. 5 is a circuit diagram for explaining a concrete example of a switch circuit.

In FIG. 3 through FIG. 5, reference symbols Xj, Xk, Xm, Xn are used for indicating that the emitter size of the transistor designated by such a symbol is j, k, m, or n times as large as that of the transistor not designated by such. Current amplification is carried out by these transistors.

Furthermore, in FIG. 3 through FIG. 5, arrow signs appearing at the reset input terminal R and the set input terminal S as well indicate the direction of the current flow thereat. When the current flows in the direction as indicated by the arrow, the switch circuit enters in the OFF state (reset state) or the ON state (set state) by using that current as the trigger signal.

Still further, in FIG. 3 through FIG. 5, in case the circuit example including a plurality of reset input terminals R, the terminal at which the current flows in the direction as indicated in the figure, may be used as the reset input terminal R depending on the way of assembling the logic.

The switch circuit 15a1 shown in FIG. 3(A) among those which are shown in FIGS. 3 to 5 is a circuit which is formed with a constant current circuit 15aa, a thyristor 15ab which are arranged in a current loop of the constant current circuit 15aa and has the set input terminal S and the reset terminals R, and a current amplifier portion 15ac amplifying the current flowing through the constant current circuit 15aa.

In this case, the thyristor is constituted with a linear current mirror circuit 16a formed of PNP (or NPN) transistors, and a non-linear current amplifier circuit 16b formed of NPN (or PNP) transistors and having a current amplification factor which indicates a minimum value to the input current of around zero and increases according to the increase of the input current. More particularly, the thyristor is formed by connecting the input terminal of the linear current mirror circuit 16a with the output terminal of the non-linear current amplifier circuit 16b, and also connecting the output terminal of the linear current mirror circuit 16a with the input terminal of the non-linear current amplifier circuit 16b, thus the ON/OFF operation being carried out between the common terminals of the current mirror circuit 16a and the non-linear current amplifier circuit 16b. Regarding other thyristors as will be mentioned hereinafter, the basically same constitution as the above will be employed.

The constant current circuit 15aa is constituted with a linear current mirror circuit 16c which is formed of PNP (or NPN) transistors, and a non-linear current amplifier circuit 16d which is formed of NPN (or PNP) transistors and of which the current amplification factor indicates a maximum value to the input current of around zero and decreases according to the increase of the input current. More particularly, the constant current circuit is formed by connecting the input terminal of the current mirror circuit 16c with the output terminal of the non-linear current amplifier circuit 16d, and also connecting the output terminal of the current mirror circuit 16c with the input terminal of the non-linear current amplifier circuit 16d, thus the constant current flowing between the common terminals of the current mirror circuit 16c and the non-linear current amplifier circuit 16d. Regarding other constant current circuit as will be mentioned hereinafter, basically same constitution as the above will be employed. However, in case of the circuit shown in FIG. 3(A), the thyristor 15ab is inserted between the input terminal of the current mirror circuit 16c and the output terminal of the non-linear current amplifier circuit 16d.

However, it should be noted that the invention is not to be limited to the thyristor and the current constant circuit shown in FIG. 3(A) and various modifications may be made by one skilled in the art. For instance, the invention may use various thyristors and constant current circuits which are formed by combining various current mirror circuits shown in FIGS. 32(A) to 32(D), various non-linear current amplifier circuits shown in FIGS. 33(A) to 33(D) (the current amplification factor which indicates a minimum value to the input current of around zero), and various non-linear current amplifier circuits shown in FIGS. 34(A) to 34(D) (the current amplification factor which indicates a maximum value to the input current of around zero). In FIGS. 32 to 34, examples of circuit using only PNP transistors are illustrated, so that there is a case that PNP transistors have to be replaced by NPN transistors in some circuits for forming the thyristor and the constant current circuit. Such circuits will be analogized and made up with ease from FIGS. 32 to 34 so that they are not additionally described here.

In the switch circuit 15a1, it is made possible to always supply a bias voltage to the light receiving element 11 via the set input terminal S, the above bias voltage being made lower than that of the first power source 29 (see FIG. 1) connected with the switch terminal G by the forward voltage drop of the diode portions in transistors Q1, Q2.

Furthermore, in the switch circuit 15a1, when the communication terminating signal SE is outputted from the optical communication circuit 13, a signal SE1 (described later in detail) associated with the terminating signal SE is inputted from the second circuit 17 to the reset input terminal R, thus the thyristor 15ab being turned off. Therefore, the non-connected state takes place between the switch terminals G and O, namely the optical communication apparatus enters in its standby state.

Still further, in the switch circuit 15a1 in the standby state, there flows only the current such as the leakage current through the p-n junctions existing in the circuit, so that the effective power saving can be realized (the same effect is obtainable with respect to switch circuits 15a2 to 15a4).

Even if the optical communication apparatus is in the standby state, the light receiving element 11 is always supplied with the bias voltage based on the first power source 29 through transistors Q1, Q2 of the switch circuit 15a1. Accordingly, even if the optical communication apparatus is in the standby state, the photocurrent Ip is generated by the light receiving element 11 when the optical calling signal comes therein. Also, even if the optical communication circuit 13 is in the OFF state, the flow path of the photocurrent Ip exists in the optical communication apparatus. Some examples of this are shown in FIGS. 6 to 8.

Figure 7A:
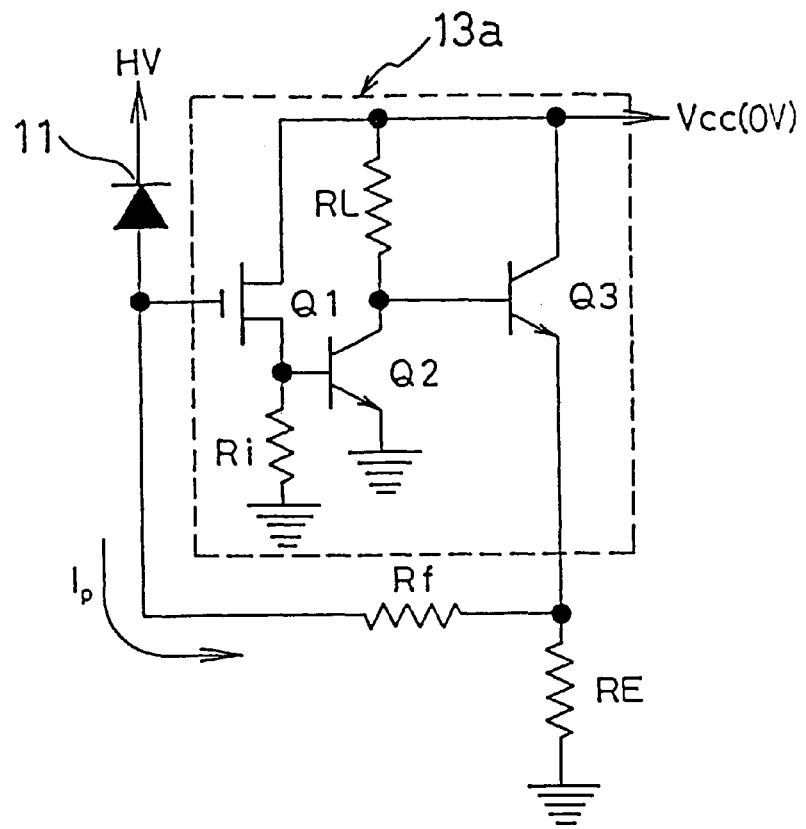
FIGS. 7(A) and 7(B) are diagrams for explaining a current flow path at the time of cutting off a power supply.
Figure 7B:
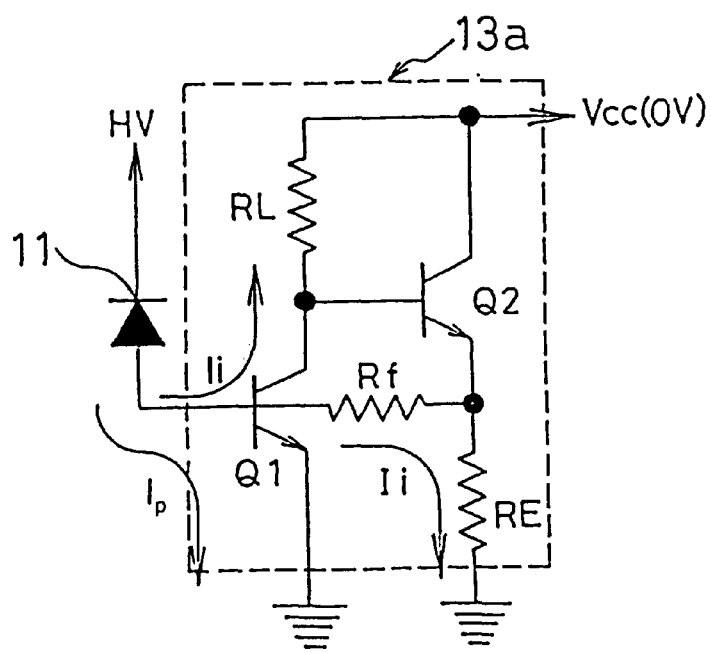
Figure 8:
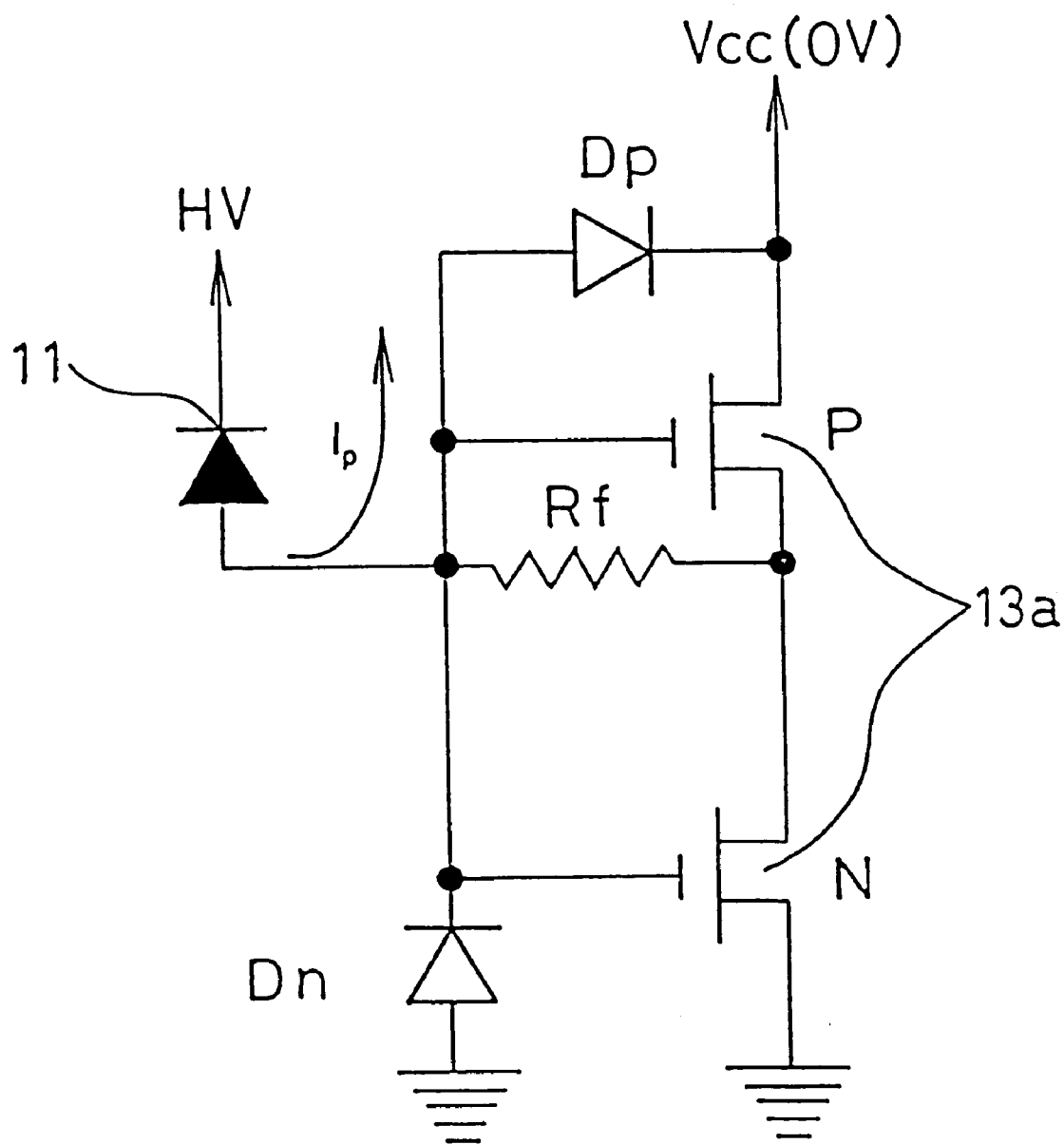
FIG. 8 is a diagram for explaining a current flow path at the time of cutting off a power supply.

All of FIG. 6 through FIG. 8 are illustrated focusing on the circuit portion consisting of the light receiving element 11 and the receiving light amplifier 13a. In FIGS. 6 through FIG. 8, a reference symbol HV indicates that the light receiving element is supplied with the bias voltage while Vcc (0V) indicates that no power is supplied to the receiving amplifier 13a.

FIGS. 7 and 8 show some concrete example circuits of the receiving light amplifier 13a. However, this amplifier is not an essential constituent of the invention, so that the explanation thereof is omitted here.

Figure 6A:
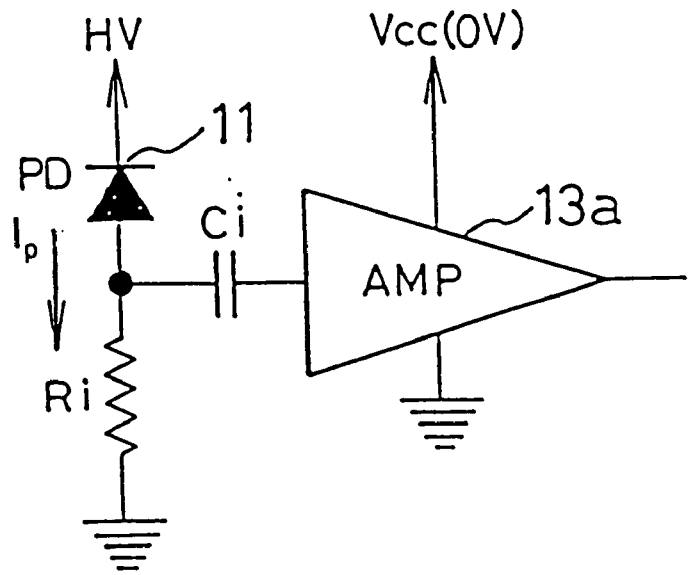
FIGS. 6(A) and 6(B) are diagrams for explaining a current flow path at the time of cutting off a power supply.
Figure 6B:
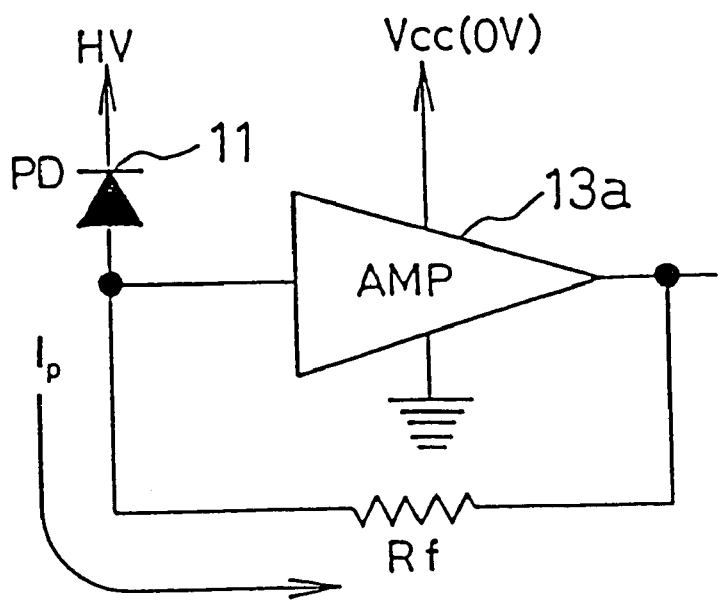

In case of the circuit shown in FIG. 6(A), the photocurrent Ip flows to the ground through an inlet resistance Ri, even though no power is supplied to the amplifier 13a. In case of the circuit shown in FIG. 6(B), the photocurrent Ip flows through a feedback resistance Rf, even though no power is supplied to the amplifier 13a. In case of the circuit shown in FIG. 7(A), the photocurrent Ip flows to the ground through a feedback resistance Rf and an emitter resistance RE, even though no power is supplied to the amplifier 13a.

In case of the circuit shown in FIG. 7(B), the photocurrent Ip flows through the p-n junction of the transistor Q1 provided in the amplifier 13a, even though no power is supplied to the amplifier 13a.

In case of the circuit shown in FIG. 8, the photocurrent Ip flows through an input protecting diode Dp, even though no power is supplied to the amplifier 13a.

As described above, even if no power is supplied to the optical communication circuit 13, the current path for the photocurrent Ip exists, so that if the optical communication apparatus in the standby state receives the optical calling signal, the current flow takes place at the set input terminal S of the thyristor 15ab in the switch circuit 15a1 shown in FIG. 3(A).

With this, the constant current 15aa and the thyristor 15ab are respectively turned on, and the switch terminals G and O of the switch circuit 15a1 becomes conductive, so that the optical communication circuit 13 is supplied with the power from the first power source 29. With this, the optical communication apparatus enters in the communicative state, and the conductive state between the switch terminals G and O is held until the signal SE1 associated with the communication terminating signal SE is inputted from the second circuit 17 to the reset input terminal of the thyristor 5aa.

In case of a circuit such as the switch circuit 15a1 in which the thyristor 15ab is inserted in the current amplifying loop of the constant current circuit 15aa and the set trigger is inputted from the input terminal for simultaneously turning on both circuits, the ON/OF threshold current value is determined by the thyristor 15ab, and the constant current determined by the constant current circuit 15aa flows in the ON state. As the matter of course, the ON/OFF threshold current value is to be set lower than the constant current value in the ON state. This is the same in case of circuits shown in FIG. 3(A), FIG. 4(A) and FIG. 5, respectively.

The above-mentioned constant current characteristic in the switch circuit 15a1 may be used for the purpose of making the load current constant or protecting the load from the excess current (load current lower than the present constant current value), the above load current being turned on/off by the switch circuit 15a1.

Figure 33D:
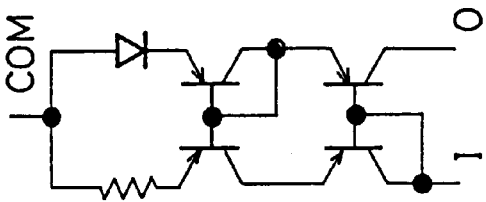
FIGS. 33(A) through 33(D) arc diagram s showing various examples of a non-linear amplifier circuit (having a minimum current amplification factor to the input current of around zero)
Figure 33C:
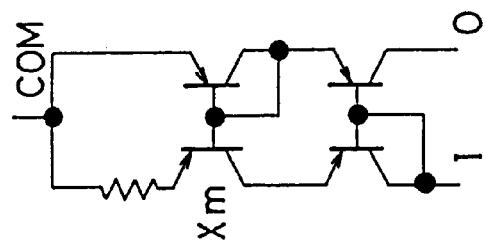
Figure 33B:
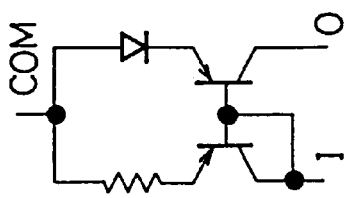
Figure 33A:
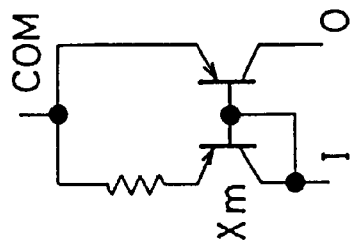
Figures 34A, 34B, 34C, 34D:
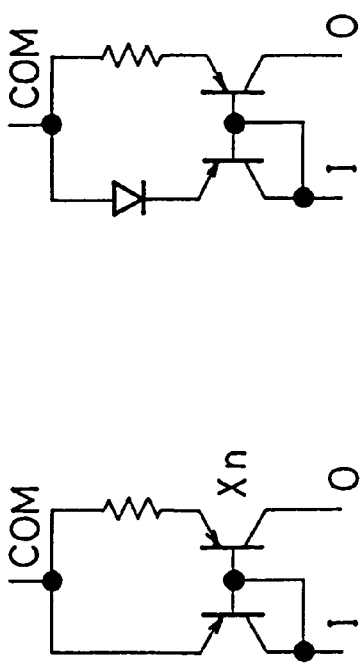
FIG. 34(A) through 34(D) are diagrams showing various examples of a non-linear amplifier circuit (having a maximum current amplification factor to the input current of a round zero)

In case of constituting a circuit like the switch circuit 15a1, it would be better to first prepare the thyristor 15ab consisting of the non-linear current amplifier circuit (described later in detail) and the current mirror circuit which are shown in FIG. 33(A) and FIG. 33(C), respectively, and next, to prepare the constant current circuit 15aa consisting of the non-linear current amplifier (described later in detail) and the current mirror circuit which are shown in FIG. 34(A) and 34(C), respectively, and finally, to achieve the switch circuit 15a1 by using these circuits 15aa and 15ab. When the switch circuit is constituted in this way, the current as set in the constant current circuit and the ON/OFF threshold current can similarly vary in response to the environmental temperature change, so that there can be realized a switch circuit in which a ratio between the ON/OFF threshold current value and the constant current value in the ON state is stabilized against the temperature change. Thus, it becomes possible to realize the switch circuit in which malfunction is hardly caused by noise. The reason for this is as follows.

In case of discussing the malfunction caused by noise in the switch circuit 15a1 or the like, the important points are a ratio between the preset constant current value and the ON/OFF threshold current value and a ratio between the ON/OFF threshold current value and the noise level. In case that the preset constant current value and the ON/OFF threshold current value do not change with the temperature at the same rate, in other words, a ratio between both current values changes with the temperature, it is needed to make the ratio of both current values larger for preventing the malfunction. However, the above two ratios i.e. the ratio between the preset constant current value and the ON/OFF threshold current value and the ratio between the ON/OFF threshold current value and the noise level, have such a relation that increase in the former results in decrease in the latter or vice versa. Accordingly, if the ratio between the preset constant current value and the ON/OFF threshold current value is increased in order to meet some needs, the ratio between the ON/OFF threshold current value and the noise level is decreased by a value as increased, thus resulting in the state where the malfunction is easily caused by noise. Contrary to this, in the switch circuit of the preferred embodiment, as the preset constant current value and the ON/OFF threshold current value change with the temperature at the same rate and the ratio of these current values is made stable. Consequently, this ratio can be made smaller. As a result, the ratio between the ON/OFF threshold current value and the noise level can be made larger. Therefore, it becomes possible to realize the switch circuit in which the malfunction is hardly caused by noise.

Figure 35:
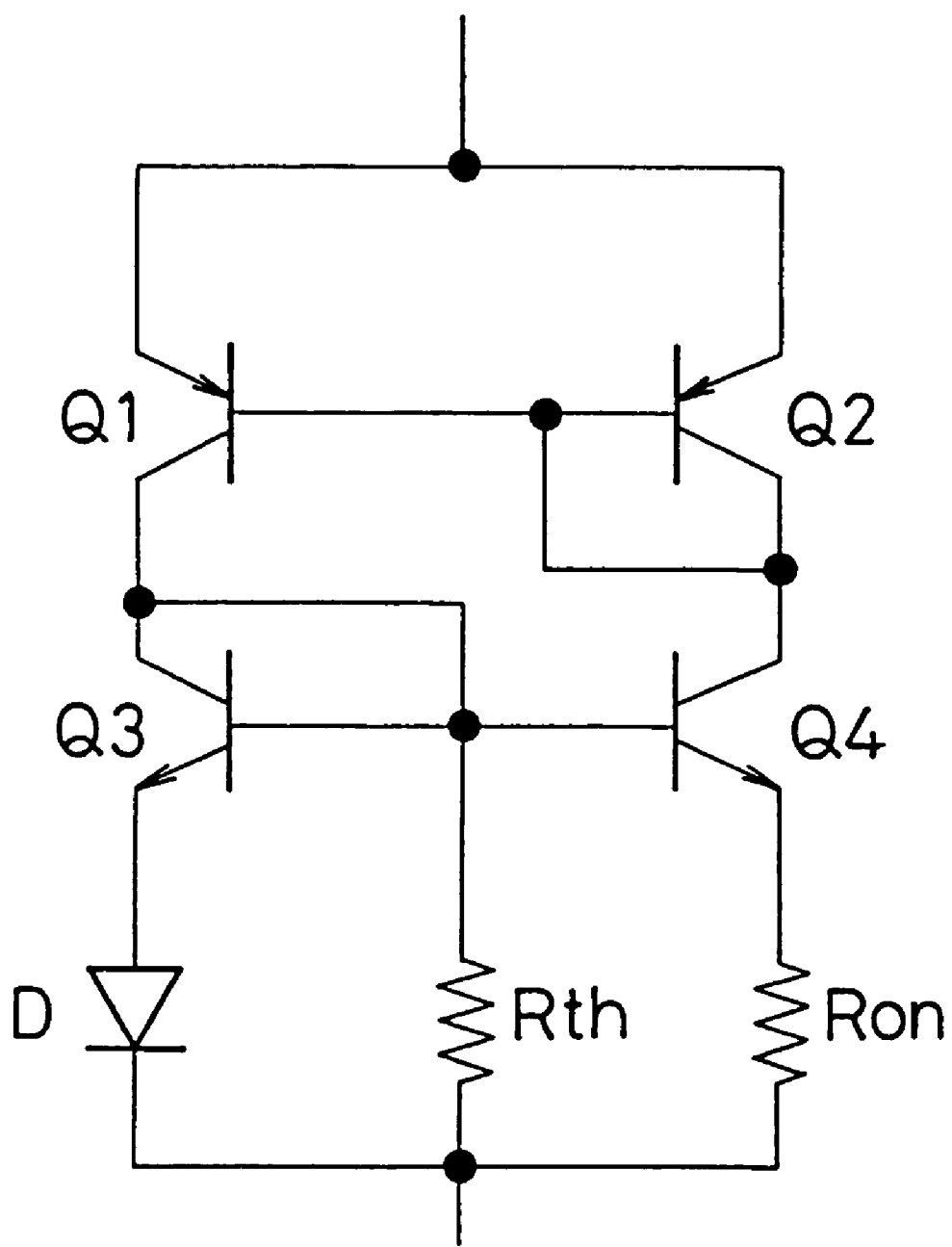
FIG. 35 is a circuit diagram showing an example of the prior art circuit for turning on/off a constant current.

A certain prior art circuit such as shown in FIG. 35, realizes the ON/OFF threshold function as well as the constant current function in the ON state even in a single current amplifier loop. However, in the circuit of FIG. 35, the preset constant current value and the ON/OFF threshold current value do not change with the temperature at the same rate. From the above reasons, if needed to increase the ratio between the preset constant current value and the ON/OFF threshold current value, the ratio between the ON/OFF threshold current value and the noise level can not help being decreased by the value as increased, so that anti-noise characteristic can not be ensured. Thus, the advantage of the above preferred circuit by the invention will be understood from comparison with the circuit shown in FIG. 35.

The circuit explained as the preferred circuit in connection with FIG. 33(A) or FIG. 33(C) is the non-linear current amplifier circuit including two transistors, wherein emitters of two transistors are used as a common terminal while base terminals thereof are connected with each other, and the emitter size of the input side transistor among the two is made m times as large as that of the output side transistor, and furthermore, the resistance is connected in series with the emitter of the input side transistor. This non-linear current amplifier circuit has the minimum amplification factor to the input current of around zero. Also, the circuit shown in FIG. 34(A) or FIG. 34(C) is the non-linear current amplifier circuit including two transistors, wherein emitters of two transistors are used as a common terminal while bases thereof are connected with each other, and the emitter size of the output side transistor among the two is made n times as large as that of the input side transistor, and furthermore, the resistance is connected in series with the emitter of the output side transistor. This non-linear current amplifier circuit has the maximum amplification factor to the input current of around zero.

If the above non-linear current amplifier circuit is combined with the linear current mirror circuit having the current amplification factor of one(1) to constitute the constant current circuit or the thyristor, the preset constant current value Ion of the constant current circuit and the ON/OFF threshold current value Ith of the thyristor are respectively expressed as:

$Ion=(2kT/qRon)ln(n)$ $Ith=(2kT/qRth)ln(m)$ where k: Boltzmann constant, T: absolute temperature, q: electron charge, Ron: emitter resistance in constant current loop side, Rth: emitter resistance of thyristor side, n: ratio emitter size of constant current loop side, and m: ratio of emitter size of thyristor side, and a relation Ion/Ith=constant is achieved.

A switch circuit 15a2 shown in FIG. 3(B) is formed of a thyristor 15ad, a constant current circuit 15ae having a set input terminal S and a reset input terminal R which are provided in the current loop of the thyristor 15ad, and a current amplifier circuit 15ac amplifying the current flowing through the constant current circuit 15ae.

In the switch circuit 15a2, the set and reset operation is controlled by the thyristor 15ad while the constant current operation is controlled by the constant current circuit 15ae. The supply of the bias voltage to the light receiving element 11 and the ON/OFF operation of the switch circuit are carried out according to the same principle as in the circuit explained referring to FIG. 3(A).

A switch circuit 15a3 shown in FIG. 4(A) is arranged such that a transistor Qa can serve on behalf of some transistors included in each of the thyristor 15ad and the constant current circuit 15ae of the switch circuit 15a2 shown in FIG. 3(B). This switch circuit 15a3 can be formed with the less number of constituent elements comparing with the switch circuit 15a2 and can make its minimum operational voltage smaller.

In this switch circuit 15a3, the supply of the bias voltage to the light receiving element 11 and the ON/OFF operation of the switch circuit are carried out also in accordance with the same principle as in the circuit explained referring to FIG. 3(A).

Figure 4B:
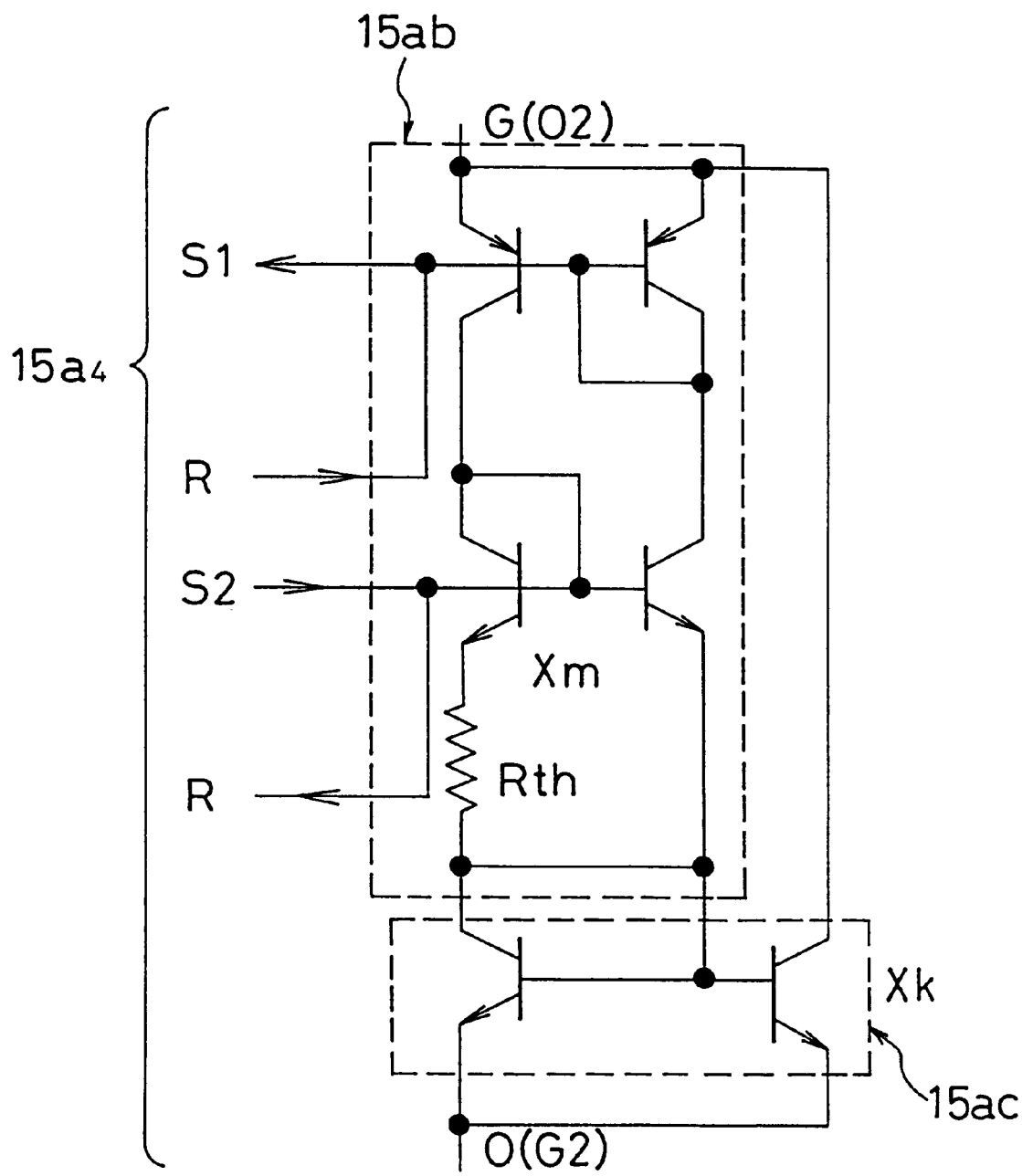

A switch circuit 15a4 shown in FIG. 4(B) is formed of a thyristor 15ab and a current amplifying portion 15ac for amplifying the current of the thyristor 15ab. This circuit 15a4 is achieved by just omitting the constant current circuit 15ab from the switch circuit 15a1 shown in FIG. 3(A). The switch circuit 15a4 has the function of doing switching operation between the terminals G and O, but has no function of making the constant current.

This switch circuit 15a4 can be used in two ways, (1) one way is to connect its current outlet terminal (0(G2)) with a load to be driven (optical communication circuit 13), and to connect its current inlet terminal (G(02)) with the plus(+) power source, thereby using the set input terminal S1 or S2 in the figure as the set input terminal; and (2) the other way is to connect its current output terminal (0(G2)) with minus (−) power source, and to connect its current inlet terminal (G(02)) with a load to be driven, thereby using the set input terminal S1 or S2 in the figure as the set input terminal.

In case of the above first way in which the set input terminal S1 is used as the set input terminal S, the cathode of the light receiving element 11 is connected so as to be on the switch circuit side while the anode of the same is connected so as to be on the optical communication circuit side. That is, the first way is the way of use adaptable to the optical communication apparatus shown in FIG. 1.

On one hand, in case of the second way in which the set input terminal S2 is used as the set input terminal S, the anode of the light receiving element 11 is connected so as to be on the switch circuit side while the cathode of the same is connected so as to be on the optical communication circuit side. That is, the second way is the way of use adaptable to the optical communication apparatus wherein the first power source 29 is used as a minus(−) power source, for instance the optical communication apparatus shown in FIG. 9.

In case of constructing an optical communication apparatus, a plus(+) power source is not always employed for the optical communication circuit. There may be a case where a minus(−) power source is used therefor in some cases. The switch circuit 15a4 shown in FIG. 4(B) can comply with both of the plus(+) power source and the minus(−) power source. Also, in case of the switch circuit 15a4 of FIG. 4(B), it is possible to always supply the bias voltage to the light receiving element 11 by making use of the forward directed p-n junctions of transistors intervening between the set input terminal S1 (S2) and the switch terminal G (G2).

Figure 9:
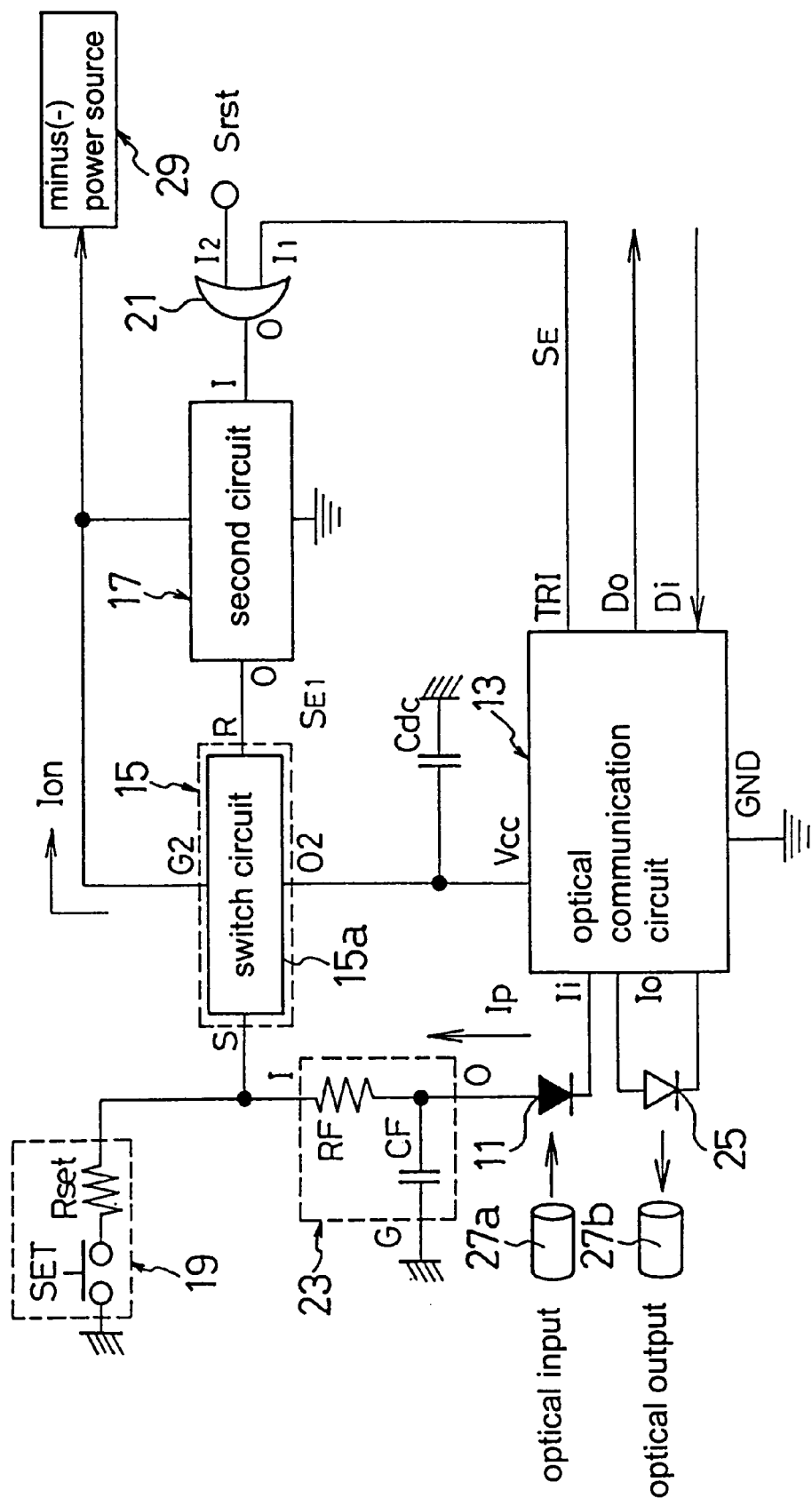
FIG. 9 is a block diagram for explaining another constitution of an optical communication apparatus according to the first embodiment of the invention.

A switch circuit 15a5 shown in FIG. 5 is the switch circuit adaptable to the optical communication apparatus shown in FIG. 9. That is, this switch circuit can be used for the optical communication apparatus in which a minus(−) power source is used as the first power source 29, and the connecting direction of the light receiving element 11 is made opposite to the case shown in FIG. 1. The switch circuit 15a5 has both functions of switch and constant current generation.

The switch circuit 15a5 of FIG. 5 is formed of a constant current circuit 15af, a thyristor 15ag which is provided in the loop of the constant current circuit 15af and has a set input terminal S and a reset input terminal R, and a current amplifying portion 15ac for amplifying the current flowing in the constant current circuit 15af. In case of the switch circuit 15a5 shown in FIG. 5, the current input node of the thyristor i.e. the base of the NPN transistor is used as the set input terminal S. Also, in case of this switch circuit 15a5, it is possible to always supply the bias voltage to the light receiving element 11 by making use of the forward directed p-n junctions of NPN transistors intervening between the set input terminal S and the switch terminal G2.

Next, the second circuit will be explained in the following. The second circuit 17 is a circuit which converts the communication terminating signal SE outputted by the optical communication circuit 13 into a signal matched with the form of the first circuit 15, and outputs the converted signal to the reset input terminal R of the first circuit 15 as a signal SE1 associated with the communication terminating signal SE.

In general, the control portion of the optical communication circuit 13 is constituted as a digital circuit. On one hand, the first circuit 15 is a circuit which operates to make the power source turn on/off and to supply the bias voltage to the light receiving element 11, so that it is constituted as a circuit having the ground potential and input voltage level necessary for its operation, which are different from those needed for the operation of the digital circuit. Therefore, the matching between both circuits is likely to become poor. For this, it is preferable to provide the second circuit 17 as a interface circuit therebetween. Here, the signal matched with the form of the first circuit 15 means the signal which can surely reset the first circuit 15.

The second circuit 17 may be arranged with any arbitrary and preferable circuit if it provides the functions as mentioned above. It is preferable, however, that the second circuit 17 is formed by a thyristor or a monostable multivibrator which will be explained later. Because each of these circuits has the above-mentioned functions as the second circuit and realizes the effective power saving.

Figure 10:
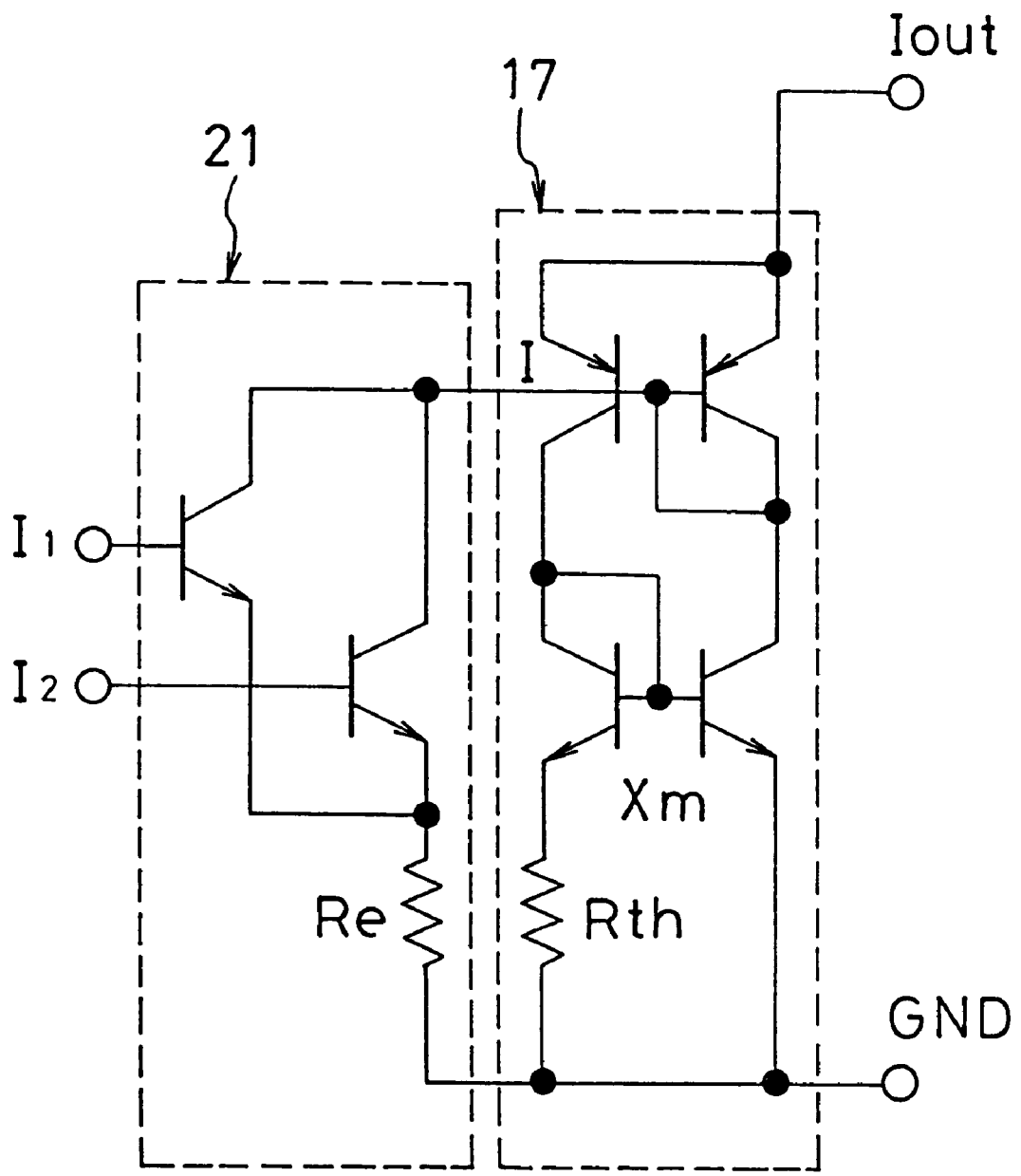
FIGS. 10 and 11 are a circuit diagram for explaining the second and fourth circuits.

FIG. 10 shows an example of a thyristor forming the second circuit along with an OR circuit as the fourth circuit 21. The thyristor 17 is constituted, alike the case as explained referring to FIG. 3(A), with a linear current mirror circuit and a non-linear current amplifier circuit of which the amplification factor indicates a minimum value to the input current of around zero.

When the thyristor 17 receives the communication terminating signal SE at its input terminal I, the thyristor is then triggered to turn on and continues to output the signal SE1 toward the reset input terminal of the switch circuit 15a until turning off the switch circuit 15a itself. Accordingly, the thyristor 17 ensures the turning off of the first circuit, if so desired. While the thyristor is turned off, the current flowing through the p-n junctions is at most the leakage current thereof, so that the effective power saving can be obtained.

Figure 11:
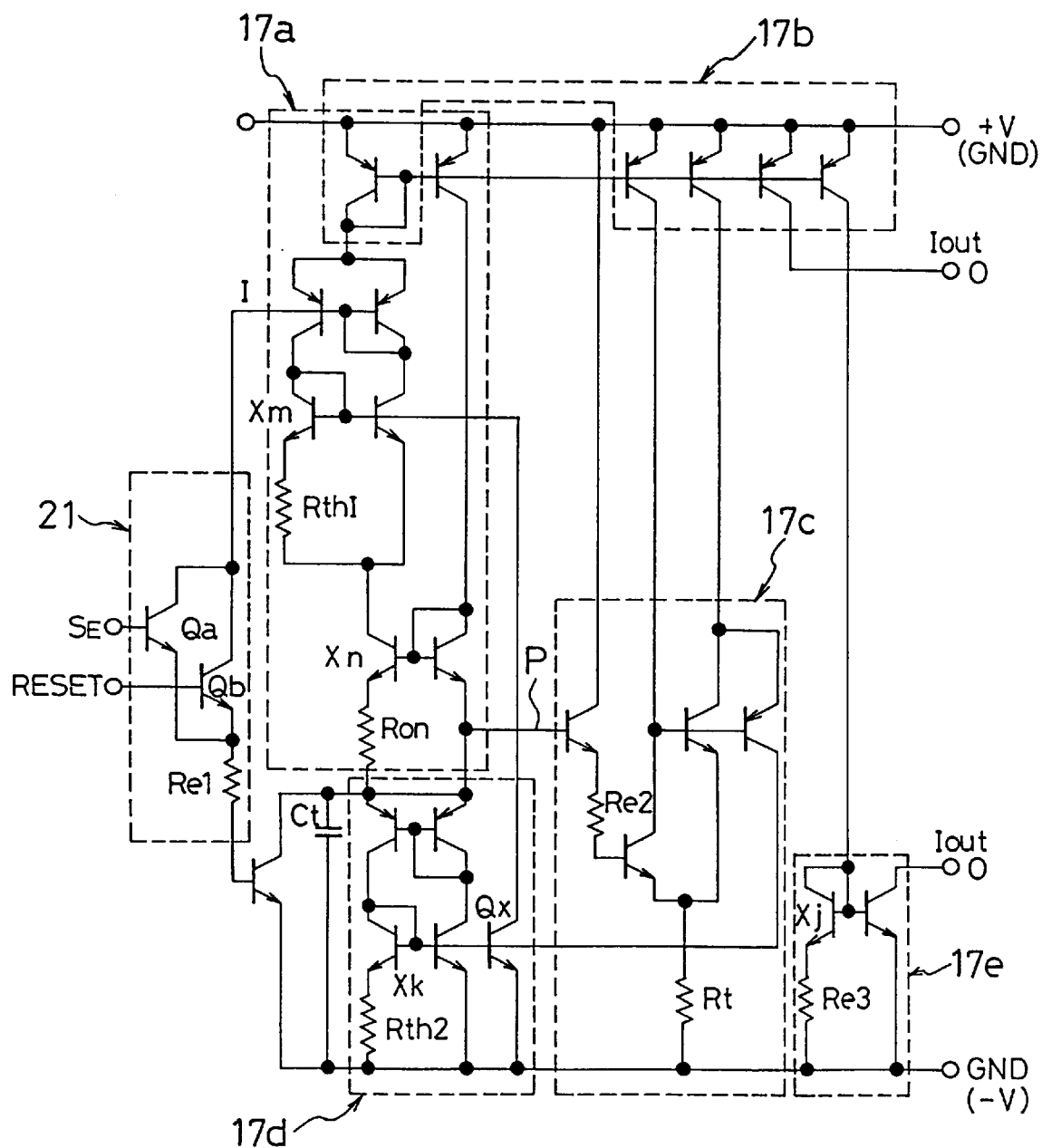

FIG. 11 is a circuit diagram showing a monostable multivibrator which can be preferably used as the second circuit 17 of another type. This figure also includes the OR circuit as the fourth circuit 21.

The monostable multivibrator as the second circuit is formed of: a constant current circuit 17a which is turned on by the communication terminating signal SE; a condenser Ct charged by the constant current circuit 17a; a current mirror circuit 17b receiving the output from the constant current circuit 17a; a Schmitt trigger circuit 17c which is operated by using a load as the output of the current mirror circuit 17b and receives the voltage between the terminals of the condenser Ct; a current folding circuit 17e (explained in detail later) forming an inverted output from the output of the current mirror circuit; and a thyristor built-in circuit portion 17d including a thyristor which is turned on by the output of the Schimtt trigger circuit 17c, then turns off the constant current circuit 17a, and has the condenser Ct discharged. This thyristor built-in portion 17d is formed of a thyristor and a transistor Qx which is turned on together with the thyristor, and turns off the constant current circuit 17a.

In case of using the monostable multivibrator with the plus(+) power source, the node +V of FIG. 11 is connected with the plus(+) power source while the node GND of FIG. 11 is connected with the ground terminal of the optical communication apparatus. In case of using the monostable multivibrator with the minus(−) power source, the node (−V) of FIG. 11 is connected with the minus(−) power source while the node (GND) of FIG. 11 is connected with the ground terminal of the optical communication apparatus. However, in case of using the monostable multivibrator with the minus(−) power source, it is also possible to operate the circuit of FIG. 11 if the circuit is arranged such that the p-n polarity of each transistor and the direction of the current flowing through respective circuit portions are inverted, and the node +V is connected with the minus(−) power source while the node GND is connected with the ground terminal of the optical communication apparatus. The current folding circuit 17e is a circuit for forming a current input/output (O bar), and it may be omitted if unnecessary in connection with the first circuit 15.

This monostable multivibrator operates as follows.

When the communication terminating signal SE is inputted to the input terminal I as the trigger, the constant current circuit 17a is turned on. With this, the current mirror circuit 17b is turned on and the condenser Ct begins to be charged, too. As the current mirror circuit 17b is turned on, the output current Iout is outputted form output terminals O and O bar. The characteristic of the output 0 bar is made different depending on whether the current folding circuit 17e is constituted with the linear current mirror circuit or the non-linear current mirror circuit. FIG. 11 shows an example of the non-linear current amplifier circuit. Either the output terminal O or O bar is connected with the first circuit 15 depending on whether the signal SE1 is the signal of the current flow-out type or the current flow-in type to the first circuit 15. With this, the output current Iout is inputted to the reset input terminal R of the first circuit 15.

When the constant current circuit 17a and the current mirror circuit 17b are turned on, the Schmitt trigger circuit 17c is turned on, too. At this stage, however, as the input (P) of the Schmitt trigger circuit 17c is at L-level, the output thereof is also at L-level (output current: zero).

When the input level of the Schmitt trigger circuit 17c reaches H-level exceeding its threshold value with the progress of charging the condenser Ct, the output level thereof becomes H-level, too. When the output of the Schmitt trigger circuit 17c become H-level (outputting the current determined by the current mirror circuit 17b), the thyristor of the thyristor built-in circuit portion 17d is turned on. With this, the transistor Qx is turned on, so that the constant current circuit 17a is turned off, thereby the output current Iout being shut off.

As described above, the monostable multivibrator outputs the signal SE1 i.e. the output current Iout to the first circuit 15 for a preset period of time by making use of the communication terminating signal SE as the trigger. A period of time the output current Iout can stay in the ON state after it has been once turned on, namely the pulse width of the signal SE1, can be determined by the charging speed of the condenser Ct which is determined by the resistance Ron and the condenser Ct provided in the current constant circuit 17a, and the resistance Rt which determines the threshold value in the Schmitt trigger circuit 17d. Accordingly, the pulse width of the signal SE is determined by selecting the capacitance of the condenser Ct, the resistance values of resistances Ron, Rt, etc. such that the first circuit 15 surely be in the off state.

When the constant current circuit 17a is turned off, the current mirror circuit 17b is turned off, too. Therefore, no load current is supplied to the Schmitt trigger circuit 17c, so that it is turned off. At this time, as the thyristor 17d is turned off, the condenser Ct begins to discharge. When this discharge is over, the monostable multivibrator enters in its standby state. In the monostable multivibrator in the standby state, the current flowing therethrough becomes substantially zero, thus the effective power saving being obtained.

If the communication terminating signal SE outputted from the optical communication circuit 13 has a signal of the type capable of turning off the first circuit 15, it is possible to omit the second circuit 17.

Next, the third circuit 19 will be described in the following. The third circuit 19 serves to connect the first power source 29 with the power source terminal Vcc of the optical communication circuit 13 with the help of the external control, regardless of presence or not of the optical calling signal. This third circuit 19 is used for keeping the optical communication apparatus always in the receivable state, or for performing the transmission in case of the optical communication apparatus has the function of transmission (the embodiment as shown herein).

The third circuit 19 may be constituted with any arbitrary and preferable circuit. The third circuit 19 shown in FIG. 11 is an example constituted with a serial circuit formed of a switch SET of the normally off type connected in series with current limiting resistance RSET. The one end of the serial circuit is connected with the set input terminal S of the first circuit 15 while the other end is connected with the ground terminal of the optical communication apparatus.

The switch SET being turned on, the current flow-out takes place at the set input terminal S of the first circuit 15. Namely, this is the same state that the optical calling signal is received by the light receiving element 11. Accordingly, as the first circuit 15 is turned on, the optical communication apparatus becomes operable for communication. The ON state of the first circuit 15 is held until the signal SE1 associated with the communication terminating signal SE is input to the reset input terminal R of the first circuit 15.

Figure 12:
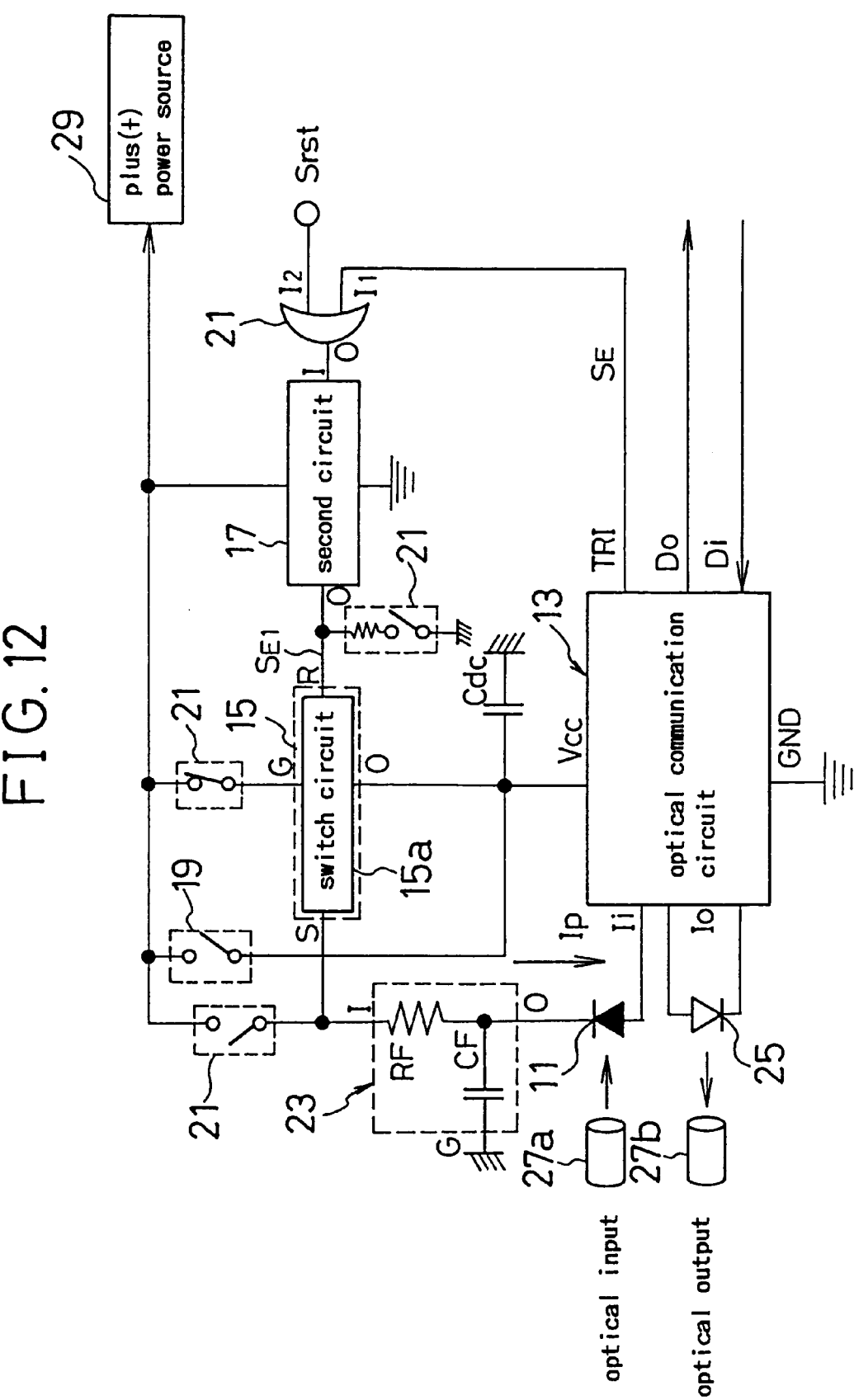
FIG. 12 is a block diagram for explaining still another constitution of an optical communication apparatus according to the first embodiment of the invention.

The third circuit 19 may be formed, as shown in FIG. 12, by inserting a manually operable switch biasing the first circuit 15 between the first power source 29 and the power source terminal Vcc of the optical communication circuit 13, in place of the serial circuit formed of the normally off type switch SET and the current limiting resistance RSET. In this case, however, the manual switch has to be turned off by hand for keeping the optical communication apparatus in the standby state.

In the above, it is explained the switch in the third circuit is manually operated, but if the control output of the peripheral devices connected with the optical communication circuit is used, the ON/OFF operation of the power source for the optical communication circuit may be carried out by the peripheral devices.

Next, the fourth circuit 21 will be explained in the following. The fourth circuit 21 serves to disconnect the first power source 29 from the optical communication circuit 13 with the help of the external control, regardless of presence or not of the communication terminating signal.

The fourth circuit 21 may be constituted with any arbitrary and preferable circuit. For instance, the fourth circuit maybe constituted by inserting a serial circuit formed of a current limiting resistance and a manually operable switch between the reset terminal R of the first circuit 15 and the plus(+) power source (or the ground terminal). The first circuit 15 can be turned off by keeping this manual switch in the on state for a period of time enough to turn off it.

Also, the first circuit 15 can be turned off by the following way, namely providing a manual switch of the normally ON type between the first circuit 15 and the first power source 29 to connect with both of them, and once shutting off the current flowing in the first circuit 15 by turning off the switch when needed.

The more practical fourth circuit is an OR circuit shown in FIG. 1 and FIG. 11. As shown in FIG. 11, this OR circuit includes two NPN transistors Qa and Qb which are connected in parallel with each other. In this case, the communication terminating signal SE is inputted from the optical communication circuit 13 to the base of one transistor while the signal equivalent to the communication terminating signal (called as external reset signal Srst) is inputted to the base of the other transistor. In case of this OR circuit, each collector of the transistor Qa and Qb are connected with the input terminal I of the second circuit 17.

It may be allowed to provide a plurality of the fourth circuits 21 in the optical communication apparatus. FIG. 12 shows an example with four of the fourth circuits 21. In this case, it may be allowed to use solely the fourth circuit or to use a plurality of the fourth circuits for giving priority between the third circuit 21 shod the fourth one.

Figure 13:
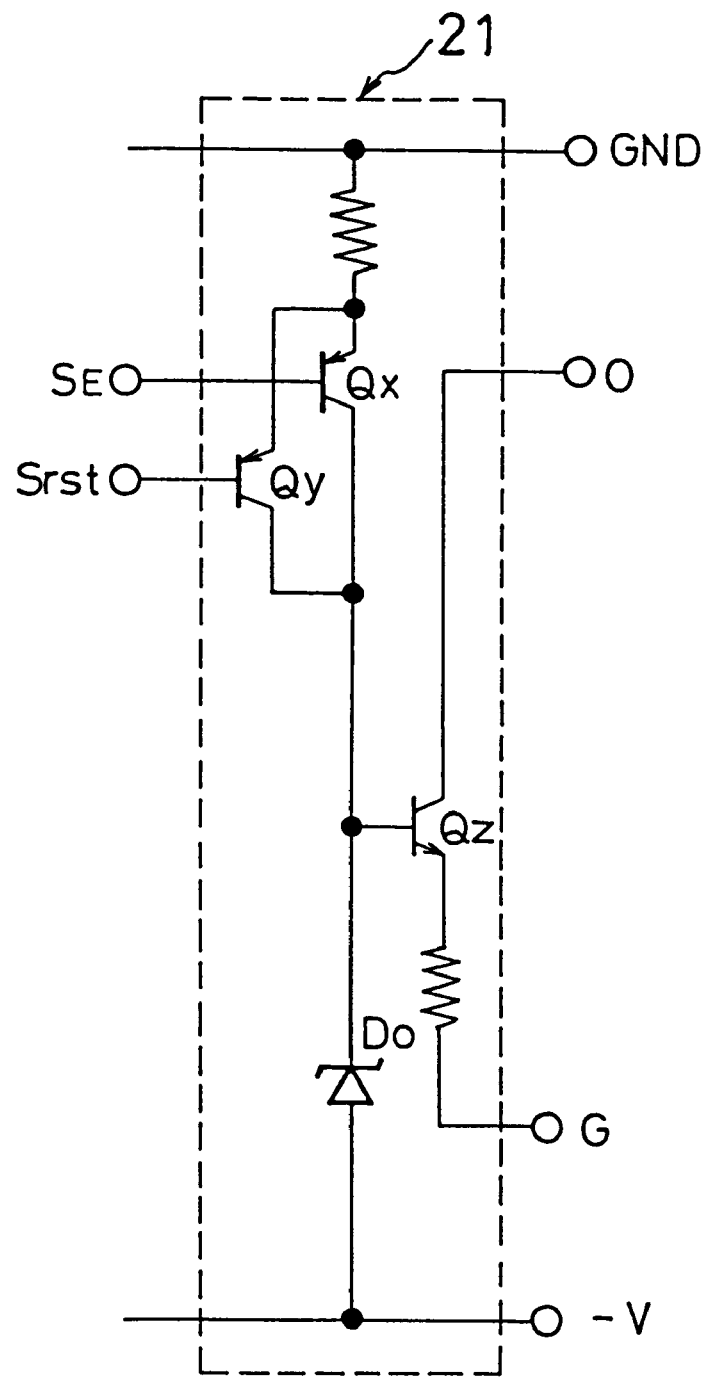
FIG. 13 is a circuit diagram for explaining another fourth circuit.

The OR circuit 21 shown in FIG. 11 is a preferable circuit to be used for connecting the monostable multivibrator 17 as the second circuit 17 with the plus(+) power source. On one hand, the OR circuit 21 shown in FIG. 13 is used for connecting the multivibrator 17 as the second circuit 17 with the minus(−) power source. That is, this OR circuit includes two PNP transistors Qx and Qy which are connected in parallel with each other, a constant voltage diode Do connected in series with these transistors, and a NPN transistor Qz of which the base is connected with the cathode of the diode Do. In this case, the communication terminating signal SE is inputted from the optical communication circuit 13 to the base of either one of two PNP transistors Qx and Qy While the external reset signal Srst is inputted to the base of the other transistor. The collector of the transistor Qz is connected with the input terminal I of the second circuit 17.

In case that the first circuit 15 is turned on by its malfunction caused by noise or others, the external reset input signal Srst is inputted to the fourth circuit 21 shown in FIG. 1 or 13. With this signal, the second circuit 17 is triggered to output the signal SE1 associated with the communication terminating signal to the reset input terminal R of the first circuit 15. Therefore, the first circuit 15 can be turned off regardless of the communication terminating signal SE.

If the optical communication apparatus is constituted such that the control output of the peripheral device connected therewith can be inputted as the external reset signal Srst to the fourth circuit, the turn-off control of the power source for the optical communication apparatus can be controlled by the peripheral device. As the other way of performing the turn-off control of the power source for the optical communication apparatus by its peripheral device, it is possible to output (intervening output) the communication terminating signal SE from the terminal TRI of the control portion 13c by making use of the control signal in the input terminal group Di of the optical communication circuit 13 shown in FIG. 2.

Next, the low-pass filter 23 will be explained in the following. The purpose of providing this filter 23 is as follows. In case that the photodiode and the photo avalanche diode are used as the light receiving element 11, if the bias voltage of the light receiving element 11 is abruptly varied during the optical communication, the charge/discharge current is generated at the p-n junction capacitance of the photodiode and is superposed on the photocurrent (receiving photocurrent), thereby causing the noise current. The low-pass filter 23 prevents this noise current.

The low-pass filter 23 is provided between the input terminal Ii of the light receiving element 11 and the set input terminal S of the switch circuit 15. In this example, there is provided between the light receiving element 11 and the set input terminal S of the switch circuit 15, a low-pass filter of the first order type which consists of a condenser CF and a resistance RF. If a low-pass filter of the high order type is used in place of the first order type low-pass filter, the characteristic of noise attenuation may be further improved. This low-pass filter 23 may be omitted if the photocurrent is much larger than the noise current or there is no need for the noise current to be taken account of.

The light emitting element 25 is used for transmitting optical signals and maybe constituted with an arbitrary and preferable element such as a light emitting diode and a semiconductor laser. This light emitting element 25 is driven by the light emitting element driving circuit 13d which is included in the optical communication circuit 13. The optical signal generated by the light emitting element 25 is transmitted outward through the optical fiber 27b, for instance.

It is also possible to constitute the optical communication apparatus such that the optical signal is transmitted and received though a single optical fiber by differentiating the wave length of the signal for transmission from the one for receiving, or controlling the timing of transmission and receiving. The light emitting element 25 and circuit portions associated therewith may be omitted if the optical communication apparatus is exclusively used for receiving.

Second Embodiment

In the next, the second embodiment will be described by way of an example in which the first circuit 15 is constituted by a circuit including the switch circuit 15b and a current folding circuit 15c.

Figure 14:
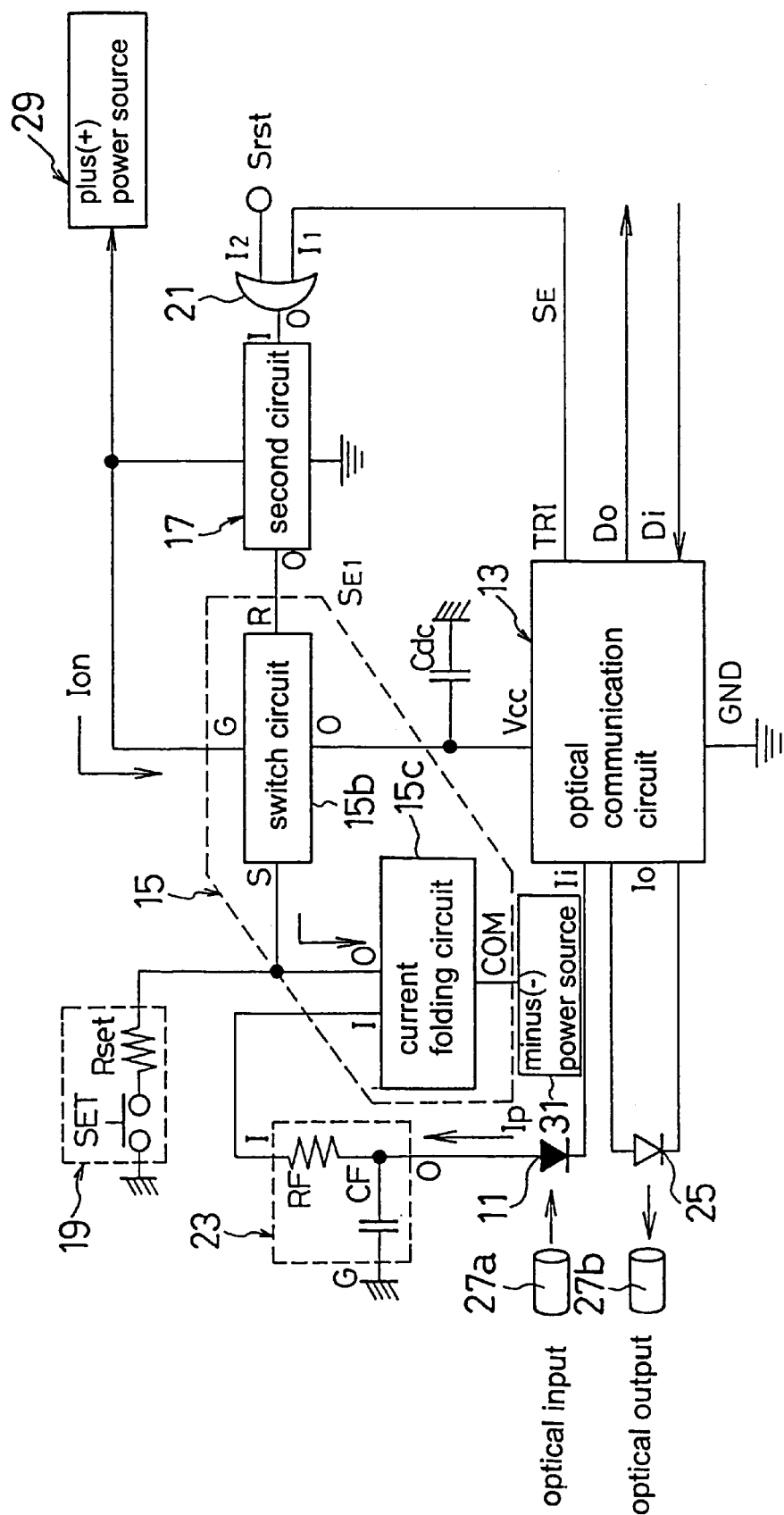
FIG. 14 is a block diagram for explaining the constitution of an optical communication apparatus according to the second embodiment of the invention.

FIG. 14 shows an example of the optical communication apparatus having such a constitution. Especially, in this case, the current folding circuit 15c is adopted in order that the plus(+) power source 29 can be used as a power source for the optical communication circuit 13 and also that the minus(−) power source 31 can be used as a bias supplying power source for the light receiving element 11.

The components constituting the optical communication apparatus as show in FIG. 14 and the connected relation between them are identical to those in the first embodiment except that the light receiving element 11 is connected with the switch circuit 15b through the current folding circuit 15c, that the light receiving element 11 is connected with neighbor parts with the polarity opposite to the case of FIG. 1, and that the minus(−) power source 31 serves as the power source for the light receiving element 11. Therefore, the following description will be made just focusing on the points different from the first embodiment.

First, the switch circuit 15b has at least the first to the fourth terminals alike the case of the first embodiment, i.e. a switch terminal G, a set input terminal S, a switch terminal O, and a reset input terminal R. The switch terminal G is connected with the first power source (shown as plus(+) power source 29 in FIG. 14), the set input terminal S is connected with the output terminal O of the current folding circuit 15c, the switch terminal O is connected with the power source terminal Vcc of the optical communication circuit 13, and the reset input terminal R is connected with the output terminal O of the second circuit 17.

Furthermore, the switch circuit 15b has the function of introducing the conductive state between switch terminals G and O by making using of, as the trigger signal thereto, the photocurrent Ip which flows through the current folding circuit 15c when the optical calling signal is received by the light receiving element 11, and the function capable of holding the above conductive state until the communication terminating signal SE or the signal SE1 associated therewith is inputted to the reset input terminal R.

This switch circuit 15b may be constituted with one of switch circuits 15a1 to 15a4 as described with reference to FIGS. 3 through 4(B).

The current folding circuit 15c includes an input terminal I, an output terminal O, and a common terminal COM through which the total current of the currents flowing through the input and output terminals flows, and the current flowing through the output terminal O is caused by the current flowing through the input terminal I.

The input terminal I of the current folding circuit 15c is connected with the bias terminal (anode) of the light receiving 11. In this instance, the input terminal I is connected with the anode of the light receiving element 11 through a low-pass filter 23. As has been explained already, the low-pass filler 23 may be of course omitted depending on the case.

Furthermore, the output terminal O of the current folding circuit 15c is connected with the set input terminal S of the switch circuit 15b. The common terminal COM of the current folding circuit 15c is connected with the minus(−) power source 31 as the bias voltage supplying source.

Figure 15A:
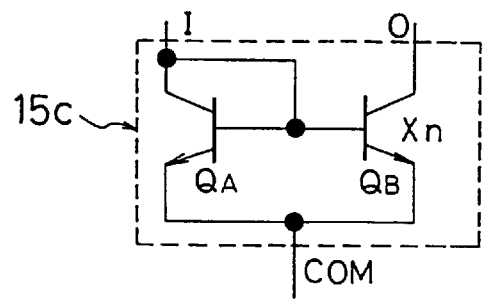
FIGS. 15(A) through 15(C) are diagrams for explaining a current folding circuit.
Figure 15B:
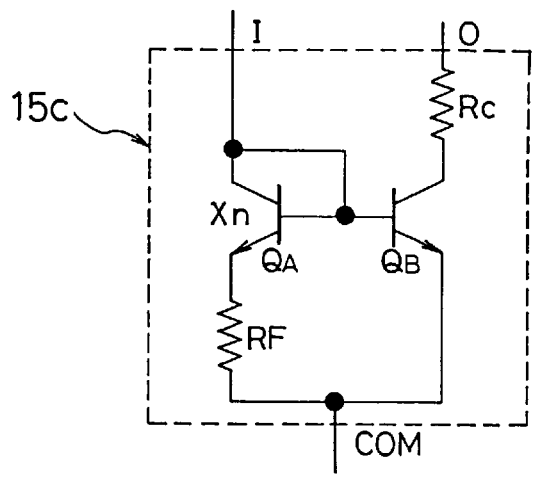
Figure 15C:
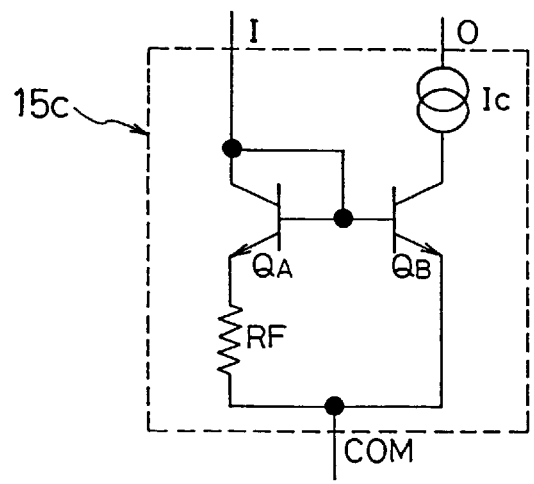

FIG. 15(A) through FIG. 15(C) indicates concrete examples of the current folding circuit 15c. The current folding circuit 15c shown in FIG. 15(A) is constituted as a linear current amplifier circuit which includes an input terminal I, an output terminal O which outputs the current resulting from linearly amplifying the current flowing through the input terminal 1. The current folding circuits 15c respectively indicated in FIG. 15(B) and 15(C) are constituted with a non-linear current amplifier circuit of which the amplification factor indicates a minimum value to the input current of around zero, and increases with the increase of the input current, and a resistance Rc limiting the maximum value of the output current (FIG. 15(B)) or a constant current circuit Ic (FIG. 15(C)). Of course, these circuit has the input terminal I, the output terminal O and the common terminal COM through which the total current of the currents flowing through the input and output terminal I and O.

All of the circuits shown in FIG. 15(A) through FIG. 15(C) include two NPN transistors QA and QB, respectively. The base and collector of the NPN transistor QA on the side of the input terminal I are connected with each other through a shunt circuit, so that in the transistor QA, the forward directed p-n junction results in between the input terminal I and the common terminal COM, thus the bias voltage being always supplied to the light receiving element 11. When the photocurrent Ip is generated by the light receiving element 11, the transistor QB is turned on, so that the current outflow takes place at the set input terminal S of the switch circuit 15b. Then, this current triggers the switch circuit 15b to turn it on, thus enabling the optical communication circuit 13 to connect with the plus(+) power source 29.

If there is used the current folding circuit 15c, especially the circuit (FIGS. 15(B) and 15(C)) having the non-linear current amplifier circuit of which the amplification factor indicates a minimum value to the input current of around zero, the S/N ratio of the receiving portion for receiving the optical signal requesting initiation of the communication of the light receiving element 11 is improved by the characteristic of the non-linear current amplifier circuit that a minute current is suppressed while the current exceeding a certain level is amplified emphatically. In other words, the receiving photo noise current in the minute current region is suppressed while the photocurrent caused by the optical calling signal is emphatically amplified, so that there can be improved the S/N ratio of the receiving portion for receiving the optical signal requesting initiation of the communication of the light receiving element.

Figure 16:
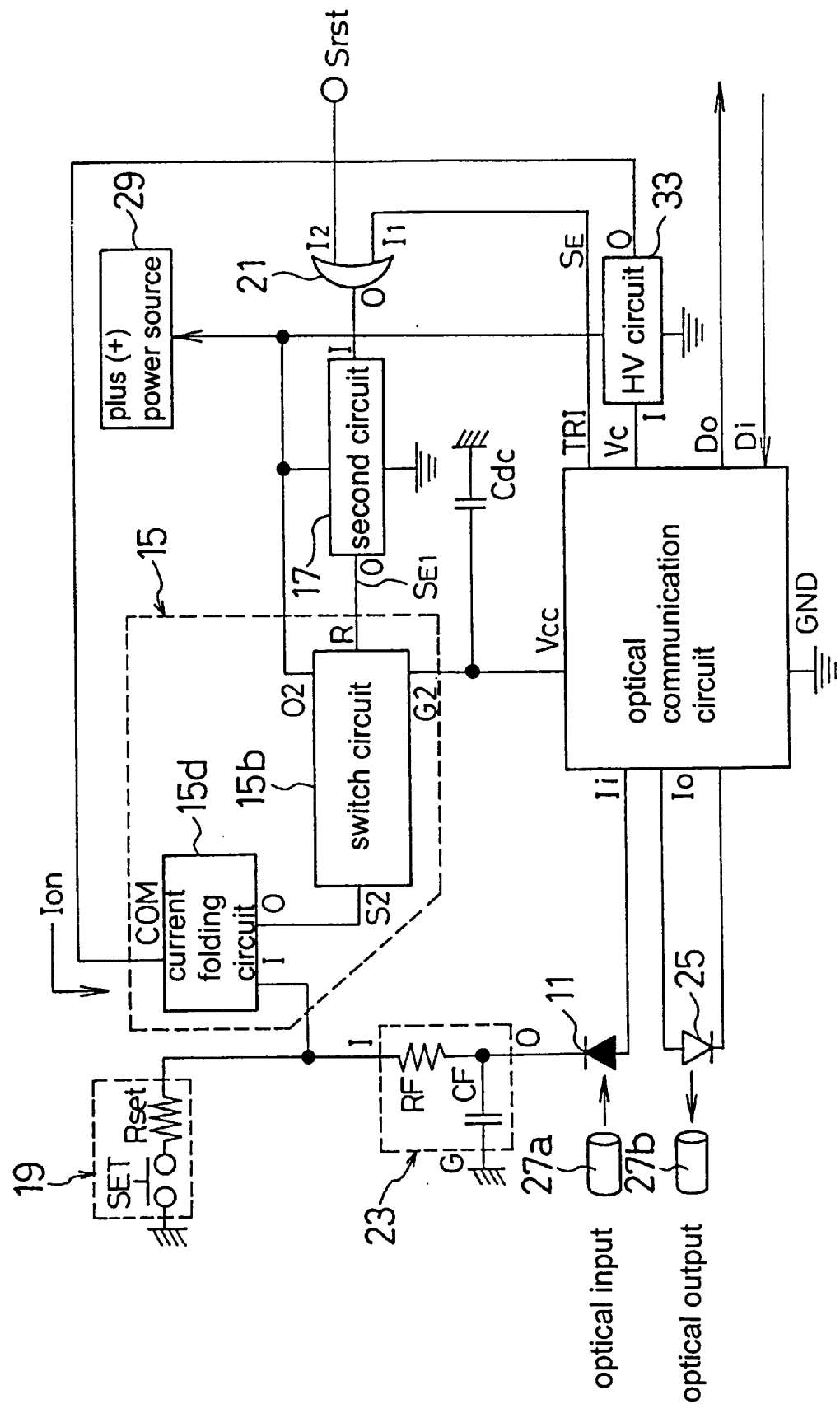
FIG. 16 is a block diagram for explaining another constitution of an optical communication apparatus according to the second embodiment of the invention.

FIG. 16 shows another example of the optical communication apparatus employing the current folding circuit. To be more in detail, in order that the plus(+) power source 29 can be used as the power source for the optical communication circuit 13, and also that a separate plus(+) power source 33 can be used as the bias voltage supplying source to the light receiving element 11, the first circuit 15 is constituted with the circuit including the switch circuit 15b and the current folding circuit 15d.

The separate plus(+) power source 33 may be constituted by an arbitrary and suitable power source. In case of FIG. 16, there is employed as the separate power source 33, a controllable power source, of which the output is controlled by the optical communication circuit 13 and which outputs a fixed DC voltage when the power supply to the optical communication 13 is cut off (i.e. the optical communication circuit 13 is turned off), more concretely, a high voltage circuit (HV circuit) capable of performing AGC (automatic gain control). As the main purpose of the second embodiment is to describe the effect of the current folding circuit 15d, the controllable power source 33 will be explained later in association with the fourth embodiment.

In case that the controllable power source 33 as mentioned above is used as the bias voltage supplying source to the light receiving element 11, there is used as the optical communication circuit 13 an optical communication circuit which includes an AGC amplifier capable of outputting the signal for controlling the controllable power source 33 and has a control signal output terminal Vc. For this, FIG. 16 indicates the optical communication circuit 13 having the control signal output terminal Vc. However, As the main purpose of the second embodiment is to describe the effect of the current folding circuit 15d, the optical communication circuit with the AGC amplifier will be explained later in association with the fourth embodiment.

In the optical communication apparatus shown in FIG. 16, the switch circuit 15b may be constituted with such a circuit as the circuit 15a4 explained referring to FIG. 4(B) using the set input terminal S2 in the way (1) as mentioned above. Also, the switch circuit 15 may be constituted with the circuit 15a5 explained referring to FIG. 5. In case of the optical communication apparatus shown in FIG. 16, when the photocurrent is generated, it flows in the set input terminal S, so that there is need for the switch circuit 15a4 or 15a5 to be used in order comply therewith.

Figure 17A:
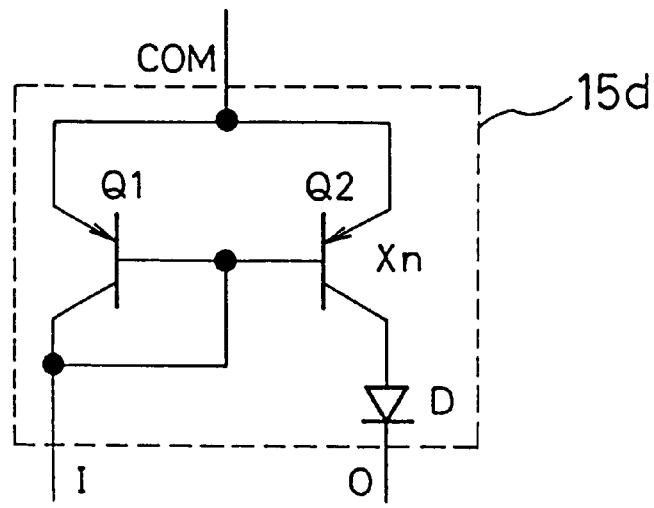
FIGS. 17(A) and 17(B) are diagrams for explaining another current folding circuit.
Figure 17B:
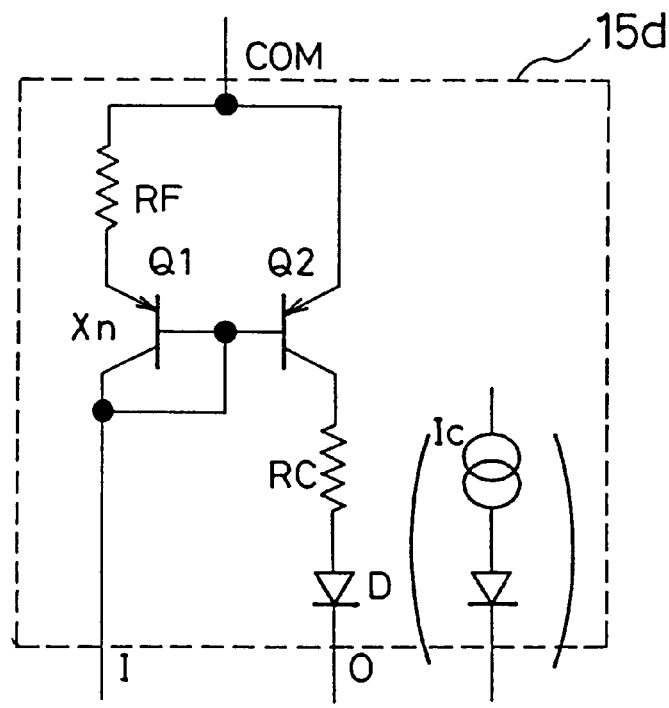

FIG. 17(A) and FIG. 17(B) are circuit diagrams respectively showing a concrete example of the current folding circuit 15d applicable to the optical communication apparatus in FIG. 16. The circuit in FIG. 17(A) has the similar constitution to the one in FIG. 15(A) except that PNP transistors are employed in place of NPN transistors and a diode is additionally connected to the output terminal. The circuit in FIG. 17(B) also has the similar constitution to the one in FIG. 15(B) except that PNP transistors are employed in place of NPN transistors and a diode is additionally connected to the output terminal.

Both circuits shown in FIGS. 17(A) and 17(B) supply the bias voltage from the plus(+) power source to the light receiving element. This is the reason why the PNP transistor is employed. The diode is used for blocking the reverse current which is generated when the potential of the controllable power source becomes lower than that of the plus(+) power source 29.

In both of circuits shown in FIGS. 17(A) and 17(B), the base and collector of the PNP transistor Q1 on side of the input terminal I are connected with each other through a shunt circuit, so that the forward directed p-n junction results in between the input terminal I and the common terminal COM, thus the bias voltage being always supplied to the light receiving element 11. When the photocurrent Ip is generated by the light receiving element 11, the current flows through the transistors Q1 and Q2, so that the current inflow takes place at the set input terminal S2 of the switch circuit 15b. With this, the switch circuit 15b is turned on, thus enabling the optical communication circuit 13 to connect with the plus(+) power source 29. The diode may be omitted, if the potential of the controllable 33 is much higher than that of the plus(+) power source 29.

FIG. 17(B) indicates that the constant current circuit Ic may be used in place of the current limiting resistance Rc. Furthermore, FIGS. 17(A) and 17(B) indicates that the current folding circuit for the inflow current may be constituted by reversing the polarity of the transistor and diode.

Third Embodiment

The first and second embodiments show examples teaching that if the switch circuit 15a or 15b is turned on by using the photocurrent as the trigger current, the current flows to the optical communication circuit 13 through the switch circuit 15a or 15b. If, however, the optical communication circuit 13 requires a large current, the switch circuit 15a and 15b have to allow such a large current to flow therethrough. In such a case, it is preferable to constitute the switch circuit 15a or 15b by separating it into two circuits i.e. a first switch circuit which generates a switching signal in response to the photocurrent Ip and a second switch circuit which serves as a path leading the current to the optical communication circuit 13. This way brings the advantage that a semiconductor element with a large current capacity may be employed only in the circuit portion carrying a large current. An example of this will be described in connection with this third embodiment.

Figure 18:
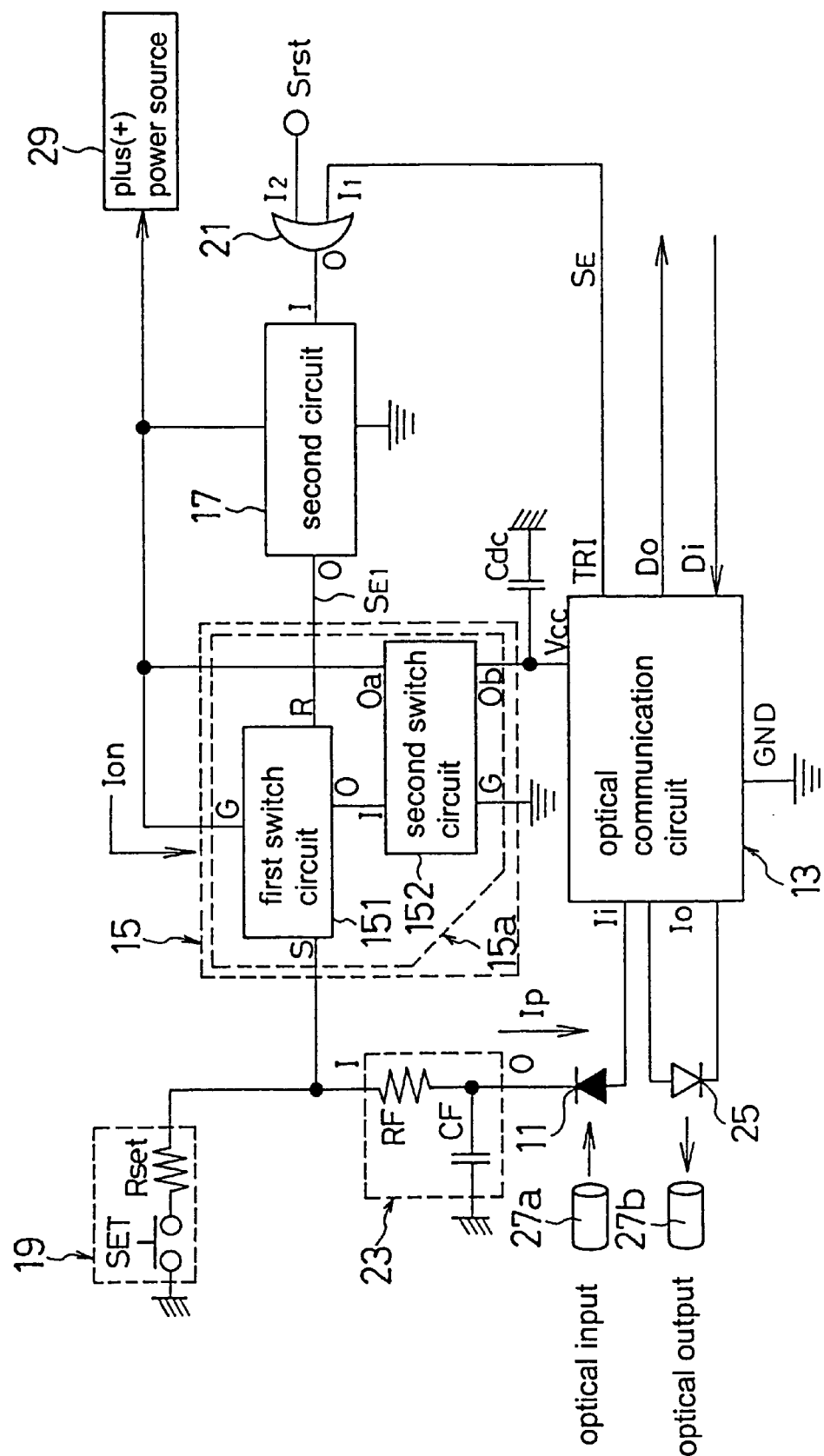
FIG. 18 is a block diagram for explaining the constitution of an optical communication apparatus according to the third embodiment of the invention.

FIG. 18 and FIG. 19 are examples in which the thought of the third embodiment is applied to the optical communication apparatus shown in FIG. 1 according to the first embodiment. FIG. 18 is a block diagram showing the constitution of the third embodiment according to the invention while FIG. 19 shows some concrete samples of the second switch circuit.

In the optical communication apparatus shown in FIG. 18, the switch circuit 15a is constituted with a first switch circuit 151 which generates a switching signal in response to a photocurrent and a second switch circuit 152 which is turned on or off with the above switching signal to make the connected or non-connected state between the switch terminal Ob connected with the power source terminal Vcc of the optical communication circuit 13 and switch terminals G, Oa connected with the first power source 29.

As has been already explained, the switch circuit 15a is triggered to be turn on (i.e. to cause the conductive state between switch terminals G and O) by the photocurrent which is generated in response to the optical calling signal, and requires to hold such an ON state until the communication terminating signal SE or a signal SE1 associated therewith arises. This function of holding the ON state has to be still effective in case that the switch circuit 15a consists of the first and second switch circuits 151 and 152. However, it may be a matter of selection which switch circuit is provided with this function, the first or the second. For instance, the first switch circuit 151 may be constituted in such a manner that it continues to output the switching signal for a period of time necessary for holding the ON state, or that it outputs the switching signal just as the trigger signal to the second switch circuit 152 and the ON state is held by the second switch circuit 152. The reset input signal is provided on the side of the switch circuit having the holding function. In the following example, the first switch circuit 151 outputs the switching signal to the second switch circuit 152 for a period of time necessary for the former to hold the above ON state.

This switch circuit 15a may be constituted with any one of the switch circuits 15a1 to 15a4 shown in FIG. 3(A) to FIG. 4(B). In any one of these circuit, the switch G is connected with the plus(+) power source 29, the set input terminal S is connected with the bias terminal of the light emitting element 11 through the low-pass filter 23, the switch terminal O is connected with the input terminal I of the switch circuit 152, and the reset input terminal R is the output terminal O of the second circuit 17.

As has been already explained, the switch circuits 15a1 to 15a4 are turned on when the photocurrent flows through the set input terminal S thereof. This ON state is held until the communication terminating signal SE or a signal SE1 associated therewith is inputted to the reset input terminal R of these switch circuits. In this ON state, the signal (current) continues to flow out through the output terminal O of the first switch circuit 151. This signal serves as a signal which turns on the second switch signal 152.

On one hand, there is no special limitation over the constitution of the second switch circuit 152. Any circuit may be employed if it may make the connected or non-connected state between the terminal of the switch circuit 15a connected with the plus(+) power source 29 (i.e. switch terminals G, Oa in FIG. 18) and the power source terminal connected with the power source terminal Vcc of the optical communication circuit 13 (i.e. switch terminal Ob in FIG. 18), in response to the switching signal outputted from the first switch circuit 151. The following circuits may be enumerated as concrete examples of the second switch circuit 152, namely a photocoupler circuit 152a (see FIG. 19(A)), a relay circuit 152b (see FIG. 19(B)), a transistor circuit 152c (see FIG. 19(C)), a circuit formed by combining the above photocoupler with a transistor 152d (see FIG. 19(D)), a circuit formed by combining the above relay circuit with a transistor 152e (FIG. 19(E)), etc.

Each of the second switch circuits 152a through 152e shown in FIG. 19 is used by connecting its input terminal I with the switch terminal O as the output terminal of the first switch circuit 151, its other input terminal for driving G with the ground terminal of the optical communication apparatus, its output terminal Oa with the switch terminal G of the first switch circuit 151, and its other output terminal Ob with the power source terminal Vcc of the optical communication circuit 13.

In case of the optical communication apparatus in FIG. 18, if it is released from its standby state, the power is supplied from the first power source 29 to the optical communication circuit 13 through the second switch circuit 152. Operation of other than the mentioned above is similar to that of the optical communication apparatus according to the first embodiment.

In case that a circuit of which the input side resistance is low, is used as the second switch circuit 152, it is preferable to constitute the first switch circuit 151 by using a circuit with a constant current function, for instance a circuit shown in FIGS. 3(A), 3(B), or 4(A).

Figure 20:
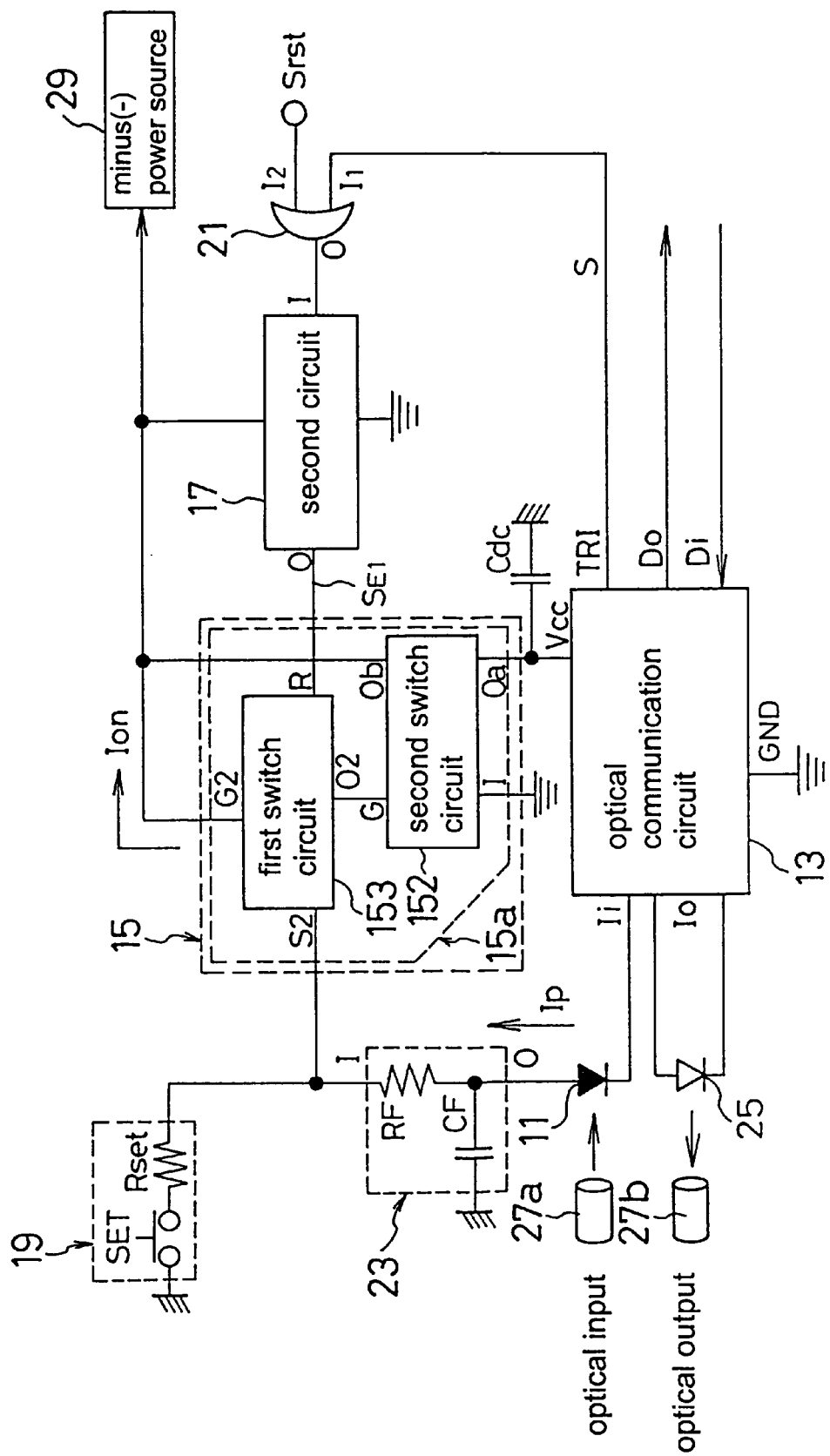
FIG. 20 is a block diagram for explaining another constitution of an optical communication apparatus according to the third embodiment of the invention.

FIG. 20 is an example in which the thought of the third embodiment is applied to the optical communication apparatus shown in FIG. 9 according to the first embodiment. In other words, this is an example in which the thought of the third embodiment is applied to the optical communication apparatus wherein the minus(−) power source 29 is used as the power supply for the optical communication circuit 13, on behalf of the plus(+) power source 29.

In the optical communication apparatus, the switch circuit 15a consists of the first switch circuit 153 and the second switch circuit 152. The first switch circuit 153 may be constituted by the switch circuit 15a4 in FIG. 4(a) using the set input terminal S2 in the way (2) as mention before or by the switch circuit 15a5 in FIG. 5. (171) Each of the switch circuits 15a4 and 15a5 as the first switch circuit 153 is used by connecting its switch terminal G2 with the minus(−) power source 29, its set input terminal S2 with the bias terminal of the light receiving element 11 through the low-pass filter 23, its switch terminal O2 with the input terminal G of the second switch circuit, and its reset input terminal R with the output terminal O of the second circuit 17.

On one hand, the second switch circuit 152 may be constituted by using circuits shown in FIGS. 19(A), 19(B), 19(D), and 19(E). However, the direction of the current flow is opposite to that in the circuit shown in FIG. 18, so that the second switch circuit is used by connecting its input terminal I with the ground terminal of the optical communication apparatus, its other input terminal for driving G with the switch terminal O2 as the output terminal of the first switch circuit 153, and its other output terminal Oa with the power source terminal Vcc.

In the optical communication apparatus shown in FIG. 20, if it is released from its standby state, the optical communication circuit 13 comes to receive the power supply from the power source 29 through the second switch circuit 152.

Operation other than the mentioned above is similar to that of the optical communication apparatus according to the first embodiment.

Fourth Embodiment

Referring to the first and third embodiments, it has been described that the bias voltage is supplied to the light receiving element 11 through the first circuit 15, from the first power source as the power source for the optical communication circuit 13. This first power source 29 is used in general as a power source for outputting a fixed DC voltage.

However, it is more preferable if a control voltage which makes the amplitude of the photocurrent plus(+) from the light receiving element 11 constant can be supplied to the light receiving element 11 as a bias voltage through the first circuit 15. If this is possible, there it realized an optical communication apparatus wherein the power consumption in its standby state becomes substantially zero, and the high quality communication can be performed under the automatic gain control (AGC) including the full AGC, which makes the photocurrent pulse amplitude constant in the optical communication.

Figure 21:
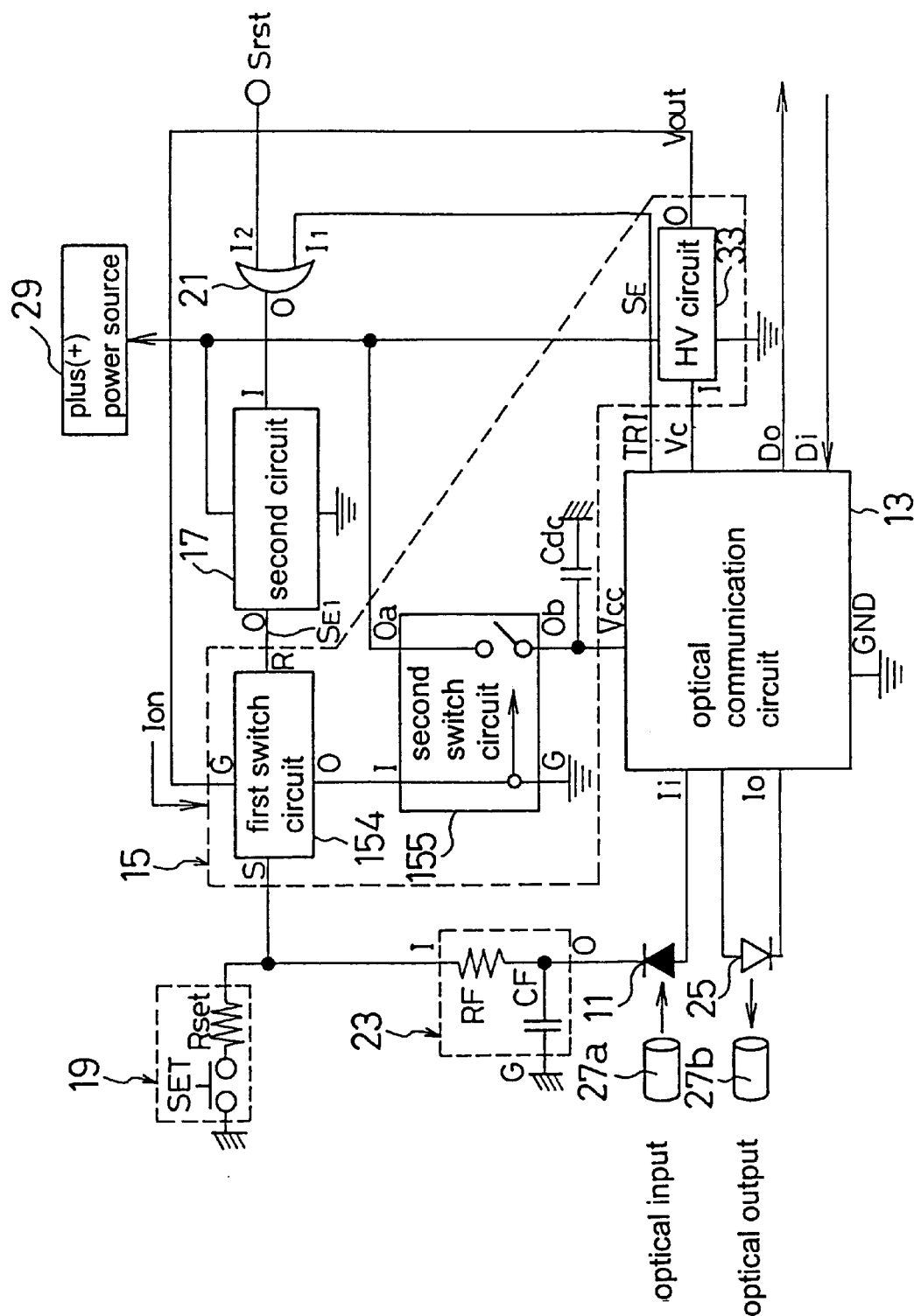
FIG. 21 is a block diagram for explaining the constitution of an optical communication apparatus according to the fourth embodiment of the invention.

Therefore, in this fourth embodiment, there will be explained in detail an example in which a controllable power source is connected with the first circuit 15, with reference to FIGS. 21 to 26. FIG. 21 is a block diagram representing the concept of the fourth embodiment.

The optical communication apparatus according to the fourth embodiment shown in FIG. 21 includes a light receiving element 11, an optical communication circuit 13, a first circuit 15, a second circuit 17, a third circuit 19, a fourth circuit 21, a low-pass filter 23, a light emitting element 25, a first power source 29, and a controllable power source 33.

In this embodiment, the light receiving element 11 is constituted with an avalanche diode.

Figure 22:
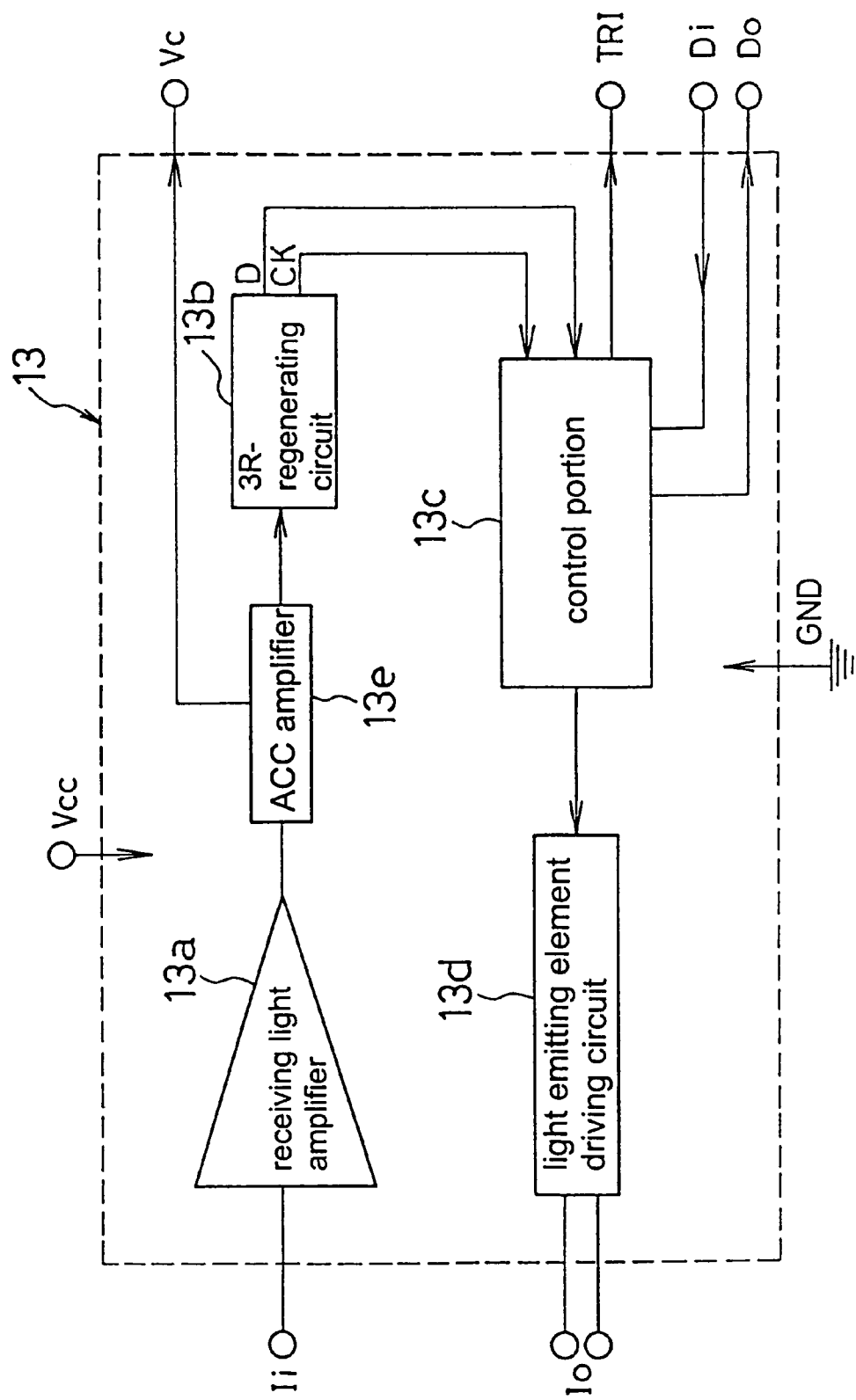
FIG. 22 is a block diagram for explaining another constitution of the optical communication circuit.

As shown in FIG. 22, the optical communication circuit 13 includes, in addition to the constitution explained in connection with the first embodiment, an AGC amplifier 13e which generates a signal controlling the output voltage Vout from the controllable power source 33 i.e. a high voltage generating circuit, and has an output terminal Vc for outputting the above signal. An optical communication circuit including an AGC amplifier 13e has been open to the public, for instance, by S. Soejima and S. Kaibuchi, "Optical Communication (New Edition)," Optical Communication News Co., Dec. 12, 1981, p. 419, the disclosure of which is herein incorporated by reference.

Also, the first circuit 15 is constituted with a circuit including the controllable power source 33, a first switch circuit 154, and second switch circuit 155.

This embodiment is different from the first embodiment in the following points, that is, the controllable power source 33 being employed, the first circuit 15 being constituted with the first and second switch circuits 154 and 155, and the controllable power source 33 being connected with the first circuit 15. This will be explained one by one in the following. The connective relation between other constituents of this embodiment is identical to that of the first embodiment.

The controllable power source 33 serves as a power source which outputs a fixed DC voltage in case that its output Vout is controlled by the optical communication circuit 13 and the power supply to this circuit 13 from the first power source 29 is cut off. More concretely, the circuit 13 serves as a high voltage generating circuit (HV circuit) which outputs, under the control by the optical communication circuit 13, such a voltage that can control the current amplification factor of the avalanche diode as the light receiving circuit, and outputs a fixed DC voltage when the optical communication element 11 is in the OFF state.

This high voltage generating circuit may be constituted with an arbitrary and suitable circuit, if it has the function capable of outputting a fixed DC voltage when the light communication circuit 13 is in the OFF state and also capable of outputting such a voltage that shows monotonic increases or decrease under the control by the optical communication circuit 13 which is in the ON state. Also, this high voltage generating circuit can typically output the voltage higher than the first power source 29.

Figure 23:
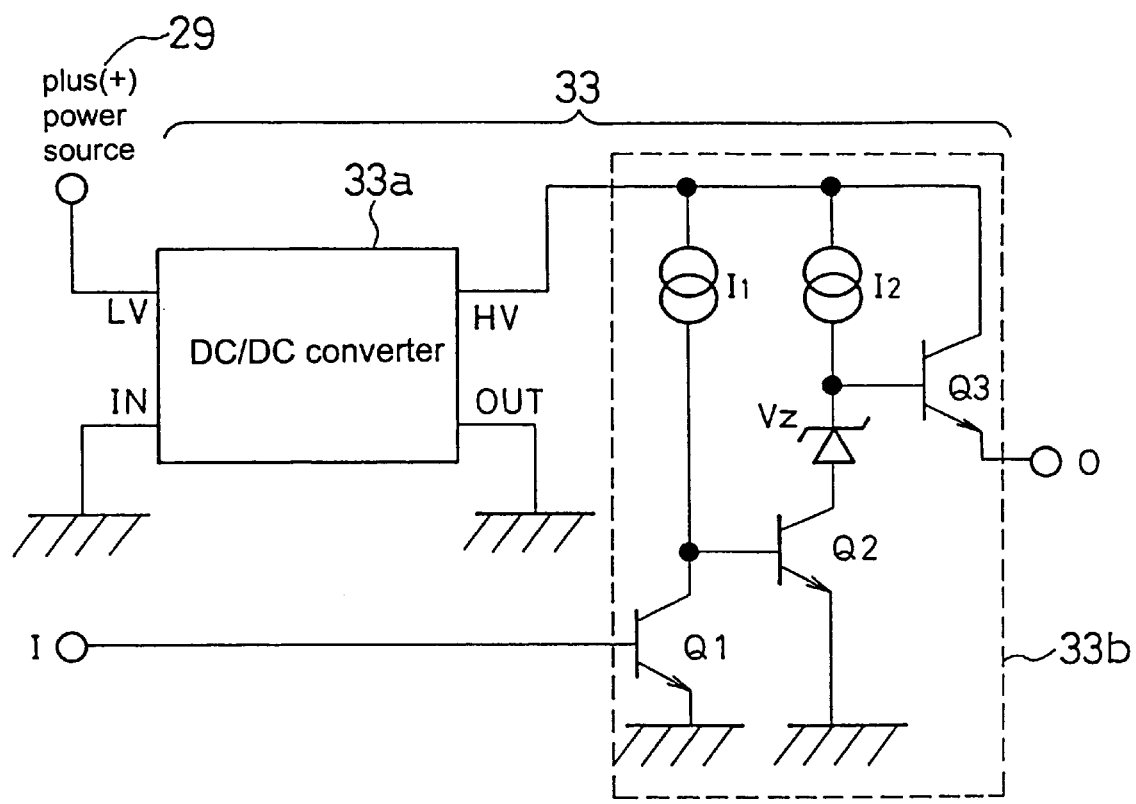
FIG. 23 is a concrete example of a high voltage generating circuit (HV circuit) as a controllable power source.

FIG. 23 is a diagram showing a concrete example of a high voltage generating circuit as the controllable power source 33. This high voltage generating circuit is constituted with a DC/DC converter circuit 33a as a high voltage power source, transistors Q1 to Q3, a constant voltage diode Vz, and an amplifier circuit 33b which includes constant current circuits I1 and I2 (replaceable by a high resistance) serving as a load impedance of transistor Q1 and Q2. The DC/DC converter circuit 33a converts the voltage of the first power source 29 into a voltage higher than that. The input terminal I of the high voltage generating circuit 33 is connected with the control voltage output terminal Vc of the optical communication circuit 13 while the output terminal O of this circuit 13 is connected with the switch terminal G as the first terminal of the first switch circuit 154.

In the high voltage generating circuit as the controllable power source 33, if no input is made to the input terminal I, the transistor Q1 is in the OFF state while the transistor Q2 is in the ON (saturated) state, so that a constant DC voltage determined by the constant voltage diode Vz is outputted. In other word, if the optical communication circuit 13 is in the OFF state (zero output from the terminal Vc) because of the non-connected state between the circuit 13 and the first power source 29, the high voltage generating circuit 33 outputs a fixed DC voltage to the switch terminal G of the first switch circuit 154.

On one hand, if the optical communication circuit 13 is in the ON state, the control signal is inputted to the input terminal I of the high voltage generating circuit 33 from the output terminal Vc of the circuit 13. With this, transistors Q1 and Q2 are activated to perform the amplifying operation. This high voltage generating circuit 33 outputs a voltage having a value between the constant voltage determined by the constant voltage diode Vz and the high voltage HV outputted by the DC/DC converter circuit 33a and corresponding to the magnitude of the control signal outputted from the terminal Vc of the optical communication circuit 13, to the switch terminal G of the first switch circuit 154.

In the circuit example shown in FIG. 23, the first power source 29 is used as the power source for the high voltage generating circuit 33, so that the DC/DC converter circuit 33a is needed as a booster circuit. However, the above DC/DC converter circuit 33a may be omitted if an independent high voltage DC current source is provided for the high voltage generating circuit 33 in the optical communication apparatus.

The first switch circuit 154 has at least a first to fourth terminals, the first terminal being connected with the output terminal O of the controllable power source 33, the second terminal with the bias terminal of the light receiving element 11 through the low-pass filter 23, the third terminal with the terminal for outputting a switching signal, and the fourth terminal with the output terminal O of the second circuit 17. Also, the first switch circuit 154 always supplies the voltage based on the controllable power source 33 to the light receiving circuit 11 as the bias voltage thereof through the second terminal, and uses the photocurrent as the trigger which flows through the second terminal upon receipt of the optical calling signal by the light receiving element 11, and outputs the switching signal from the third terminal until the fourth terminal receives the communication terminating signal SE1 or a signal SE associated therewith.

The first switch circuit 154 may be constituted with any arbitrary and preferable circuit if it functions as mention above.

This first switch circuit 154 may be constituted by using any one of switch circuits 15a1 to 15a4 as explained with reference to the FIGS. 3(A) to 4(B). In this case, the terminals of the first switch circuit 154 have the following relation with the other parts. That is, the switch terminal G is connected with the output terminal O of the controllable power source 33, the set input terminal S with the cathode of the light receiving element 11 through the low-pass filter 23, the switch terminal O with the input terminal I of the second switch circuit 155, and the reset input terminal R with the output terminal O of the second circuit 17.

In this first circuit 154, a voltage of which the level is shifted to some degree from the output voltage of the controllable power source 33 can be always supplied to the light receiving element 11 as the bias voltage thereof through the forward directed p-n junction between the switch terminal G and the set input terminal S. To be in detail, when the optical communication circuit 13 is in the OFF state, the fixed DC voltage outputted from the controllable power source 33 is supplied to the light receiving element 11 as the bias voltage thereof. On one hand, when the optical communication circuit 13 is in the OFF state, the voltage outputted from the controllable power source 33 under the control of the optical communication circuit 13 is supplied to the light receiving element 11 as the bias voltage thereof.

This means that the light receiving element 11 is supplied with the bias voltage that controls the pulse amplitude of the photocurrent so as to keep it constant. Accordingly, in case of using the avalanche diode, it becomes possible to perform the optical communication by means of so-called automatic gain control (full AGC), in which the photocurrent pulse amplitude is held constant.

The principle of the ON/OFF operation by the switch circuit 154 is identical to that of the switch circuit 15a in the first embodiment. That is, when the light receiving circuit 11 receives the optical calling signal, the photocurrent generated at that time flows in the set input terminal S, and the first switch circuit 154 enters in the ON state. This ON state is held until the communication terminating signal SE1 is inputted from the second circuit 17 to the reset input terminal R of the first switch 154. While the first circuit 154 is in the ON state, the switching signal is outputted from the switch terminal O to the second switch terminal 155.

The second switch circuit 155 is provided between the first power source 29 for the optical communication circuit 13 and the power source terminal Vcc of the same, and serves to make the connected state between the first power source 29 and the optical communication circuit 13 in response to the switching signal from the first switch circuit.

Figure 24:
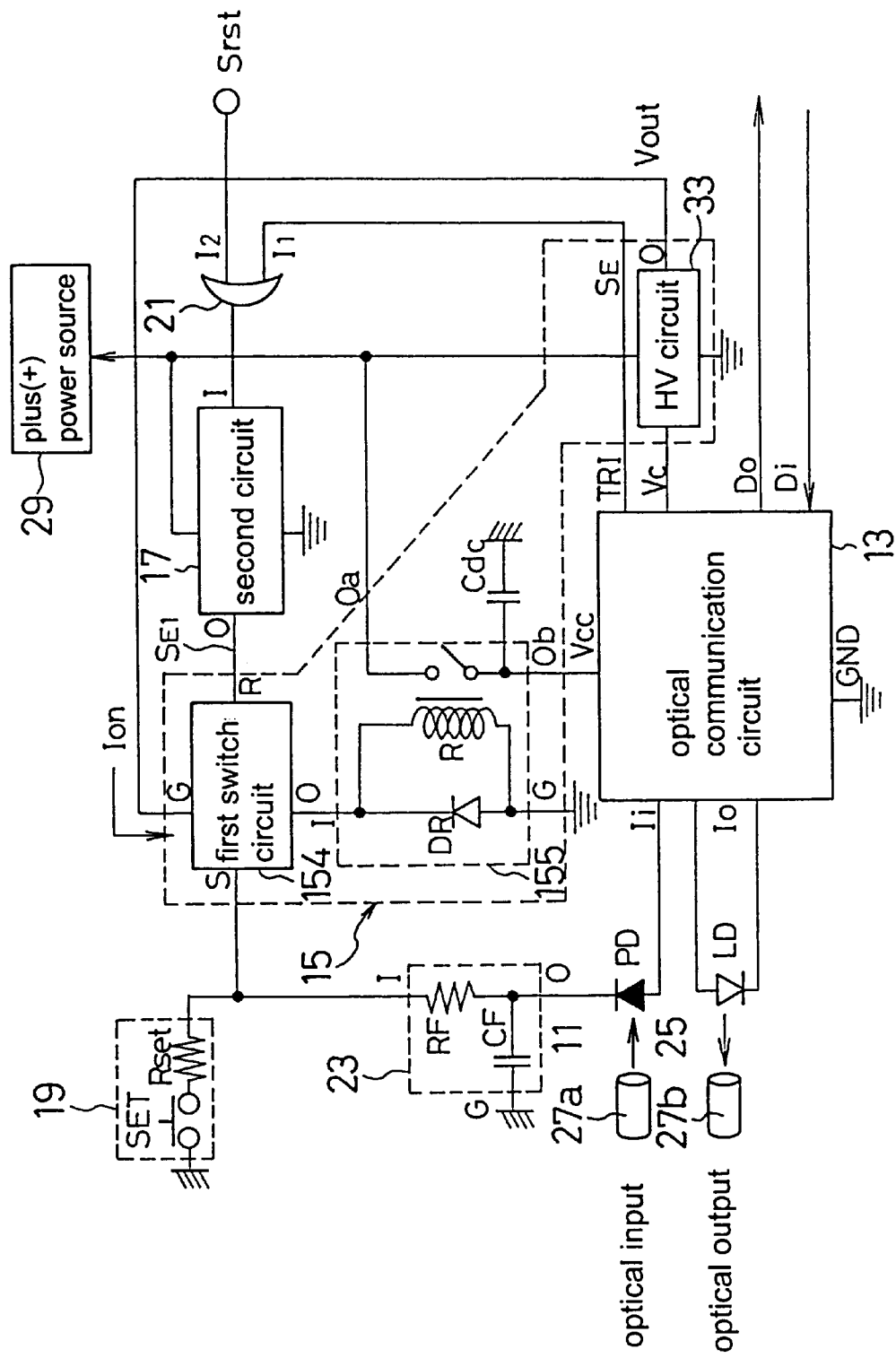
FIG. 24 is a block diagram for explaining the constitution of an optical communication apparatus according to the fourth embodiment of the invention.
Figure 25:
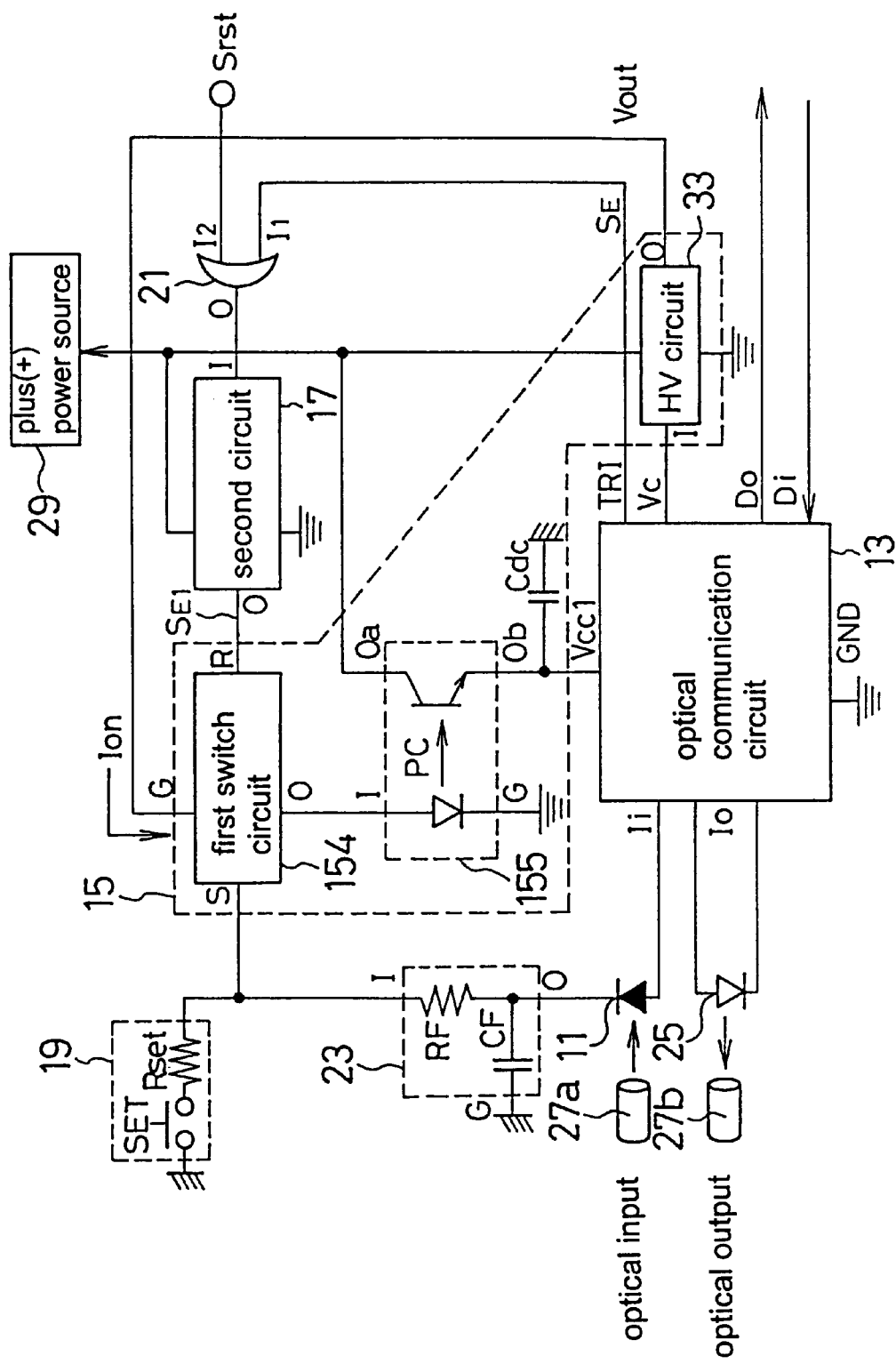
FIG. 25 is a block diagram for explaining the constitution of an optical communication apparatus according to the fourth embodiment of the invention.
Figure 26:
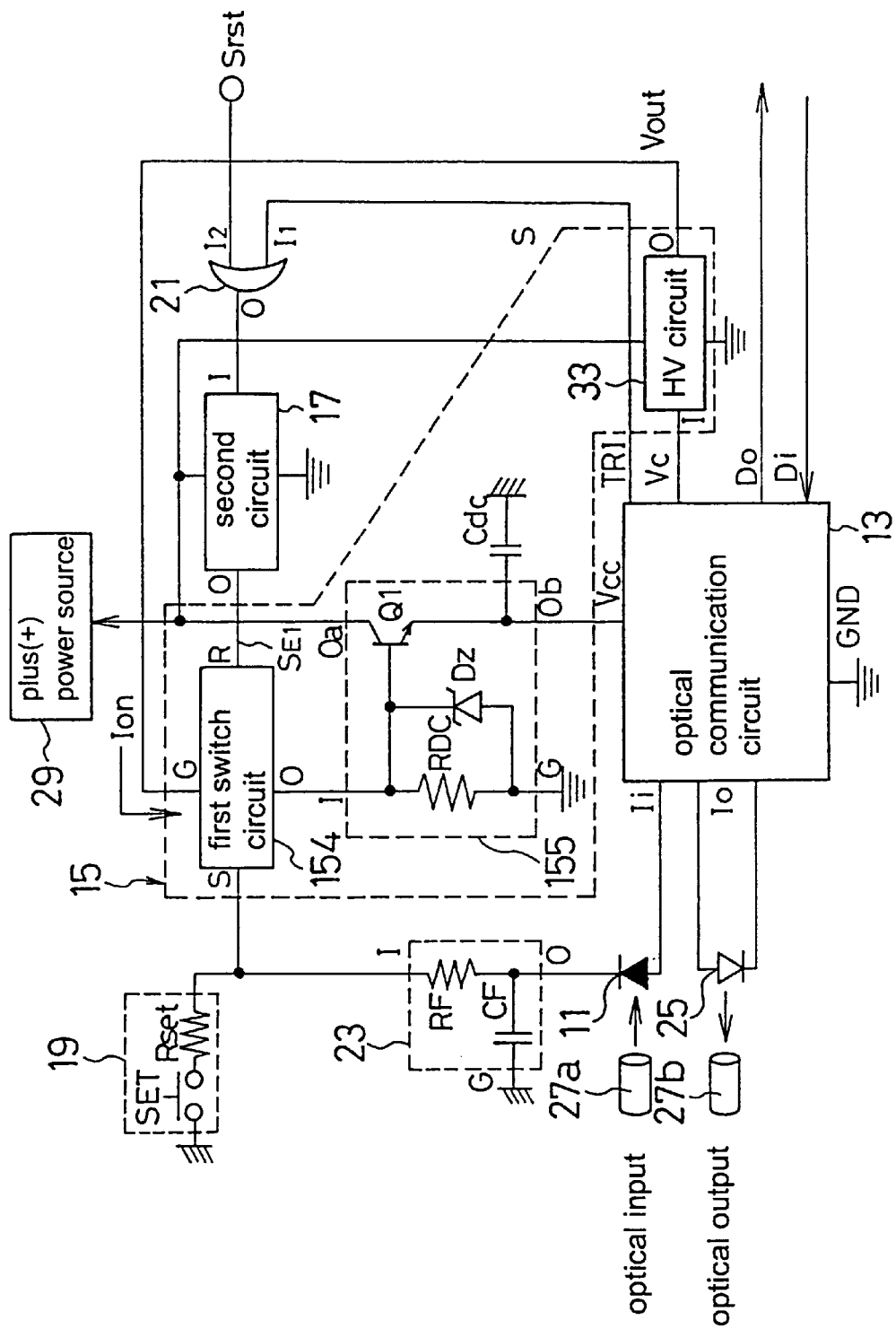
FIG. 26 is a block diagram for explaining the constitution of an optical communication apparatus according to the fourth embodiment of the invention.

This second switch circuit 155 may be constituted with any arbitrary and suitable circuit if it functions as mentioned above. FIGS. 24 to 26 indicate some examples of the optical communication apparatus in which the part of the second switch circuit 155 is constituted with a concrete circuit.

FIG. 24 indicates an example of the optical communication apparatus including the second switch circuit 155 which is constituted with a relay R with a diode DR for absorbing a surge voltage. In this case, if the surge voltage absorbing diode DR is changed to a Zener diode, of which the Zener voltage is set as the operational voltage value of the relay R and further, any one of switch circuit 15a1 to 15a3 shown in FIGS. 3(A), 3(B) and FIG. 4(A) with the constant current output is employed, it becomes possible to comply with the case that the output voltage range of the controllable power source 33 is wide, so that the coverage of the AGC can be larger.

FIG. 25 indicates an example of the optical communication apparatus in which a photocoupler is adopted as the second switch circuit 155. As the input portion of the photocoupler is formed of a switch element of a low resistance, the first switch circuit 154 is preferably constituted with a circuit having the constant current function, for instance one of circuits shown in FIGS. 3(A), 3(B) and FIG. 4(A).

FIG. 26 indicates an example of the optical communication apparatus in which the switching signal (output current) from the first switch circuit 154 is given to a resistance RDC or a Zener diode Dz to convert it into a voltage. With this voltage, a buffer transistor Q1 is turned on, thereby producing the ON state of the second switch signal 155 as a whole.

Circuits shown in FIGS. 19(a) through 19(E) are examples of a circuit usable as the second switch circuit 155.

In the optical communication apparatus according to the fourth embodiment of the invention, when the first switch circuit 154 is turned on, the second switch circuit 155 enters in the ON state. As a result, the optical communication circuit 13 is connected with the first power source 29, thereby the optical communication apparatus entering in the communicative state. When the first switch circuit 154 is turned off, the second switch circuit 155 enters in the OFF state, so that non-connected state is made between the optical communication circuit 13 and the first power source 29, thus the optical communication apparatus getting in its standby state.

Even if the optical communication apparatus is in its standby state, a fixed DC current is still supplied to the light receiving element from the controllable power source 33. As explained referring to FIGS. 6 to 8, the optical communication apparatus is provided with the current path which can flows the photocurrent to the ground even in the standby state, so that when the photocurrent is generated by the light receiving element 11 in response to its receipt of the optical calling signal, the optical communication apparatus returns to its communicative state by using that photocurrent as the trigger.

When the optical communication apparatus returns to its communicative state, the controllable power source 33 supplies the AGC controlled voltage to the light receiving element 11. Therefore, if an avalanche diode is used as the light receiving element 11, there will be realized the automatic gain control (full AGC) which controls the current multiplication factor of the avalanche diode to keep the photocurrent pulse amplitude constant.

Accordingly, this fourth embodiment makes it possible to realize the optical communication apparatus which has the power saving effect much higher than the conventional apparatus in the standby state, and performs the optical communication with the full AGC function.

Fifth Embodiment

In the fourth embodiment, there has been explained an example of the optical communication apparatus in which the bias voltage to the light receiving element is supplied by the controllable power source 33. In case of the fourth embodiment, however, the optical communication apparatus is constituted such that the bias voltage is still supplied to the light receiving element 11 through the first switch circuit 154 even when the apparatus is in the communicative state. Therefore, should the noise take place in the first switch circuit 154 and/or the second switch circuit 155, there might happen the case that such noise leaks in the light receiving circuit. Such should be avoided and improved to enhance the reliability of the optical communication.

Furthermore, in the optical communication apparatus according to the fourth embodiment, the high voltage generating circuit is used as the controllable power source 33 for supplying the bias voltage to the light receiving element 11 in the standby state of the apparatus. However, in case of utilizing the high voltage generating circuit, it has to of course prepare a high voltage generating circuit, and also to prepare an amplifier circuit portion and others in addition thereto. Consequently, the power loss will be increased by the consumed thereby. In all the cases mentioned above, only the power source remains active when the optical communication apparatus is in the standby state. Therefore, the power saving effect will be further enhanced if the number of the power source in the active state can be decreased (preferably to one) in the standby state.

It is preferable if there is provided such an optical communication apparatus that has taken the measures against these problems. The fifth embodiment is an example of such. This will be described in detail in the following with reference to FIG. 27 through FIG. 29.

The optical communication according to the fifth embodiment may be constituted, alike the fourth embodiment, including a tight receiving element 11, an optical communication circuit 13, a first circuit 15, a second circuit 17, a third circuit 19, a fourth circuit 21, a low-pass filter 23, a light emitting element 25 and a first power source 29.

In this case, however, the first circuit 15 is constituted as a circuit including an changeover circuit 35, a controllable power source 37, first switch circuit 156, and a second switch circuit 157.

Due to insertion of the changeover circuit 35, the connective relation between some components in this embodiment is made different in part from that in the fourth one. This will be explained one by one in the following. However, the connective relation between other components having nothing to do with insertion of the changeover circuit is the same as that of the fourth embodiment.

The changeover circuit 35 is a circuit including a first terminal 1, second terminal 2, and a common terminal COM connected with the bias terminal of the light receiving element. Furthermore, this circuit may take two kinds of states, namely the first state that it is controlled by a switching signal (described later in detail) from the first switch circuit 156 and that it connects the second terminal 2 with the common terminal COM when the switching signal is outputted, and the second state that it connects the first terminal 1 with the common terminal COM while no switching signal is inputted.

The first terminal 1 of the changeover circuit 35 is connected with the set input terminal S of the first switch circuit 156 while its second terminal 2 is connected with the output terminal O of the controllable power source 37.

Figure 27:
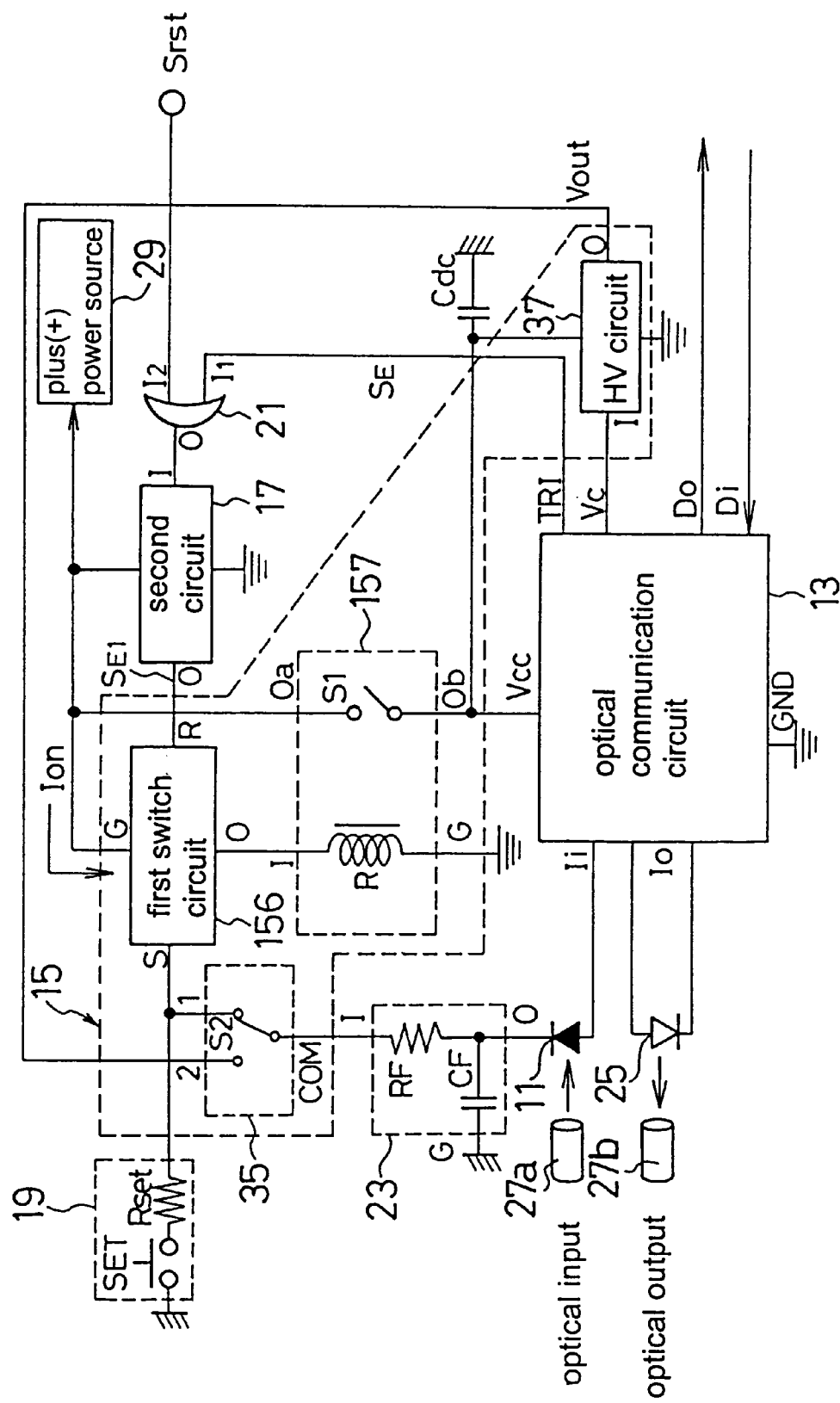
FIG. 27 is a block diagram for explaining the constitution of an optical communication apparatus according to the fifth embodiment of the invention.
Figure 28:
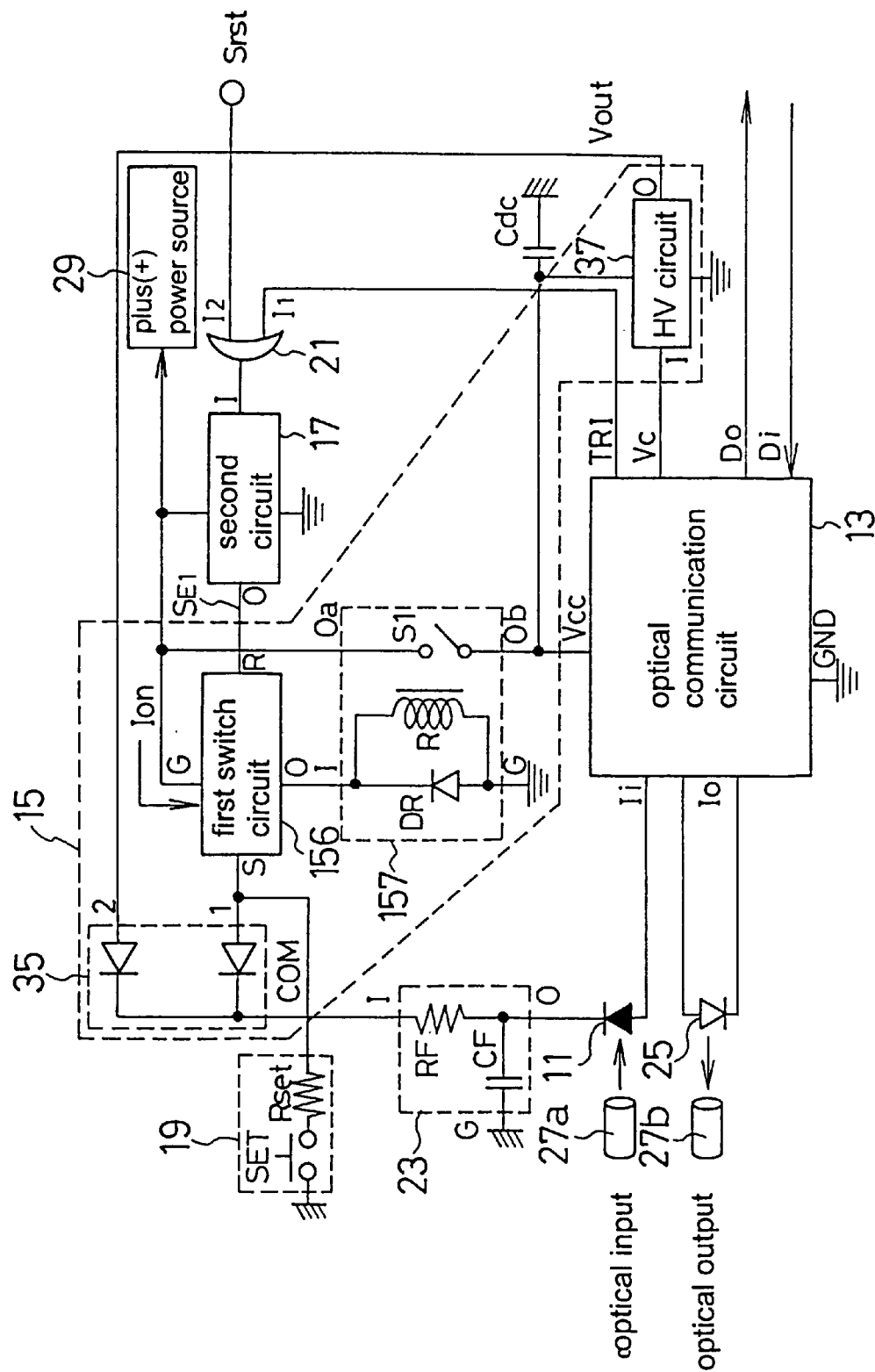
FIG. 28 is a block diagram for explaining another constitution of an optical communication apparatus according to the fifth embodiment of the invention.
Figure 29:
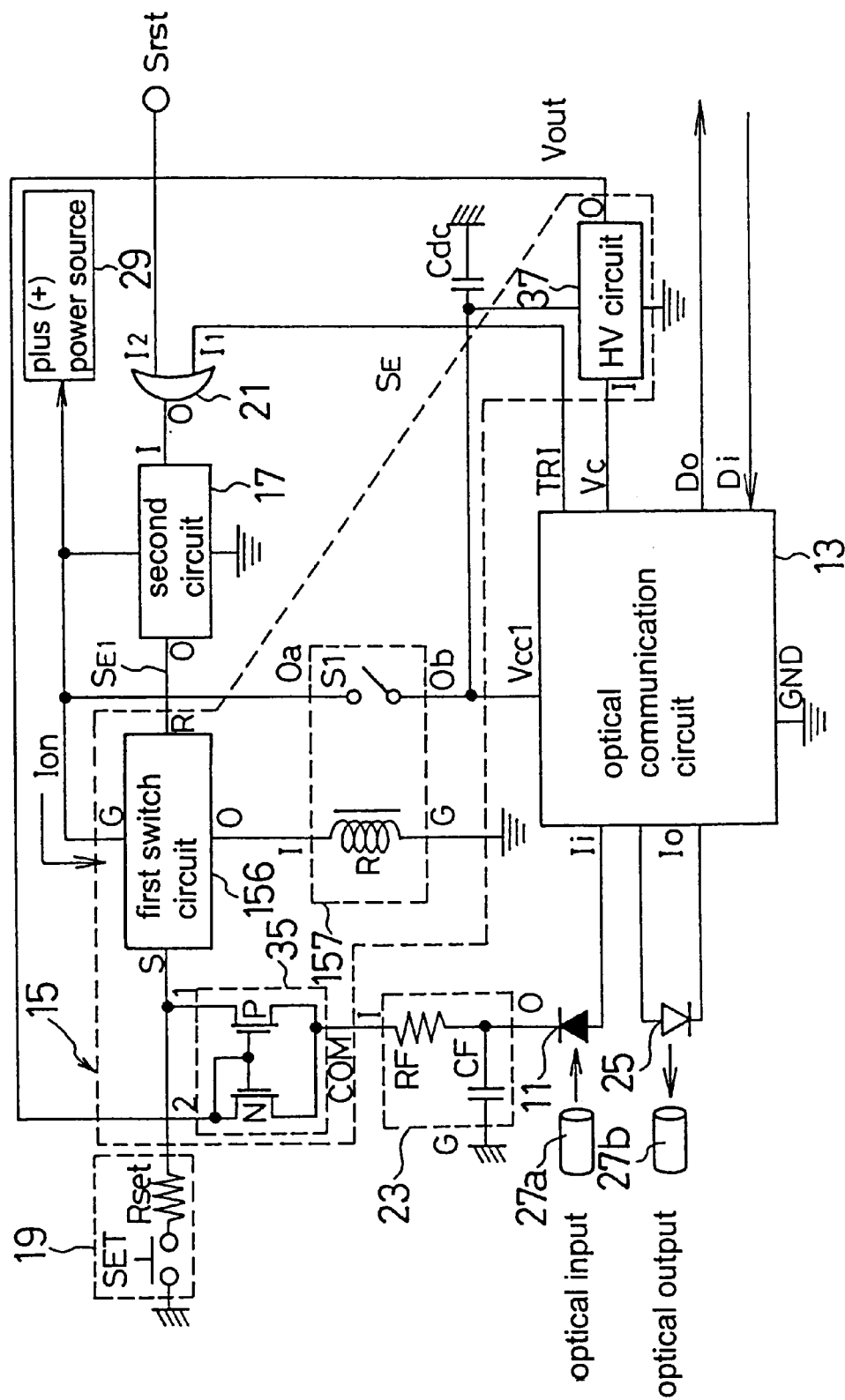
FIG. 29 is a block diagram for explaining still another constitution of an optical communication apparatus according to the fifth embodiment of the invention.

This changeover circuit 35 may be constituted with any arbitrary and suitable circuit if it has the function as mentioned above. FIGS. 27 to 29 indicate some examples of such.

In the optical communication apparatus shown in FIG. 27, the second switch circuit 157 is constituted with a relay, so that the changeover circuit 35 is constituted by adding a separate changeover contact circuit which is driven by the relay.

In the optical communication apparatus shown in FIG. 28, the changeover circuit 35 is constituted with two diodes. More particularly, the changeover circuit 35 is constituted with two diodes connecting their cathodes with each other, in which the joint point of the cathodes serves as a common terminal COM, the anode of one diode serves as the terminal 1, and the anode of the other diode serves as the terminal 2. In this case, the changeover circuit includes no mechanically moving part, so that it can be more reliable than the one using a relay.

In case of the changeover circuit 35 shown in FIG. 28, if the controllable power source 37 is set such that, during its operation, the output voltage therefrom is always kept higher than that of the first power source 29, the relative magnitude relation (large and small) of the voltage applied to the first and second terminals 1, 2 of the changeover circuit 35 can be reversed in response to the ON/OF operation of the controlled power source 37, thereby the conductive state of two diodes being switched one to the other.

In the optical communication apparatus shown in FIG. 29, the changeover circuit 35 is constituted by using one each of NMOS FET (N-channel metal oxide semiconductor field effect transistor) and PMOS FET (P-channel metal oxide semiconductor field effect transistor). More particularly, the terminals of the changeover circuit 35 is formed as follows: the common terminal COM is formed as the joint point obtained by connecting the source of NMOS with the drain of PMOS, the second terminal 2 is formed as a joint point obtained by connecting the drain of NMOS with the gates of both MOS's, and the first terminal 1 is formed by the source of PMOS. In this case, the changeover circuit also includes no mechanically moving part, so that it can be more reliable than the one using a relay.

In case of the changeover circuit 35 shown in FIG. 29, if the controllable power source 37 is set such that, during its operation, the output voltage therefrom is always kept higher than that of the first power source 29, as the optical communication circuit 13 is in the OFF state, the PMOS side becomes conductive when the output voltage of the controllable power source 37 is zero while the NMOS side becomes conductive when the output voltage of the controllable power source 37 is high. In this way, the changeover operation is carried out in response to the ON/OF operation of MOS transistors.

The controllable power source 37 is a power source of which the output voltage Vout is controlled by the optical communication circuit 13. In this case, if an avalanche diode is used as the light receiving element 11, the controllable power source 37 is constituted with a high voltage generating circuit (HV circuit) which outputs such a voltage that is controlled by the optical communication circuit 13 so as to control the current multiplication factor of the avalanche diode.

The controllable power source 33 as employed in the fourth embodiment is required to output the fixed DC voltage while the optical communication circuit 13 is in the OFF state. In the fifth embodiment, however, the controllable power source 37 may be a power source of which the output voltage can be zero (in the OFF state) while the optical communication circuit 13 is in the OFF state.

The first switch circuit 156 has at least the first to the fourth terminals, the first terminal being connected with the first power source 29, the second being connected with the first terminal 1 of the changeover circuit 35, the third being used as the terminal for outputting the switching circuit, and the fourth being connected with the output terminal of the second circuit 17. Furthermore, when the changeover circuit 35 is in the second state as mentioned above, the first switch circuit 156 supplies the voltage based on the first power source 29 to the light receiving circuit 11 as the bias voltage thereof through the first terminal and the changeover circuit 35, and uses the photocurrent as the trigger which flows through the second terminal upon receipt of the optical calling signal by the light receiving element 11, and outputs the switching signal from the third terminal until the fourth terminal receives the communication terminating signal or a signal associated therewith.

This first switch circuit 156 may be constituted with any arbitrary and suitable circuit if it functions as mentioned above.

This first switch circuit 156 maybe constituted by using any one of switch circuits 15a1 to 15a4 as explained with reference to the FIGS. 3(A) through 4(B). In that case, the terminals of the first switch circuit 156 have the following relation with the other parts. That is, the switch terminal G is connected with the first power source 29, the set input terminal S with the first terminal 1 of the changeover circuit, the switch terminal O with the input terminal I of the second switch circuit 157, and the reset input terminal R with the output terminal O of the second circuit 17.

In this first switch circuit 156, a voltage of which the level is switched to some degree from the output voltage of the power source 29 appears at the set input terminal through the forward directed p-n junction between the switch terminal G and the set input terminal S. Therefore, when the changeover circuit 35 is in the second state, the voltage based on the first power source 29 can be supplied to the light receiving element 11 as the bias voltage thereof through the set input terminal S, the changeover circuit 35, and the low-pass filter 23.

When the light receiving element 11 receives the optical calling signal, the photocurrent generated thereby flows in the set input terminal S, thereby the first switch circuit 156 entering in the ON state. Then, the switching signal is outputted from the switch terminal O of the first switch circuit 156. The ON state of the first switch circuit 156 is maintained until the reset input terminal R of the first switch circuit 156 receives the communication terminating signal SE or a signal SE1 associated therewith from the second circuit 17. The principle of the ON/OFF operation of the first switch circuit 156 is identical to that of the ON/OFF operation of the switch circuit 15a in the first embodiment.

The ON/OFF operation of the second switch circuit 157, and the first or second state of the changeover circuit 35 depend on whether the first switch circuit 156 outputs the switching signal or not.

The second switch circuit 157 is provided between the first power source 29 for the optical communication circuit 13 and the power source terminal Vcc of the same, and serves to make the connected state between the first power source 29 and the optical communication circuit 13 in response to the switching signal from the first switch circuit. This second switch circuit 157 may be constituted with any arbitrary and suitable circuit if it functions as mentioned above. The circuits 152a to 152e in FIG. 19 can be enumerated as examples of the second switch circuit 157. FIGS. 27 to 29 indicate some examples of the optical communication apparatus in which the second switch circuit 157 is constituted with a relay circuit (including the one having a diode for absorbing the surge voltage).

In the optical communication apparatus according to the fifth embodiment, the ON/OFF operation of the first and second switch circuits 156, 157 is identical to that in the fourth embodiment. Accordingly, as the power supply to the controllable power source 37 can be cut off, the power saving effect in the standby state of the apparatus can be enhanced by the power as cut off, comparing with the fourth embodiment. Furthermore, this embodiment provides the optical communication apparatus which is capable of performing the optical communication under the full AGC control.

The following unique function can be brought by the optical communication apparatus according to the fifth embodiment. That is, in the standby state of the apparatus, the voltage based on the first power source 29 can be supplied to the light receiving element 11 as the bias voltage thereof. On one hand, in the state of performing the communication, the voltage based on the controllable power source 37 can be supplied to the light receiving element 11 as the bias voltage thereof. Therefore, the following effects (1) and (2) can be obtained.

(1) In the standby state of the optical communication apparatus, it becomes possible to cut off the power supply to the controllable power source 37 (high voltage generating circuit), of which the internally consumed power is not always zero even in the standby state. Consequently, the power consumption by such high voltage generating circuit can be made zero in the standby state.

(2) The first and second switch circuits can be separated from the light receiving element 11 by the changeover circuit 35 during the optical communication, thereby-decreasing thenoise leaking in the light receiving element 11 through these switch circuits.

Sixth Embodiment

Figure 30:
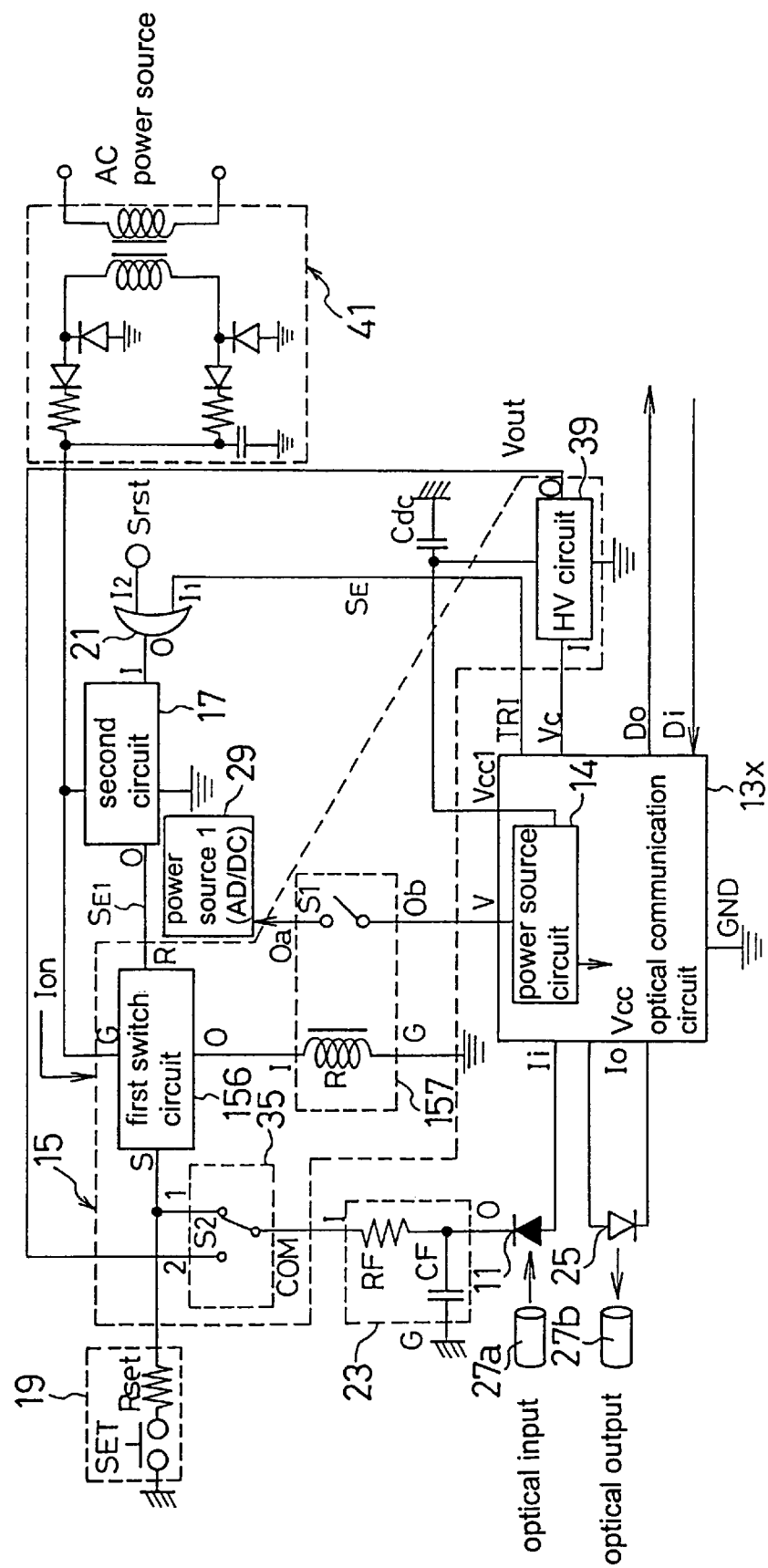
FIG. 30 is a block diagram for explaining the constitution of an optical communication apparatus according to the sixth embodiment of the invention.

In the fifth embodiment, a power source connected with the first switch circuit is the first power source 29 for the power source of the optical communication circuit. However, the first power source 29 is often required lobe a high quality DC power source in view of the purpose of use thereof. Because a high quality DC power source, in which the measures for preventing the voltage from fluctuating and preventing the noise from coming in are adequately taken, is inevitably needed for performing the stable optical communication. However, the high quality power source is often accompanied by a large power loss. In the optical communication apparatus as has been discussed so far, the first power source 29 has to be held active even when the apparatus is in the standby state, thus causing the power loss. On one hand, in case of the power source which supplies the bias voltage to the light receiving element It while the apparatus is in the standby state, it is not always required to be of so high quality. Rather, it may just have the function of enabling the light receiving element to generate, in response to the optical calling signal, the photocurrent capable of getting the apparatus out of its standby state. From this standpoint, it can be determined that the power source for supplying the bias voltage to the light receiving element 11 in the standby state of the apparatus should preferably be separated from the first power source 29 for use in the optical communication circuit 13 and be arranged as a second power source (more simplified), still from the standpoint of decreasing the power consumption. The sixth embodiment is an example implementing the above and will be described in the following referring to FIG. 30.

The optical communication apparatus is constituted including a light receiving element 11, an optical communication circuit 13x, a first circuit 15, a second circuit 17, a third circuit 19, a fourth circuit 21, a low-pass filter 23, and a light emitting element 25. In this case, however, the first circuit 15 is constituted as a circuit including an changeover circuit 35, a controllable power source 39, first switch circuit 156, and a second switch circuit 157.

The light receiving element 11, the second circuit 17, the third circuit 19, the fourth circuit 21, low-pass filter 23, and the light emitting element 25 are constituted with the same components and circuits as those employed in the fifth embodiment. Also, the first switch circuit 156, the second switch circuit 157, and the changeover circuit 35, which constitutes the first circuit 15, are constituted with the same components and circuits as those in the fifth embodiment.

The optical communication circuit 13x includes a power source circuit 14 in addition to the constitution as has been explained in the fifth embodiment, and is further provided with a terminal V for externally supplying the power to the power source circuit 14, and a terminal Vcc1 for supplying the power to the controllable power source 39.

This power source terminal V is connected with the first power source 29 through the second switch circuit 157. The terminal Vcc1 is connected with the terminal which is connected with the plus(+) power source in the high voltage generating circuit shown in FIG. 23.

When the power source circuit 14 in the optical communication circuit 13x is connected, through its power source terminal V, with a commercial power source or a simple DC power source serving as the first power source 29, it generates the voltage Vcc which is necessary for the optical communication circuit 13x and the high quality voltage which is necessary for the controllable power source 39.

The first power source 29 may be an AC power source (including the commercial one), or a simple DC power source consisting of such an AC power source, a rectifier circuit, and a smoothing circuit of which the power loss at the load current of zero can be neglected, or a battery.

The controllable power source 39 is arranged as a high voltage generating circuit of which the output voltage is controlled by the control signal outputted from the terminal Vc of the optical communication circuit 13x, and which uses the voltage as outputted through the terminal Vcc1 of the power source circuit 14 included in the optical communication circuit 13x, as the DC voltage source for generating high voltage.

It is one of features of the sixth embodiment that the power source to be connected with the switch terminal G of the first switch circuit 156 is constituted as a second power source 41. In this case, this second power source 41 is also used as the power source of the second circuit 17.

The second power source 41 may be formed as a simple DC power source, for instance, a DC power source consisting of an AC power source, a rectifier circuit (full-wave rectifier or half-wave rectifier), and a smoothing circuit of which the power loss at the load current of zero can be neglected, or a battery. This is because even with such a simple power source, it is possible to supply the necessary bias voltage to the light receiving element 11 while the optical communication apparatus is in the standby state. Moreover, considering the first switch circuit 156 and the second circuit 17 in terms of their possible switching operation, they basically do not need to perform the specially high speed switching operation, but may just do their possible switching operation (as the speed operation is not possible, they are hardly influenced by the high frequency noise). Furthermore, while the optical communication is being executed, as the changeover circuit 35 separates the first switch circuit 156 from the second power source 41, there is no need to consider the noise characteristic of the second power source 41. Therefore, the second power source 41 may be simply formed like the above.

The voltage of the second power source may be an arbitrary voltage if it is suitable for the light receiving element 11. In case of using the avalanche diode as the light receiving element 11, it is possible to set the voltage of the second power source 41 to such a voltage that a certain amplification factor to the light received by the avalanche diode can be expected at the time when the first switch circuit is turned on.

The changeover of the operational state in the optical communication apparatus according to this embodiment (sixth), from the standby state to the communicative state or vice versa, is carried out basically in the same way as in the fifth embodiment. Thus, the explanation thereabout is not repeated here.

According to the optical communication apparatus of the sixth embodiment, the following effects can be obtained in addition to those attained by the apparatus according to the fifth embodiment.

(1) With the help of the simplified second power source 41, there is further decreased the power consumption in the standby state of the optical communication apparatus.

(2) The voltage of the second power source 41 can be set to a bias voltage which is most suitable for operation of the light receiving element at the time it receives the optical calling signal. Therefore, there can be improved the receipt response characteristic at the time of receiving the optical calling signal. This is especially effective when the avalanche diode is used as the light receiving element.

(3) If the value of the bias voltage for the light receiving element does not need to be carefully defined, the second power source can be set to such a voltage value that optimizes the operation of the first switch circuit 156 or the second switch circuit 157, or the second circuit 17.

(4) As a commercial AC power source or a simplified DC power source is used as the first power source 29 and the optical communication circuit includes another power source by itself, the ON/OFF operation of the optical communication apparatus is carried out by instruction from the most fundamental portion. Accordingly, it is possible to further decrease the power loss in the standby state of the apparatus.

In the sixth embodiment, there has been explained an example in which the second power source 41 can supply the power to the second circuit 17. If, however, the first power source 29 is not an AC power source but a DC power source, the second circuit 17 may receive the power supply from the first power source 29.

In the above description, there has been explained an example in which the second power source 41 is provided separating from the first power source 29. If, however, the first power source 29 is a simple DC power source and is at the same voltage level as the second power source 41, the former may be used as the latter. This is within the scope of the invention, too.

In the above description, there has been explained an example in which the first power source is a commercial AC power source or a simple DC power source and the optical communication circuit is the circuit 13x including the internal power source 14. It may be also possible, however, that the first power source is a high quality power source such as employed in the first through fifth embodiment and the optical communication circuit is the optical communication circuit 13. This is because, even in such a case, use of the second power source 41 will bring the possible advantageous effect.

Seventh Embodiment

In the sixth embodiment, there has been explained an example in which the second power source 41 is connected with the first circuit 15 as the power source thereof, thereby the power saving effect in the standby state being further enhanced. However, assuming that the changeover circuit 35 is formed of diodes (see FIG. 28) and the output voltage of the second power source 41 is set to a high value, if the output voltage of the controllable power source (high voltage generating circuit) 39 becomes lower than that of the second power source 41 while the communication is carried out, the changeover circuit 35 operates erroneously. The seven embodiment is a measure for overcoming and avoiding such malfunction.

Figure 31:
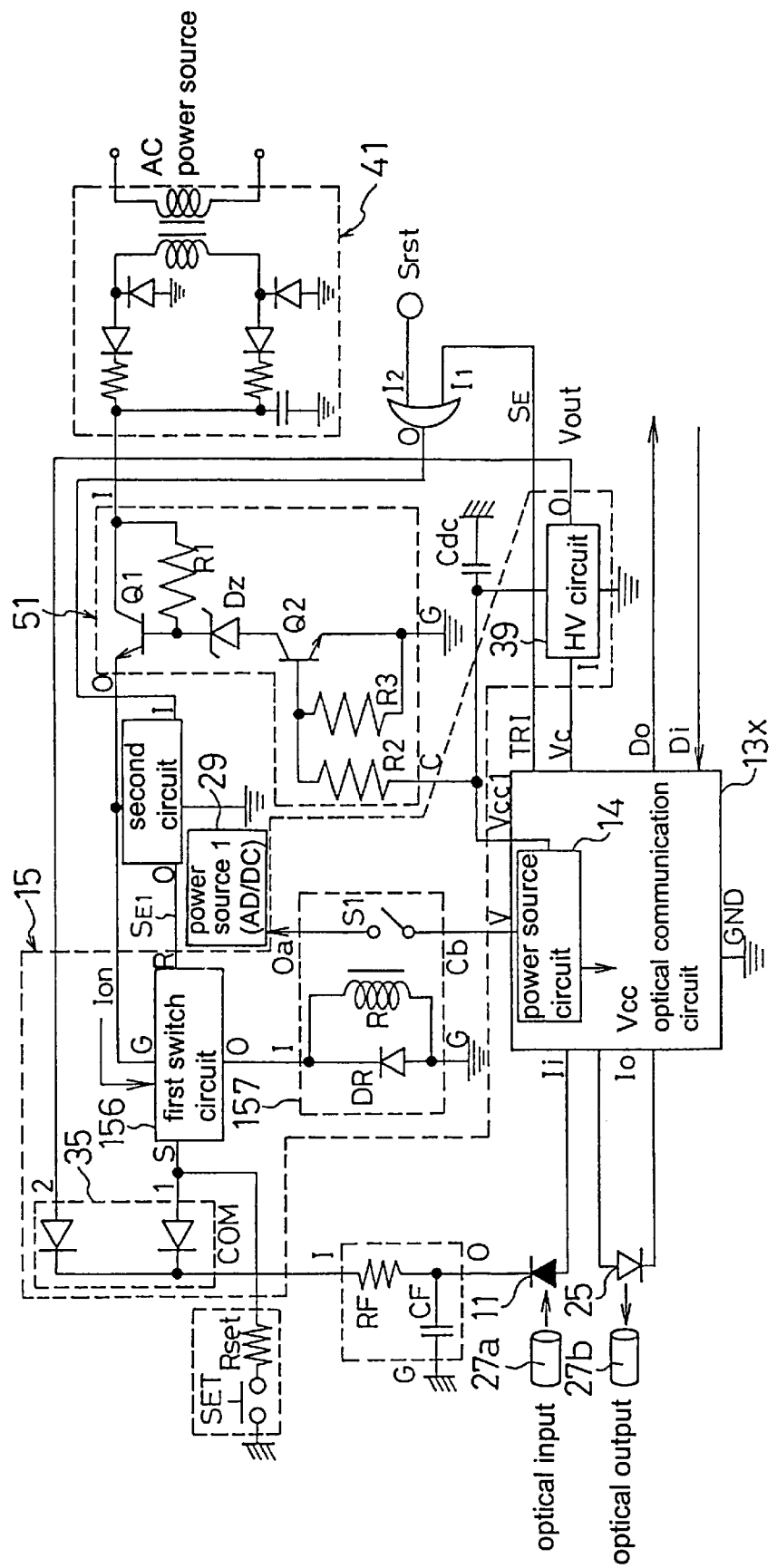
FIG. 31 is a block diagram for explaining the constitution of an optical communication apparatus according to the seventh embodiment of the invention.
Figure 32D:
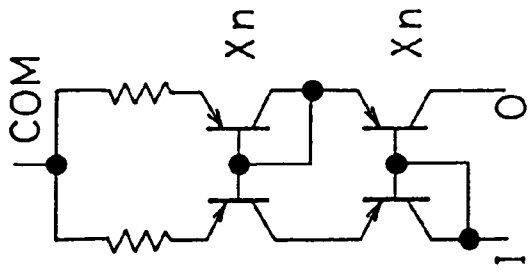
FIGS. 32(A) through 32(D) are diagrams showing various examples of a current mirror circuit.
Figure 32C:
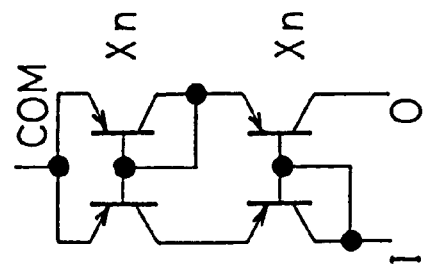
Figure 32B:
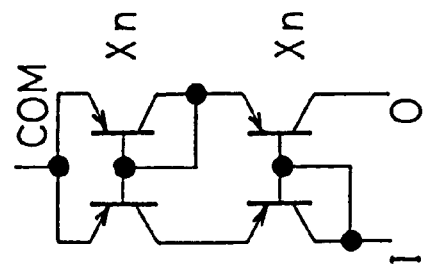
Figure 32A:
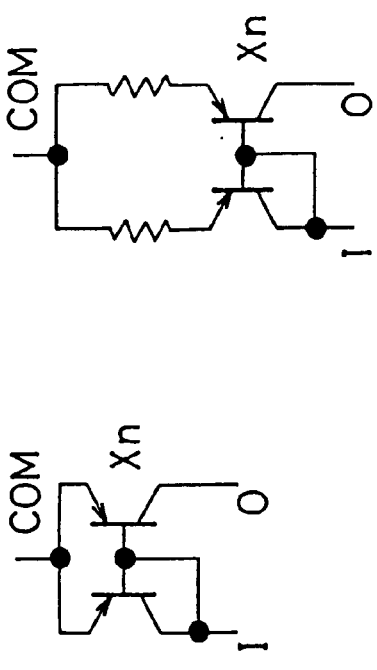

FIG. 31 is a diagram showing the constitution of the optical communication apparatus according to the seventh embodiment of the invention. In the optical communication apparatus of this embodiment, a voltage drop circuit 51 is provided between the second power source 41 and the first circuit 15 (more concretely, the first switch circuit 156). Arrangement of other parts of the apparatus is identical to that of the sixth embodiment.

When the optical communication circuit 13x is in the OFF state, the voltage drop circuit 51 supplies the output voltage from the second power source 41 to the first switch circuit 156. On one hand, when the optical communication circuit 13x is in the ON state, it supplies a preset voltage to the first switch circuit 156, the preset voltage being lower than the lowest output voltage from the controllable power source 39 and higher than the minimum voltage which ensure the operation of the first switch circuit 156.

According to this voltage drop circuit 51, when the optical communication apparatus enters in the communicative state, the output voltage from the second power source 41 is controlled such that it is always kept lower than the output voltage from the controllable power source 39. Therefore, in the changeover circuit 35 formed of diodes, the diode connecting its anode with the controllable power source 39 becomes always conductive when the optical communication apparatus is in the communicative state, so that the changeover circuit 35 performs its normal switching operation.

The voltage drop circuit 51 may be constituted with any arbitrary and preferable circuit if it achieves the function as mentioned above. FIG. 31 shows a concrete example thereof as used in the optical communication apparatus.

This voltage drop circuit 51 is constituted including NPN transistors Q1, Q2, resistances R1 to R3, and a Zener diode Dz. To be more in detail, the collector of the transistor Q1 is connected with the output of the second power source 41 (i.e. input terminal I of voltage drop circuit 51), the emitter thereof is connected with the switch terminal G of the first switch circuit 156 (i.e. output terminal O of voltage drop circuit 51), and the base thereof is connected with the cathode of the Zener diode Dz. The resistance R1 is connected between the base and collector of the transistor Q1. On one hand, the collector of the transistor Q2 is connected with the anode of the Zener diode Dz, the emitter thereof is connected with the ground terminal of the optical communication apparatus, and the base thereof is connected with the terminal of the optical communication circuit 13x through the resistance R2. The resistance R3 is connected between the base and emitter of the transistor Q2.

As explained in the above, the terminal Vcc1 of the optical communication circuit 13x is a terminal for outputting the voltage (here, plus(+) DC voltage) to the controllable power source 39. The output voltage from the terminal Vcc1 is zero volt when the optical communication is in the standby state (i.e. OFF state) while it is equal to the DC voltage supplied to the controllable power source 39. The terminal of the voltage drop circuit 51 is connected with the terminal Vcc1 of the optical communication circuit 13x and serves as the control terminal C.

In the voltage drop circuit 51 shown in FIG. 31, when the control input voltage from the control terminal is zero, the transistor Q2 of the voltage drop circuit is turned off. At this time, the transistor Q1 of the same is separated from the Zener diode Dz and is made conductive by the resistance R1 connecting between the base and collector thereof. On one hand, when the control input voltage from the control terminal C is the voltage of "H", the transistor Q2 of the voltage drop circuit is turned on. At this time, the base potential of the transistor Q1 of the voltage drop circuit is clamped to the Zener voltage by the Zener diode, so that the output voltage from the terminal O becomes almost equal to the clamp voltage. The malfunction of the changeover circuit 35 can be prevented by optimizing this clamp voltage.

In the above, the effect of the voltage drop circuit 51 has been explained in connection with the changeover circuit which is constituted by using diodes. However, the voltage drop circuit 51 is still effective when the changeover circuit is constituted by using MOS transistors (see FIG. 29).

In the above explanation, the output voltage from the terminal Vcc1 i.e. the DC voltage to the controllable power source 39 is used as the control signal to the control terminal C of the voltage drip circuit 51. However, the control signal to the control terminal C may be a signal which is synchronized with the existence or not of the power feed to the optical communication circuit 13x i.e. synchronized with the changeover timing of the optical communication circuit 13x, from the standby state to the communicative state or vice versa. Thus, there is no limitation over the output voltage from the terminal Vcc1 of the optical communication circuit Vcc1.

The voltage drop circuit 51 may be arbitrarily and suitably constituted, for instance by changing the way of connecting the transistor Q1 to the Darlington fashion or by employing MOS transistors.

The changeover operation, from the standby state to the communicative state or vice versa, in the optical communication apparatus in the seventh embodiment, is substantially identical to that in the sixth embodiment, so that the explanation thereabout is here refrained from being repeated.

According to the seventh embodiment, in addition to the effects attained by the optical communication apparatus according to the sixth embodiment, there can be achieved another effect that there can be prevented the malfunction of the changeover circuit 35 (e.g. FIGS. 28, 29) which performs the switching operation depending on the magnitude of the input voltage to respective terminals 1 and 2.

Embodiment of Optical Communication System

An optical communication system with the high power saving effect can be realized by employing the optical communication apparatus which has been described so far in connection with respective embodiments according to the invention.

More concretely, in the optical communication system in which two or more optical communication apparatus is connected by using an optical signal transmitting means such as optical fibers, if at least one optical communication apparatus is constituted by using that which is described in connection with respective embodiments, there can be established the optical communication system in which the power saving effect in the standby state is much enhanced comparing to the conventional system.

As a more concrete example of such an optical communication system as mentioned above, there can be enumerated the following systems, that is: an optical communication system which uses the optical communication apparatus of the invention as a terminal unit, and has the function of connection exchange like the telephone exchange system; an optical communication system performing the control of data transmission/receipt through the optical communication apparatus of the invention which is connected with a device such as a personal computer; an optical communication system including the optical communication apparatus of the invention which is connected with an instrument for use in environmental measurement (including means for meteorological measurement); and so forth. For instance, if the optical communication apparatus of the invention is set up for the purpose of environmental measurement or the like, in an area like a remote island or mountain which is not so convenient for establishing a feeding system, there will be achieved an optical system performing the effective power saving.

As one of methods for communicating with unattended apparatus including the apparatus of the invention, there may be adopted the method as mention below.

First, a master station transmits the optical calling signal to the unattended apparatus to activate it. After this, the master station transmits optical signals including control signals inserted by the master station. The unattended apparatus extracts such control signals from the transmitted optical signals. With this extracted control signals, it becomes possible to control the unattended apparatus, including the ON/OFF operation of its power source. Furthermore, if the master station instructs the unattended apparatus to return, through the optical communication apparatus of the unattended apparatus, the necessary information indicative of the unattended apparatus condition and others to the master station, and controls the unattended apparatus based on the information as returned, the master station can intermittently operate the unattended apparatus only when necessary. With this, accordingly, there is realized a high quality and remote controllable optical communication apparatus which produces no energy loss in its standby state.

With regard to a method for forming a signal by composing data and control information, there is a known method such as the code rule violation method, the frame signal method, and so on.

In the current telecommunication by personal computer, in order to keep the personal computer in the automatic receiving mode, the power source for the personal computer (including modem) has to be always kept in the ON state. However, if the personal computer including the optical communication apparatus of the invention is used for the telecommunication thereby, the power OFF state of the personal computer in its standby state can be compatible with the automatic receiving mode thereof.

Other Embodiments

Several embodiments of the invention have been discussed in the foregoing paragraphs. However, the invention is not limited by those embodiments, which may be possibly changed and modified by one skilled in the art within the scope of the invention recited in the attached claims.

Figure 36:
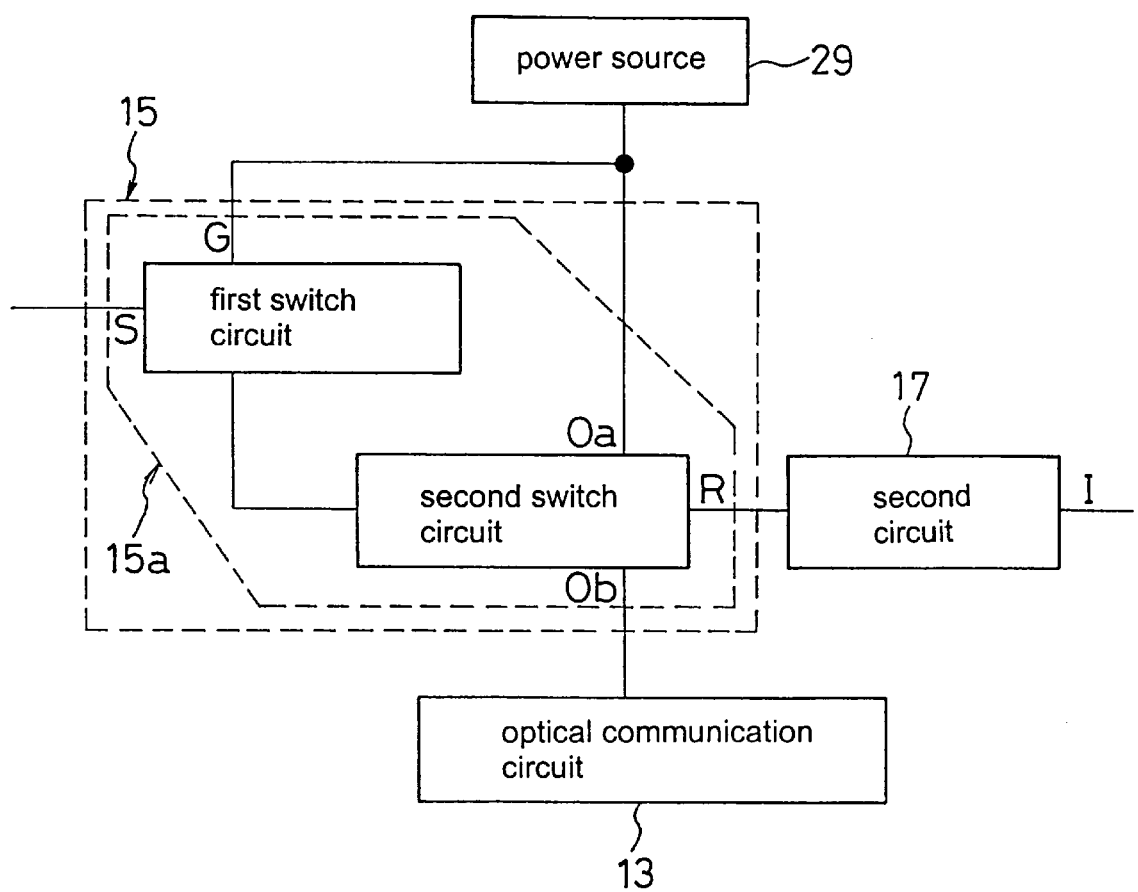
FIG. 36 is a block diagram for explaining other embodiment.

For instance, in the third to seventh embodiment, it has been explained that the first switch circuit continues to output the switching signal to the second switch circuit in order to hold the second switch circuit in its ON state, until the first switch circuit receives the communication terminating signal SE or a signal SE1 associated therewith. However, the same result may be achieved by composing another circuit as follows. That is, the first switch circuit outputs the switching signal as the trigger in order to turn on the second switch circuit. On one hand, there is provided in the second circuit a circuit which holds the switching signal from the first switch circuit. The second switch circuit is turned off when the communication terminating signal SE or a signal SE1 associated therewith is input to the second circuit. A conceptual diagram of this arrangement is shown in FIG. 36. In this case, the second switch circuit is constituted with a circuit including a thyristor and a reset input terminal R.

The third to seventh embodiments may be of course combined with the thought of using the current folding circuit as explained in connection with the second embodiment.

In the fourth and fifth embodiments, it has been explained that the plus(+) power source is used as the first power source. However, the thought of using the minus(−) power source as the first power source, which has been explained in connection with FIG. 9, is applicable to each of the fourth and fifth embodiments.

In case that the optical communication circuit is constituted including a plurality of power supplies or that there are peripherals which is preferably turned on togetherwith the optical communication circuit, the ON/OFF of these power supplies is dealt with as follows: (1) preparing a plurality of second switch circuits by the number as needed, each of them being constituted with by such a circuit that the input and output sides thereof are separated from each other when seeing them in terms of DC current (see FIGS. 19(A), 19(B), 19(D), and 19(E)) and controlling the ON/OFF of the plural power supplies for the optical communication circuit or peripherals by respective second switch circuits. (2) preparing a plurality of pairs of output terminals (Oa, Ob) by the number as needed, and connecting them with plural power supplies for the optical communication circuit or peripherals; and (3) preparing a plurality of the third switches (constituted alike the second switch) to be turned on/off by the second switch, by the number as needed, and connecting them with plural power supplies for the optical communication circuit or peripherals.

Figure 19A:
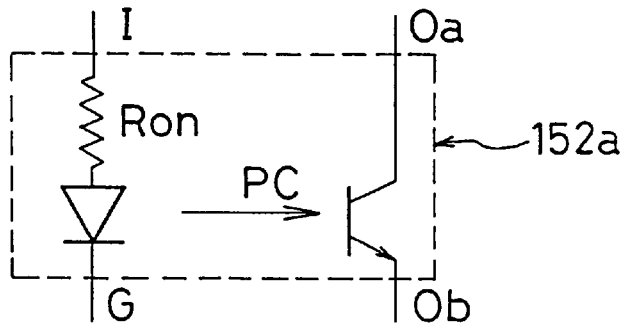
FIGS. 19(A) through 19(E) are diagrams showing concrete examples of the second switch circuit.
Figure 19B:
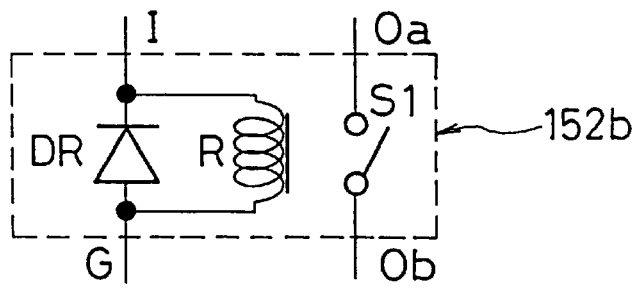
Figure 19C:
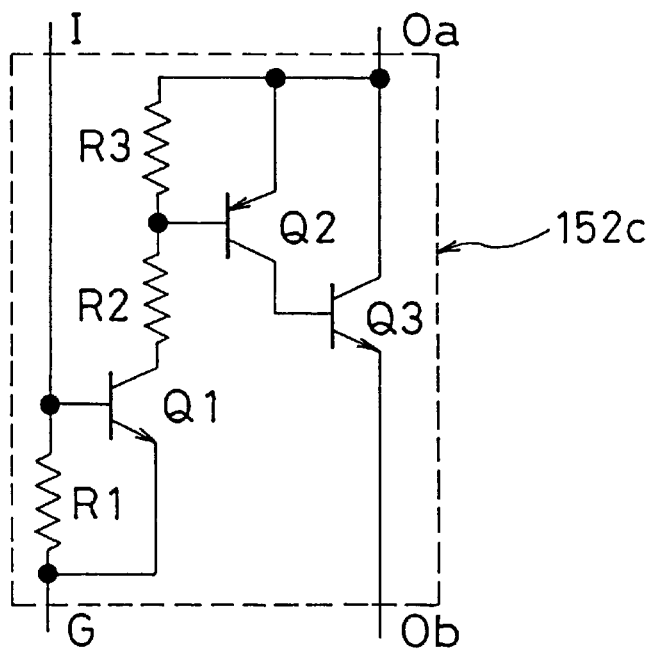
Figure 19D:
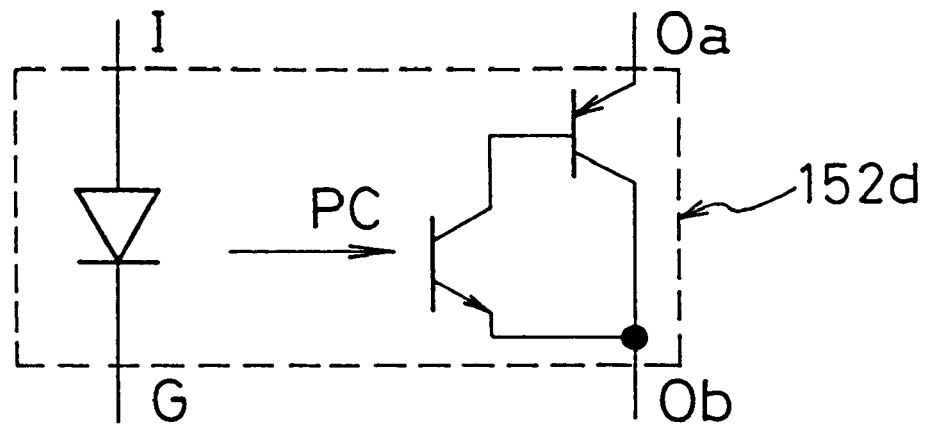
Figure 19E:
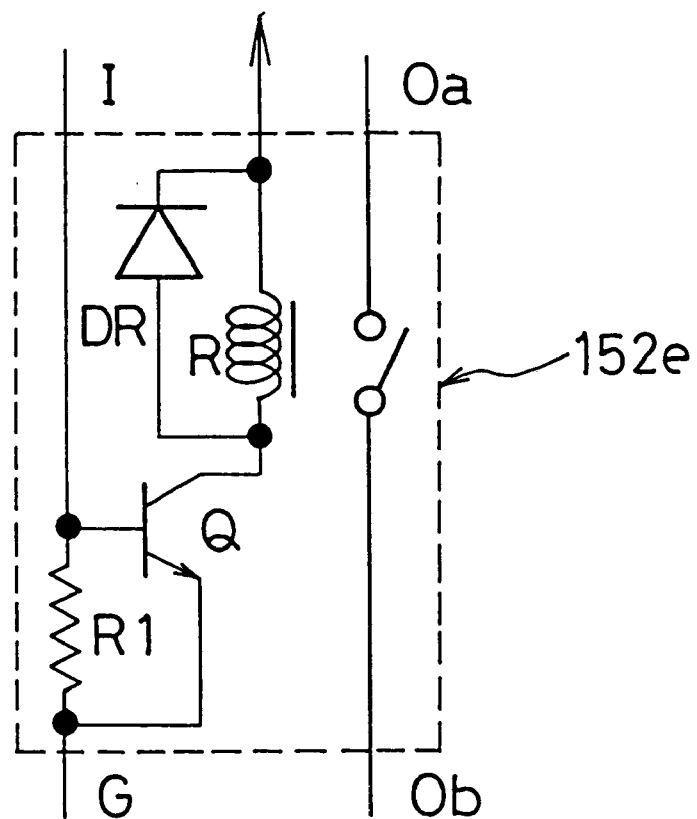

In case of using a plurality of the second switch circuits, each of them being constituted by such a circuit that the input and output sides thereof are separated from each other when seeing them in terms of DC current and that the input side is formed of a resistance which requires the constant current driving (see FIG. 19(D)), if a plurality of input portions (terminals I, G pairs) are connected in series with each other, the necessary output current from the first switch circuit is lessened, thereby the scale of and the power consumption by the first switch circuit being prevented from being enlarged and increased, respectively.

If let the control portion 13c in the optical communication circuit 13 (see FIGS. 2, 22) to extract the command information included in the transmitted optical signal, various control including the power source control of the optical communication circuit and its peripherals can be performed by the extracted command information. As explained in connection with the eighth embodiment, as to the method for forming the transmission data by composing various information such as values, test data indicative of the apparatus condition or the method for reproducing the received data, there are various known methods such as the code rule violation method, the frame signal method, and so forth.

Effect of the Invention

As will be apparent from the foregoing description, according to the invention, there is provided a method for saving the power that is consumed by an optical communication apparatus which includes a light receiving element for receiving optical signals including an optical calling signal, and an optical communication circuit which includes an amplifier circuit amplifying the photocurrent generated by said light receiving element, performs predetermined processing necessary for the optical communication, and outputs a communication terminating signal upon termination of the optical communication, the method comprising the steps of always supplying a bias voltage to the light receiving element; holding the optical communication apparatus in the standby state by cutting off the power supply to the optical communication circuit by making use of the communication terminating signal when it is outputted; and setting up the optical communication apparatus available for communication by turning on the power source for the optical communication circuit by making use of the photocurrent generated by the light receiving element upon its receipt of the optical calling signal. Therefore, while the optical communication apparatus is in its standby state, only the bias voltage is supplied to the light receiving element, and no power supply is made to the optical communication circuit including the amplifier circuit for the light receiving circuit over an entire standby period of time. With this, there is attained the power saving effect higher than the prior art method. Despite this, returning to the communicative state can be executed any time whenever desired.

In the optical communication apparatus according to the invention, there is provided a first circuit which can always supply the bias voltage to the light receiving element. Furthermore, when the communication terminating signal is outputted, the first circuit can cut off the power supply to the optical communication circuit by making use of that signal. Still further, when the light receiving element generates the photocurrent upon its receipt of the optical calling signal, the first circuit can turn on the power source for the optical communication circuit by making use of that photocurrent. Therefore, the above power saving method can be executed with ease.

In the optical communication system, as the power feed is not possible through the optical fiber, the power source for each optical communication apparatus as a terminal unit has to be prepared on each terminal side. For instance, therefore, in case the telephone lines are structured with the optical fiber so as to enable the high speed data communication to be possible and each home is provided with the optical communication apparatus as the terminal unit, it is desired that the optical communication apparatus is of the type which consumes the power as less as possible. In such case, the method and the optical communication apparatus of the invention can be utilized advantageously.

In case of the unattended optical communication apparatus, if it employs a power source set up by combining a solar battery and a storage cell, there can be attained not only the effect of power saving but also compaction of the power source portion.

A certain period of time is needed for the hardware and software in the light receiving side apparatus to rise up until the actual communication becomes possible after receipt of the optical calling signal. In case one of a pair of terminal units serves as a parent terminal unit while the other does as a daughter terminal unit, if the power source of the parent terminal unit is always held in its ON state, the rising time of the parent terminal unit becomes shorter or substantially zero when it is called by the daughter terminal unit, so that the power saving effect on the daughter side can be further enhanced. Furthermore, it is possible to enhance the efficiency of the communication by always holding the power source of the parent terminal unit in its ON state and minimizing the rising time as mentioned above while the call density is so high, so-called call rush hours. In contrast to this, while the call density is comparatively low, it is possible to enhance the power saving effect by performing the ON/OFF control of the power source.

What is claimed is:

1. An optical communication apparatus having a light receiving element for receiving optical signals including an optical calling signal and an optical communication circuit which includes an amplifier circuit amplifying the photocurrent generated by said light receiving element, performs predetermined processing necessary for the optical communication, and outputs a communication terminating signal on the occasion of termination of the optical communication, wherein there is provided a first circuit which always supplies a bias voltage to said light receiving element, creates a non-connected state between said optical communication circuit and a first power source as a power source thereof if said communication terminating signal or a signal associated therewith is outputted, creates a connected state between said optical communication circuit and said first power source by making use of the photocurrent generated by said light receiving element the occasion of receipt of said optical calling signal by said light receiving element, and holds said connected state until said communication terminating signal or a signal associated therewith is outputted.

2. An optical communication apparatus as claimed in claim 1, wherein said first circuit is constituted with a switch circuit which has at least a first to fourth terminals, said first terminal being connected with said first power source for supplying the power to said optical communication circuit, said second terminal being connected with the bias terminal of said light receiving element, said third terminal being connected with the power source terminal of said optical communication circuit, and said fourth terminal being an input terminal for receiving said communication terminating signal or a signal associated therewith, and which always supplies the voltage based on said first power source as a bias voltage to said light receiving element through said second terminal, makes a conductive state between said first terminal and said third terminal by making use of the photocurrent as the trigger flowing through said second terminal when said light receiving element receives said optical calling signal, and holds said conductive state until said communication terminating signal or a signal associated therewith is inputted to said fourth terminal.

3. An optical communication apparatus as claimed in claim 2, wherein said switch circuit is constituted with a circuit comprising:

a first switch circuit generating a switching signal in response to said photocurrent, and a second switch circuit which is turned on/off by said switching signal, thereby connecting/disconnecting said first and third terminals.

4. An optical communication apparatus as claimed in claim 1, wherein said first circuit is constituted with a circuit comprising:

a current folding circuit which has an input terminal, an output terminal, and a common terminal, said input terminal being connected with the bias terminal of said light receiving element, and said common terminal being connected with a bias voltage supplying source for supplying the bias voltage to said light receiving element, and a switch circuit which has a first to fourth terminals, said first terminal being connected with said first power source as the power source for said optical communication circuit, said second terminal being connected with said output terminal of said current folding circuit, said third terminal being connected with the power source terminal of said optical communication circuit, and said fourth terminal being an input terminal for receiving said communication terminating signal or a signal associated therewith, and which makes a conductive state between said first terminal and said third terminal by making use of the photocurrent as the trigger flowing through said current folding circuit when said light receiving element receives said optical calling signal, and holds said conductive state until said communication terminating signal or a signal associated therewith is inputted to said fourth terminal.

5. An optical communication apparatus as claimed in claim 4, wherein said switch circuit is constituted with a circuit comprising:

a first switch circuit generating a switching signal in response to said photocurrent, and a second switch circuit which is turned on/off by said switching signal, thereby connecting/disconnecting said first and third terminals.

6. An optical communication apparatus as claimed in claim 4, wherein said current folding circuit is constituted with a non-linear current amplifier circuit having a current amplification factor which indicates a minimum value to the input current of around zero and increases with the increase of the input current, and a resistance limiting the maximum value of the output current or a constant current circuit.

7. An optical communication apparatus as claimed in claim 4, wherein said bias voltage supplying source is constituted with a controllable power source of which the output voltage is controlled by said optical communication circuit, and which outputs a fixed DC voltage while the power supply to said optical communication circuit is cut off.

8. An optical communication apparatus as claimed in claim 1, wherein said first circuit is constituted with a circuit comprising:

a controllable power source of which the output is controlled by said optical communication circuit, and which outputs a fixed DC voltage when the power supply to said optical communication circuit is cut off;

a first switch circuit which has at least a first to fourth terminals, said first terminal being connected with said controllable power source, said second terminal being connected with the bias terminal of said light receiving element, said third terminal being an output terminal of a switching signal, and said fourth terminal being an input terminal for receiving said communicationterminating signal or a signal associated therewith, and which always supplies the voltage based on said controllable power source as a bias voltage to said light receiving element through said second terminal, and continues to output said switching signal from said third terminal by making use of the photocurrent flowing through said second terminal as the trigger when the light receiving element receives said optical calling signal until said communication terminating signal or a signal associated therewith is inputted to said fourth terminal; and a second switch circuit which is provided between a first power source as the power source for said optical communication circuit and the power source terminal of thereof, and makes a connected state between said optical communication circuit and the first power source in response to said switching signal.

9. An optical communication apparatus as claimed in claim 8, wherein said first power source is an AC power source or a DC power source outputting a DC current including a pulsating current acquired by rectifying the output of the AC power source, and said optical communication circuit includes a power source circuit constituting at lease the power source necessary for said optical communication circuit.

10. An optical communication apparatus as claimed in claim 8, wherein there is provide on said second switch circuit side a circuit which holds said switching signal instead of having said first switch circuit held said first switching signal until said communication terminating signal or a signal associated therewith is outputted.

11. An optical communication apparatus as claimed in claim 1, wherein said first circuit is constituted with a circuit comprising:

a changeover circuit which has a first terminal, a second terminal and a common terminal connected with the bias terminal of said light receiving element, and is controlled by a switching signal so as to make a first state that said second terminal is connected with said common terminal when said switching signal is inputted, and a second state that said first terminal is connected with said common terminal when said switching signal is not inputted;

a controllable power source of which the output terminal is connected with the second terminal of said changeover circuit and of which the output voltage is controlled by said optical communication circuit;

a first switch circuit which has at least a first to fourth terminals, said first terminal being connected with a first power source as the power source for said optical communication circuit, said second terminal being connected with the first terminal of said changeover circuit, said third terminal being an output terminal of a switching signal, and said fourth terminal being input terminal for receiving said communication terminating signal or a signal associated therewith, and which supplies the voltage based on said first power source as a bias voltage to said light receiving element when said changeover circuit is in the second state and continues to output said switching signal from said third terminal by making use of the photocurrent flowing through said second terminal of the first switch circuit as the trigger when the light receiving element receives said optical calling signal until said communication terminating signal or a signal associated therewith is inputted to said fourth terminal; and a second switch circuit which is provided between said first power source and the power source terminal of said optical communication circuit, and makes a connected state between said optical communication circuit and the first power source in response to said switching signal.

12. An optical communication apparatus as claimed in claim 11, wherein there is provided on said second switch circuit side a circuit which holds said switching signal instead of having said first switch circuit held said first switching signal until said communication terminating signal or a signal associated therewith is outputted.

13. An optical communication apparatus as claimed in claim 1, wherein said first circuit is constituted with a circuit comprising:

a changeover circuit which has a first terminal, a second terminal and a common terminal connected with the bias terminal of said light receiving element, and is controlled by a switching signal so as to make a first state that said second terminal is connected with said common terminal when said switching signal is inputted, and a second state that said first terminal is connected with said common terminal when said switching signal is not inputted;

a controllable power source of which the output is connected with the second terminal of said changeover circuit and of which the output voltage is controlled by said optical communication circuit;

a first switch circuit which has at least a first to fourth terminals, said first terminal being connected with an arbitrary second power source, said second terminal being connected with the first terminal of said changeover circuit, said third terminal being an output terminal of a switching signal, and said fourth terminal being an input terminal for receiving said communication terminating signal or a signal associated therewith, and which supplies the voltage based on said second power source as a bias voltage to said light receiving element when said changeover circuit is in the second state and continues to output said switching signal from said third terminal by making use of the photocurrent flowing through said second terminal of the first switch circuit as the trigger when the light receiving element receives said optical calling signal until said communication terminating signal or a signal associated therewith is inputted to said fourth terminal; and a second switch circuit which is provided between said first power source as the power source for said optical communication circuit and the power source terminal of said optical communication circuit, and makes a connected state between said optical communication circuit and the first power source in response to said switching signal.

14. An optical communication apparatus as claimed in claim 13, wherein there is provided between said second power source and said first terminal of said first switch circuit, a voltage drop circuit which supplies the voltage of said second power source to said first switch when said optical communication circuit is in the OFF state, and supplies the voltage, which is lower than the minimum voltage outputted from said controllable power source and ensures the operation of said first switch circuit, to the first switch circuit when said optical communication circuit is in the ON state.

15. An optical communication apparatus as claimed in claim 13, wherein said second power source is formed of an AC power source, a rectifier circuit and a smoothing circuit.

16. An optical communication apparatus as claimed in claim 13, wherein said first power source is an AC power source or a DC power source outputting a DC current including a pulsating current acquired by rectifying the output of the AC power source, and said optical communication circuit includes a power source circuit constituting at lease the power source necessary for said optical communication circuit.

17. An optical communication apparatus as claimed in claim 13, wherein there is provided on said second switch circuit side a circuit which holds said switching signal instead of having said first switch circuit held said first switching signal until said communication terminating signal or a signal associated therewith is outputted.

18. An optical communication apparatus as claimed in claim 1, wherein said first circuit includes a thyristor which is turned on with said photocurrent and is turned off with said communication terminating signal or a signal associated therewith.

19. An optical communication apparatus as claimed in claim 1, wherein there is provided a second circuit which converts said communication terminating signal into a signal matching with said first circuit form and outputs the converted signal to said first circuit, as a signal associated with said communication terminating signal.

20. An optical communication apparatus as claimed in claim 19, wherein said second circuit is a thyristor which is turned on by said communication terminating signal.

21. An optical communication apparatus as claimed in claim 19, wherein said second circuit is constituted with a monostable multivibrator comprising:
- a constant current circuit which is turned on by said communication terminating signal; a condenser which is charged by using said constant current circuit;
- a current mirror circuit which receives the output of said constant current circuit as its input;
- a Schmitt trigger circuit which operates using the output of said current mirror circuit as a load thereof and receives the voltage between terminals of the condenser as its input; and
- a thyristor built-in circuit portion including a thyristor which is turned on by the output of said Schmitt trigger circuit, thereby turning off said constant current circuit and discharging said condenser.

22. An optical communication apparatus as claimed in claim 1, wherein there is provided a third circuit which forcibly makes a connected state between said first power source and the power source terminal of said optical communication circuit with the help of the external control, regardless of the presence of said optical calling signal.

23. An optical communication apparatus as claimed in claim 1, wherein there is provided a fourth circuit which forcibly releases the connected state between said first power source and the power source terminal of said optical communication circuit with the help of the external control, regardless of the presence of said communication terminating signal.

24. A method for using an optical communication apparatus, wherein said third circuit of the optical communication apparatus as recited in claim 22 is kept in operation for a period of time preset arbitrarily.

25. An optical communication system including two or more optical communication apparatus connected with each other by an optical signal transmitting means, wherein at least one optical communication apparatus is constituted with the optical communication apparatus as recited in claim 1.

26. An optical communication system as claimed in claim 25, wherein said optical communication system includes a connection switching system.

* * * * *